(12) United States Patent
Brown et al.

(10) Patent No.: US 9,874,923 B1
(45) Date of Patent: Jan. 23, 2018

(54) POWER MANAGEMENT FOR A SELF-POWERED DEVICE SCHEDULING A DYNAMIC PROCESS

(71) Applicant: Invent.ly, LLC, Woodside, CA (US)

(72) Inventors: Stephen J. Brown, Woodside, CA (US); Daylyn M. Meade, Sebastopol, CA (US); Timothy P. Flood, Sebastopol, CA (US); Clive A. Hallatt, Palo Alto, CA (US); Holden D. Jessup, Palo Alto, CA (US); Hector H. Gonzalez-Banos, Mountain View, CA (US)

(73) Assignee: Invent.ly, LLC, Woodside, CA (US)

( * ) Notice: Subject to any disclaimer, the term of this patent is extended or adjusted under 35 U.S.C. 154(b) by 205 days.

(21) Appl. No.: 14/872,355

(22) Filed: Oct. 1, 2015

Related U.S. Application Data

(63) Continuation-in-part of application No. 14/169,464, filed on Jan. 31, 2014, now abandoned, which is a continuation-in-part of application No. 14/090,099, filed on Nov. 26, 2013, and a continuation-in-part of application No. 14/103,209, filed on Dec. 11, 2013, which is a continuation of application No. 13/946,414, filed on Jul. 19, 2013, now Pat. No. 8,850,242, which is a continuation of application No. 13/406,469, filed on Feb. 27, 2012, now Pat. No. (Continued)

(51) Int. Cl.
*G06F 1/32* (2006.01)
*H04L 29/08* (2006.01)
*G06F 1/28* (2006.01)
*G06F 1/06* (2006.01)
*G06F 3/06* (2006.01)

(52) U.S. Cl.
CPC .............. *G06F 1/3209* (2013.01); *G06F 1/06* (2013.01); *G06F 1/28* (2013.01); *G06F 1/3234* (2013.01); *G06F 3/067* (2013.01); *G06F 3/0653* (2013.01); *H04L 67/12* (2013.01)

(58) Field of Classification Search
None
See application file for complete search history.

(56) References Cited

U.S. PATENT DOCUMENTS 6,658,564 B1 * 12/2003 Smith ................ G06F 17/5054
712/15
2013/0332934 A1 * 12/2013 Hood, Jr. .............. G06F 9/4436
718/102

* cited by examiner

*Primary Examiner* — Paul J Yen
(74) *Attorney, Agent, or Firm* — Christopher P. Maiorana, PC

(57) ABSTRACT

A device comprising a battery, a memory, a data acquisition circuit and a processor. The sensors may sample a current state of a dynamic process. The data acquisition circuit may have a first clock rate based on a sampling rate of the dynamic process. The data acquisition circuit may read sensor information from the sensors. The processor may have a second clock rate. The processor may process the sensor information and generate a monitoring signal based on at least one of the sensor information, a model of the dynamic process and a desired state of the dynamic process. The processor may schedule procedures for the device and determine computation times for the procedures based on context information. The second clock rate is faster than the first clock rate. The procedures are scheduled based on the sampling rate, the computation times for the procedures and opportunities to enter a standby mode to conserve power.

18 Claims, 28 Drawing Sheets

Related U.S. Application Data

8,516,279, which is a continuation of application No. 12/472,327, filed on May 26, 2009, now Pat. No. 8,127,158, which is a continuation of application No. 11/443,668, filed on May 30, 2006, now Pat. No. 7,539,882.

(60) Provisional application No. 60/685,976, filed on May 30, 2005.

SELECTING ONE OF A PLURALITY OF MODES OF OPERATIONS OF A SELF-POWERED DEVICE, WHEREIN THE PLURALITY OF MODES OF OPERATION INCLUDES A FIRST MODE OF OPERATION IN WHICH THE SELF-POWERED DEVICE CONSUMES LESS THAN A PRE-DETERMINED AMOUNT OF POWER AND A SECOND MODE OF OPERATION IN WHICH SELF-POWERED DEVICE CONSUMES MORE THAN THE PRE-DETERMINED AMOUNT OF POWER.

COMMUNICATING WITH A COMPUTING DEVICE WHEN THE SELF-POWERED DEVICE IS IN THE SECOND MODE OF OPERATION, WHEREIN THE SELF-POWERED DEVICE IS TO CONSERVE POWER BY ALTERNATING BETWEEN THE FIRST MODE OF OPERATION AND THE SECOND MODE OF OPERATION SUCH THAT THE SELF-POWERED DEVICE IS IN THE SECOND MODE OF OPERATION DURING PRE-DETERMINED TIME INTERVALS, AND WHEREIN A DUTY-CYCLE OF THE SECOND MODE OF OPERATION RELATIVE TO THE FIRST MODE OF OPERATION IS IN ACCORDANCE WITH A POWER BUDGET FOR THE SELF-POWERED DEVICE.

FIG. 20

POWER MANAGEMENT FOR A SELF-POWERED DEVICE SCHEDULING A DYNAMIC PROCESS

This application relates to U.S. Ser. No. 14/169,464, filed Jan. 31, 2014, which relates to U.S. Ser. No. 14/103,209, filed Dec. 11, 2013, which relates to U.S. Ser. No. 13/946,414, filed Jul. 19, 2013, now U.S. Pat. No. 8,850,242, which relates to U.S. Ser. No. 13/406,469, filed Feb. 27, 2012, now U.S. Pat. No. 8,516,279, which relates to U.S. Ser. No. 12/472,327, filed May 26, 2009, now U.S. Pat. No. 8,127,158, which relates to U.S. Ser. No. 11/443,668, filed May 30, 2006, now U.S. Pat. No. 7,539,882, which relates to U.S. Provisional Application No. 60/685,976, filed May 30, 2005. This application also relates to U.S. Ser. No. 14/090,099, filed Nov. 26, 2013. Each of the mentioned applications are hereby incorporated by reference in their entirety.

FIELD OF THE INVENTION

The embodiments disclosed herein relate to control and automation, optimal control, computer science, embedded systems, data analysis and power management in self-powered electronic devices, and, in particular, to power management for a self-powered device scheduling a dynamic process.

BACKGROUND OF THE INVENTION

Private and public networks, such as the Internet, continue to grow at an exponential rate. These rapidly expanding networks consume a tremendous amount of power, which is typically supplied from traditional electrical power grids. As such, most networked computers are either tethered to electrical wall outlets or require periodic charging at electrical wall outlets. Many networked computers, however, have benefitted tremendously by being self-powered. For example, emergency communication systems, computing devices in rural areas where access to traditional power sources is limited, etc.

However, current self-powered devices, such as devices that obtain energy from solar power, typically waste much of their power communicating with other networked computing devices. As such, it would be highly desirable to provide a self-powered device (SPD) that consumes less power when communicating with other devices in a network.

Wireless sensor networks have been proposed for a wide range of monitoring applications in various industries, such as health care, energy, transportation, infrastructure, agriculture, security, the environment and many other fields. Billions of active sensors have been installed that can wirelessly connect to networks and capture data. Such an installed base of sensors creates issues such as powering such sensors as well as transporting and storing the data received from the sensors.

Various conventional approaches have been developed in response to particular constraints. Microelectronics companies are concerned with creating low power devices with energy harvesting technologies and improved batteries. Communications companies are continuing to build networks with more radio towers, improved data compression and adherence to interference regulations. Cloud computing companies are developing approaches for storing more data with data structures suited for the expected exponential growth in capturing data. Such conventional approaches are unlikely to be sufficient with the grand vision of the "Internet of Things". The communications bandwidth (and data storage on the Internet to implement such an approach) could include hundreds of times as many sensors as conventional smartphones, potentially consuming the highest amount of energy of the Internet.

Most conventional approaches are based on autonomous sensor notes that are always on and capture and transmit large amounts of sensor data to a network that always needs to be listening and recording the transmissions. The network then needs to relay back an acknowledgment to the sensor that the data was accurately received. If scaled to a trillion sensors, a huge number of devices would need to be implemented with batteries that would be unaffordable (or at least inconvenient) to change. A huge amount of traffic on already congested networks would further increase the power needs of each device, since higher antenna output would likely be needed to overcome interference and noise.

Different approaches are needed. The motivation of a better approach stems from a more fundamental question—Why do we need all of this data anyway? The data and related power needs of capturing, transmitting and recording data are highly context and application dependent. Most conventional sensors blindly capture and transmit data. Such sensors assume the application needs or knows what to do with that data. Some data inevitably are more important than others. The importance of data can vary with time and with the knowledge embedded in the application.

It would be desirable to implement a predictive power management in a wireless sensor network.

SUMMARY OF THE INVENTION

The present invention concerns a device comprising a battery, a memory, a data acquisition circuit and a processor. The sensors may sample a current state of a dynamic process. The data acquisition circuit may have a first clock rate based on a sampling rate of the dynamic process. The data acquisition circuit may read sensor information from the sensors. The processor may have a second clock rate. The processor may process the sensor information and generate a monitoring signal based on at least one of the sensor information, a model of the dynamic process and a desired state of the dynamic process. The processor may schedule procedures for the device and determine computation times for the procedures based on context information. The second clock rate is faster than the first clock rate. The procedures are scheduled based on the sampling rate, the computation times for the procedures and opportunities to enter a standby mode to conserve power.

BRIEF DESCRIPTION OF THE DRAWINGS

For a better understanding of the disclosure herein, reference should be made to the following detailed description taken in conjunction with the accompanying drawings, in which:

FIG. 20 is a flow chart of a method for managing power consumption;

Like reference numerals refer to the same or similar components throughout the several views of the drawings.

DETAILED DESCRIPTION OF EMBODIMENTS

Figure 1:
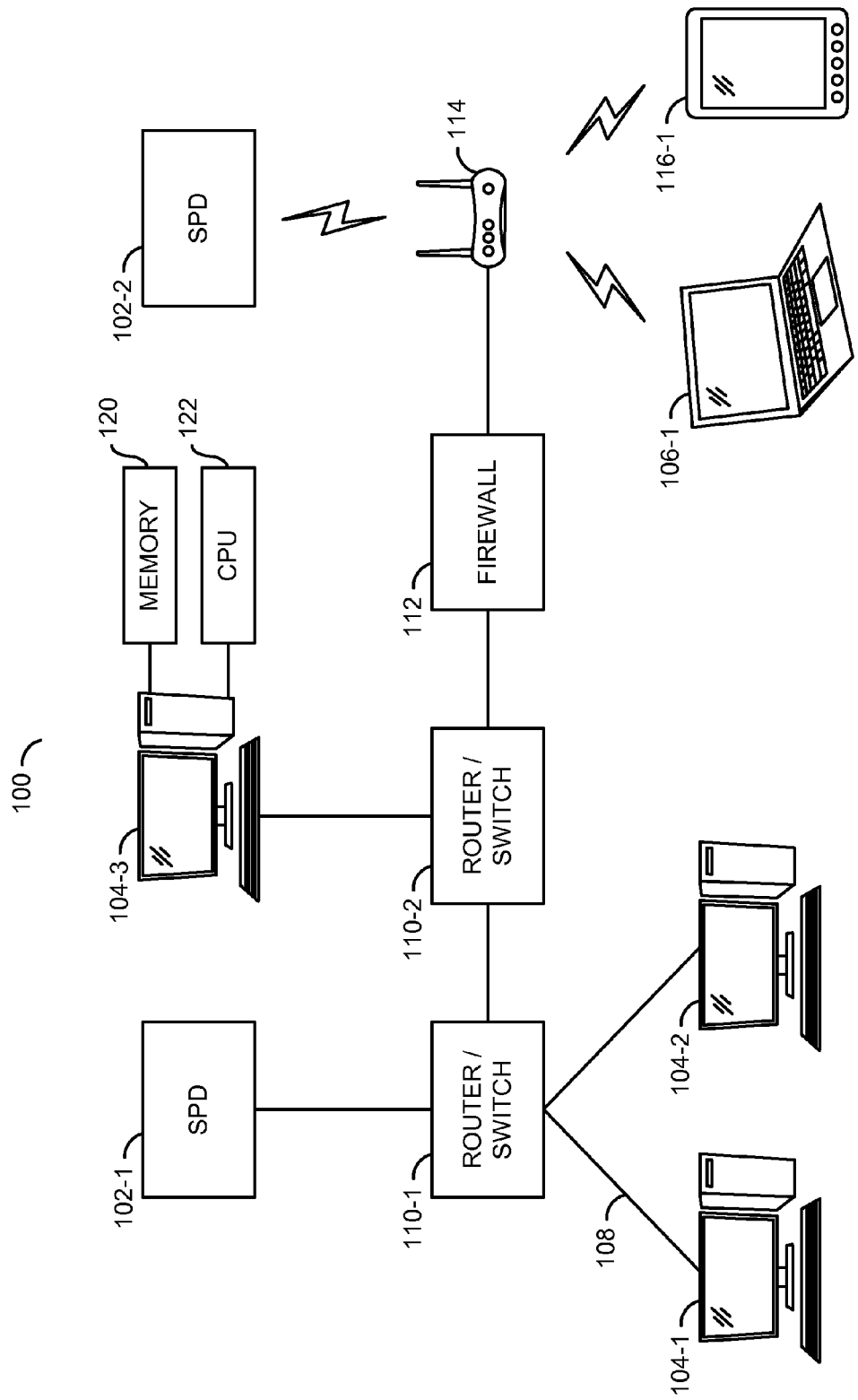
FIG. 1 is a block diagram illustrating an embodiment of a system including one or more self-powered devices.

Embodiments of self-powered systems, devices, and methods are described herein. The self-powered system may include a computing device that selectively communicates with a self-powered device. The self-powered device may include: a circuit to power the self-powered device; memory; a processor; and a program mechanism that is stored in the memory for execution by the processor. The program mechanism may include instructions for selecting one of a plurality of modes of operation, including a first mode of operation in which the self-powered device consumes less than a pre-determined amount of power and a second mode of operation in which self-powered device consumes more than the pre-determined amount of power. (See FIG. 20).

Embodiments of the invention provide a context-aware and/or power-aware wireless sensor network system that enables application needs to determine which data is captured, transmitted and/or stored at the edge of the wireless sensor network. Such an implementation may result in lower power usage, lower bandwidth usage, less interference, and/or less storage and/or processing capacity in the cloud. The determination of which data is important may change and may be determined based on context and/or knowledge. The sensor system is highly adaptable. A software application can reprogram the sensor nodes with new instructions as data needs change and/or grow more complex. Additionally, the power management of the sensor nodes is application-driven to prioritize limited power resources according to the application needs. Power resources may be calculated based on available energy, a power budget, predicted future power needs and/or energy harvesting opportunities.

The program mechanism may further include instructions for communicating with the computing device when the self-powered device is in the second mode of operation. The self-powered device may conserve power by alternating between the first mode of operation and the second mode of operation such that the self-powered device is in the second mode of operation during pre-determined time intervals. A duty-cycle of the second mode of operation relative to the first mode of operation may be based on a power budget for the self-powered device.

The computing device and the self-powered device may be synchronized such that transmit circuits and receive circuits in the computing device and the self-powered device are to communicate signals during one or more of the pre-determined time intervals or adaptively-determined time intervals. In some embodiments, the synchronization includes use of a Network Time Protocol. In some embodiments, the synchronization includes a Wi-Fi periodic beacon signal.

The computing device may poll the self-powered device during one or more of the pre-determined or adaptively-determined time intervals.

The self-powered device may switch to the second mode of operation prior to one or more of the pre-determined time intervals or adaptively-determined time intervals, and the self-powered device may switch to the first mode of operation after one or more of the pre-determined or adaptively-determined time intervals.

In some embodiments, the self-powered device further includes instructions for determining a periodicity of the pre-determined time intervals or adaptively-determined time intervals in accordance with signals provided by the computing device, and the duty-cycle is further determined in accordance with the periodicity.

In some embodiments, the self-powered device further includes instructions for combining messages that are to be communicated to the computing device in order to reduce a communication overhead.

In some embodiments, the system further includes one or more additional self-powered devices and a coordination element. The coordination element may assign communication priorities to the self-powered device and the one or more additional self-powered devices in accordance with power budgets for these devices.

In some embodiments, the self-powered device further includes instructions for providing an acknowledgment message to a sending self-powered device with a higher priority than other types of messages.

In some embodiments, a circuit converts an external energy source into signals that power the self-powered device. The external energy source may include light.

In some embodiments, the circuit includes a component, such as a photovoltaic cell, a wind energy generator, a thermo-electric energy generator, a kinetic energy generator, a piezoelectric device, a magnetic energy generator, and/or a chemical-to-electricity generator.

In some embodiments, the computing device provides control information to the self-powered device.

In some embodiments, the self-powered device includes one or more sensors. The sensor may measure a characteristic, such as temperature, humidity, pressure, vibration, light, motion, sound, proximity, flow rate, electrical voltage, and electrical current.

In some embodiments, the self-powered device may provide configuration information to one or more output devices in accordance with the measured characteristic, the internal status of the self-powered device, any received message, elapsed time, local and/or remote user interaction, or a local and/or remote automatic process. The output devices may include a switch, a relay, an electromechanical actuator, a heater, a fan, a speaker, a solenoid, a motor, an electric field generator, a magnetic field generator, and an electro-magnetic field generator.

Reference will now be made in detail to various embodiments, examples of which are illustrated in the accompanying drawings. In the following detailed description, numerous specific details are set forth in order to provide a thorough understanding of the subject matter presented herein. However, it will be apparent to one of ordinary skill in the art that the subject matter may be practiced without these specific details. In other instances, well-known methods, procedures, components, and circuits have not been described in detail so as not to unnecessarily obscure aspects of the embodiments.

The following description describes various self-powered devices ("SPDs"), systems that include SPDs, and methods for operating SPDs and the systems that they operate in. SPDs are devices that are configured to operate solely under power sources from external energy sources, such as light, thermal, kinetic, wind, wave or other energy. In some embodiments, the SPDs may also be powered by battery power and/or using a power line at ~50 or ~60 Hz.

The SPDs may include a variety of features and/or functionality (i.e., hardware and/or software) to conserve power. In particular, the SPDs may use duty-cycle power management in which the SPDs alternate between low and high-power modes of operation based on a power budget. The SPDs may also alternate between many different power-consumption modes. Furthermore, the SPDs may communicate with computing devices during communication windows. This communication may be periodic and may utilize pre-determined time windows. For systems that include multiple SPDs, a communication priority may be assigned to a given SPD based on its power budget, with a higher priority accorded to devices that have a lower power budget. The SPDs may also combine messages in order to reduce communication overhead and/or give higher priority to providing acknowledgment messages over other types of messages.

FIG. 1 is a block diagram of a system 100 including one or more self-powered devices 102. The system 100 may also include other computing devices, such as desktop or stationary computers 104, laptop computers 106, personal digital assistants 116, cellular telephones, or the like. These computing devices may be connected to one another via one or more routers or switches 110, firewalls 112, wireless access points 114, fixed network connections 108, or other computer networking equipment, such as computers, cables, switches, firewalls, routers, bridges, gateways, or the like. These computing devices are generally located remotely from the SPDs 102.

In some embodiments, the system 100 has a single connection link between a SPD (such as SPD 102-1) and a remote computing device (such as computing device 104-1), while in other embodiments there may be many wired and/or wireless links between one or more of the SPDs 102 and the computing devices 104, such as Universal Serial Bus (USB), Firewire, Ethernet, coaxial cable, copper telephone line, optical fiber, wireless, infra-red, or the like. For example, SPD 102-2 may couple to the system 100 via a WiFi (Wireless Fidelity—IEEE 802.11x wireless networking protocol) access point 114. Also, the system 100 may communicate over private or public networks, such as an intranet and/or the Internet.

Figure 2:
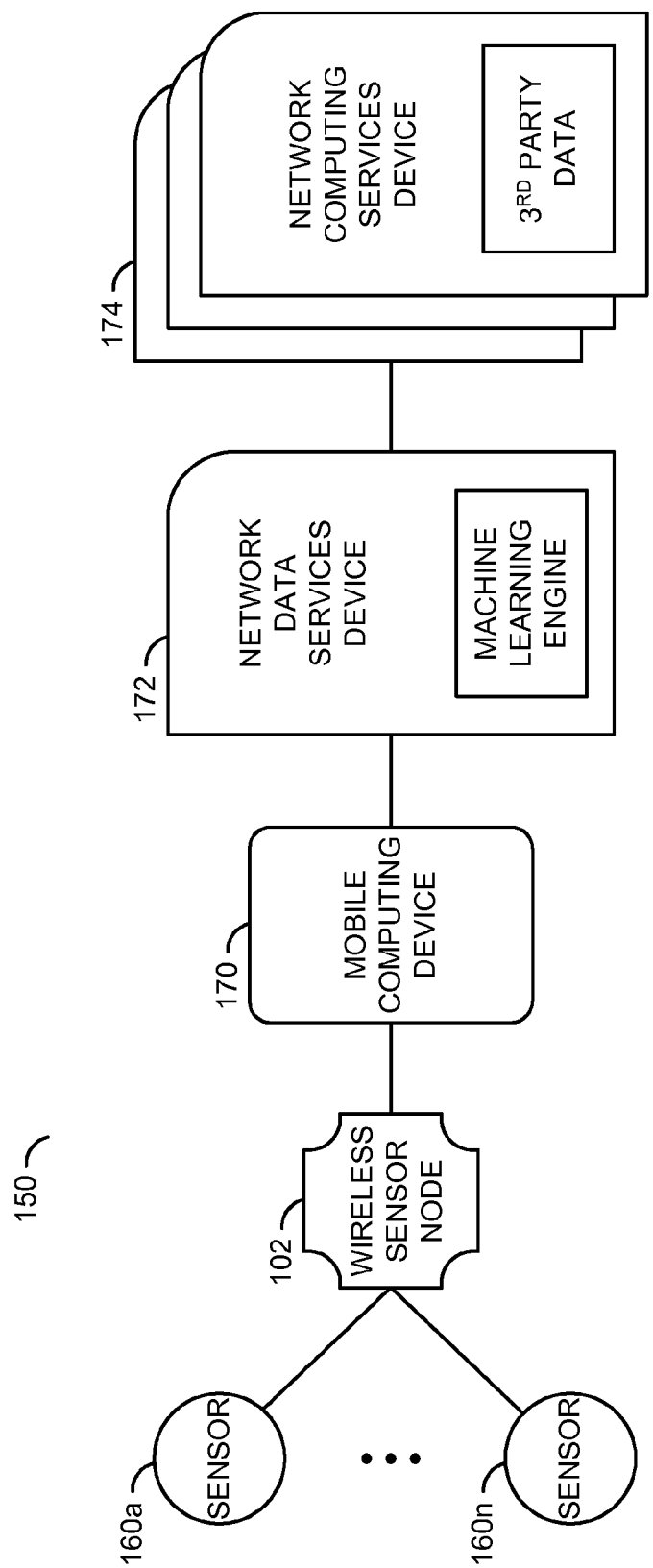
FIG. 2 is a block diagram illustrating a context of the invention.

Referring to FIG. 2, a block diagram of a system 150 is shown implementing a context of the present invention. The system is shown comprising a block 170, a block 172, a block 174, and a block 102. The block 170 may be implemented as a mobile computing device. The block 172 may be implemented as a network data services device. The block 174 may be implemented as a network computing services device. The block 102 may be implemented as a self-powered device, such as a wireless sensor node. In one example, the SPD 102 may be implemented as part of the mobile computing device 170. The SPD 102 is shown receiving inputs from a number of blocks 160a-160n. The blocks 160a-160n may be implemented as sensors. The sensors 160a-160n may also be referenced as sensors A, B, C, etc. The block 160a may represent (or capture) a contextual logic signal. Another block (e.g., 160b) may represent (or capture) a beacon signal. The block 160n may represent (or capture) a proximity signal. Various other signals may be captured by the sensor node 102.

Figure 3:
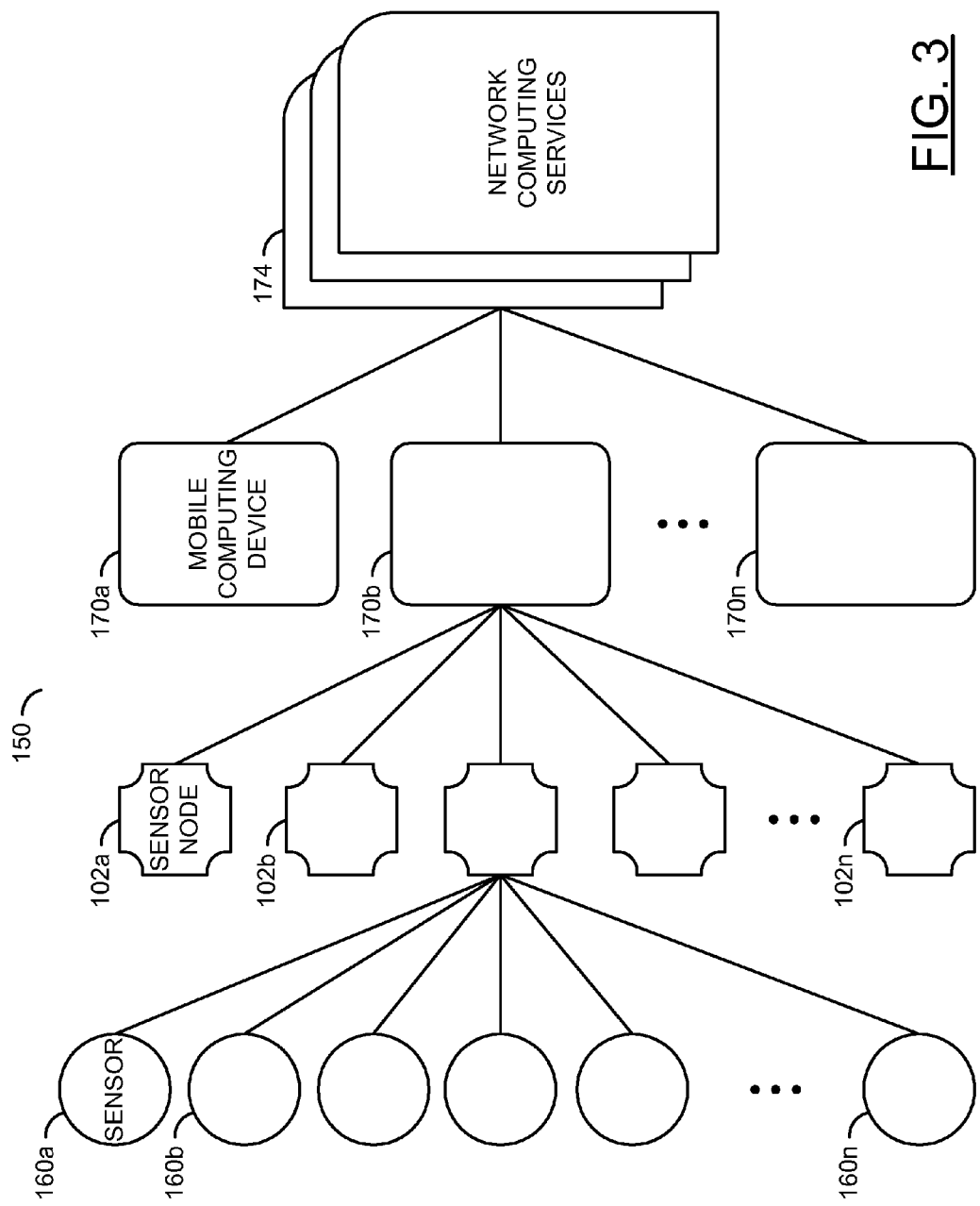
FIG. 3 is a block diagram showing an implementation with multiple sensor nodes.

Referring to FIG. 3, a diagram illustrating a plurality of sensor nodes 102a-102n is shown. The sensor nodes 102a-102n may be implemented as SPDs. The sensor nodes 102a-102n are shown connected to a mobile computing device 170b. However, some of the sensor nodes 102a-102n may be connected to a mobile computing device 170a, while others may be connected to the mobile computing device 170b, while still others may be connected to a mobile computing device 170n. The particular number of sensor nodes 102a-102n and wireless computing devices 170a-170n may be varied to meet the design criteria of a particular implementation.

Each of the sensor nodes 102a-102n may have a power budget based on predicted energy input and/or energy output needs. For example, an energy input need may be a function of past patterns and/or cycles as well as predictable future opportunities to harvest energy from the environment (e.g., weather and/or day/night/seasonal patterns on a photovoltaic device, etc.), at least up to the storage capacity. The predicted energy expenditures may also be based on the predicted power consumed given known upcoming calendar and/or event data as well as other inputs.

A context-aware activation signal may be used to wake up the device 102. The device 102 may begin sensing and/or processing other data, and/or provide power management that is context-aware. A higher priority may be placed on processing certain data. Such data may be data deciding whether to spend more power to transfer the data with less delay and/or more reliability. For example, logic may be implemented to boost radio power based on priority and/or distance from a cellular tower. Such logic may minimize the radio power that may otherwise reduce interference with other sensors.

One or more of sensors 160a-160n may be implemented internally as a beacon signal sensor or as a radiation sensor, a blood glucose sensor, a proximity sensor, chemical/gas sensor, blood pressure sensor, a location sensor, a pollution sensor, a heart rate sensor, a vibration sensor, an air flow sensor, a heart rate variability sensor, an acceleration sensor, a fluid flow sensor, a skin conductance sensor, a position sensor, a direction sensor, a rotation sensor, a weight sensor, a displacement sensor, a machine operations sensor, a fluid retention sensor, a velocity sensor, a leakage sensor, a respiration sensor, a magnetic field, a microphone, an ECG, one or more derived quantities, temperature, image, color, pulse oximetry, physical pressure, odor, drug delivery, air pressure, voltage, container opening, etc. One or more of the sensors 160a-160n, or a combination of the sensors 160a-160n may be implemented internally as part of the sensor node 102 (e.g., within a sensor node housing), or alternatively may be implemented externally (e.g., as a separate sensing device coupled to the sensor node 102). Additionally, the sensors 160a-160n may transmit data directly to a network, in which case the sensor node 102 may receive data as a network data source. Such network data sources may include, for example, environmental or weather data, location-based data, proximity data, etc.

The various sensors 160a-160n may be configured in one of a number of categories, such as a logical condition, a fluid/gas level, a biological process, etc. The logical conditions may be further configured to receive signals from devices such as a beacon, a proximity sensor, a location sensor, a vibration sensor, an acceleration sensor, a position/direction sensor, a displacement velocity sensor, a magnetic field sensor, a temperature sensor, a physical pressure sensor, an air pressure sensor, a force/strain sensor, a moisture/humidity sensor, etc. The fluid/gas level category of sensors may be implemented to receive signals from devices such as a radiation sensor, a chemical/gas sensor, a pollution sensor, an air flow sensor, a fluid flow sensor, a rotation sensor, a machine operations sensor, a leakage sensor, a microphone, an image/color sensor, an odor sensor, a voltage sensor, an electrical sensor, a current sensor, a gyroscope, etc. The biological process category of sensors may be configured to receive signals from devices such as a blood glucose sensor, a blood pressure sensor, a heart rate sensor, a heart rate variability sensor, a skin conductance sensor, a weight measuring device, a fluid retention sensor, a respiration device, and ecg, a pulse oximetry device, a drug delivery device, a container opening device, a medication dispensing device, a microbial device, etc.

Figure 4:
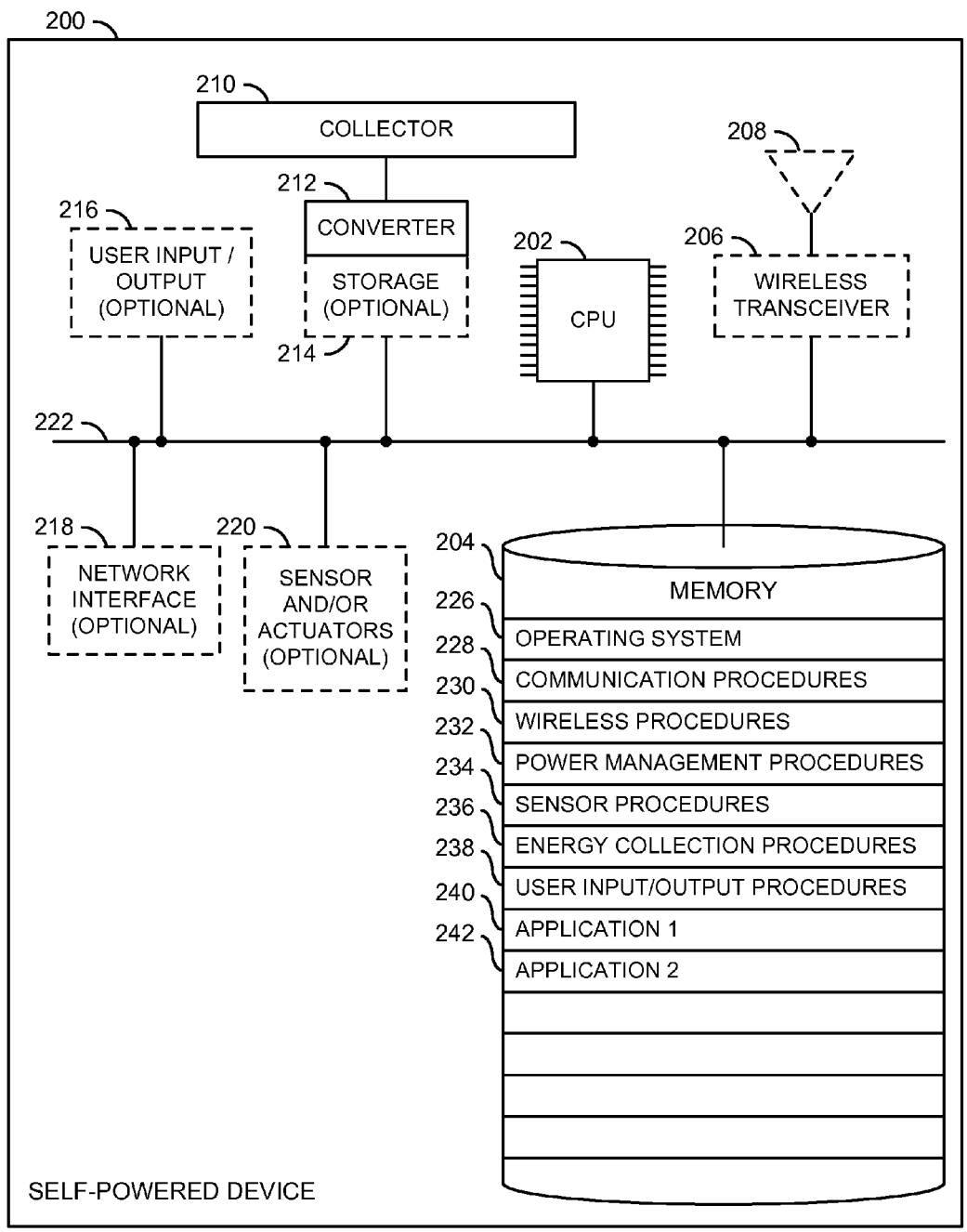
FIG. 4 is a block diagram illustrating an embodiment of a self-powered device.

FIG. 4 is a block diagram of an embodiment of a self-powered devices 102 shown in FIG. 1. SPD 200 contains a plurality of components, such as at least one central processing unit (CPU) 202, memory 204, an optional wireless transceiver 206 coupled to a wireless antenna 208, an energy collector 210, an energy converter 212 with an optional energy storage device 214, optional user input and/or output devices 216, an optional network interface 218, one or more optional sensors and/or output devices like actuators or one or more sensor/actuator interfaces 220 configured to be coupled to the one or more sensors, and at least one bus 222 that connects the aforementioned components. Different embodiments may include some or all of these components. Also in some embodiments, these components are, at least partially, housed within a housing, where the housing may be configured to withstand direct exposure to the elements, such as sun and rain.

The CPU 202 may include programmable or non-programmable circuits, such as ASICs or microcontrollers. This circuitry typically includes non-volatile memory to retain programmed memory 204 functionality, event logs, and/or data, even after a period of power that is insufficient for continued operation. In some embodiments, the data contained in memory 204 may be updated while the SPD is deployed, in response to either local and/or remote instigation, allowing new and/or different capabilities to be added to the functionality.

Using the memory 204, the CPU 202 operates and manages the remainder of the components in the SPD 200. In some embodiments, some SPDs may also operate and manage other SPDs in the system 100 (FIG. 1).

The wireless transceiver 206 includes a transmitter and receiver configured for transmitting and receiving radio signals via the antenna 208.

The energy collector 210 is any suitable mechanism for collecting energy from the surrounding environment in which the SPD is located. For example, the energy collector 210 may include photovoltaic cells that generate electrical energy from light, wind energy generator(s), thermo-electric energy generator(s), kinetic (motion) energy generator(s) (such as piezoelectric devices), magnetic/inductive energy generator(s), chemical-to-electricity generator(s), etc. Furthermore, the energy collector 210 may collect electromagnetic energy from, for example, a system of antenna(s) and rectifying device(s), or other suitable means. In addition, in some embodiments, electrical energy may be collected via signals received through the network interface 218. In other embodiments, energy may be collected from more than one of these sources at the same time, or at different times. Also in some embodiments, energy collection may be supplemented with more traditional power sources, such as replaceable batteries, AC (line) power, an external DC power supply, Power-over-Ethernet, or the like.

In embodiments where the collector 210 generates power from light, the collector may include one or more photovoltaic (PV) cells (also known as "solar cells"). These cells absorb incident radiation (light) and convert that radiation to electrical energy. In addition to the PV cell(s) themselves, the collector may contain any necessary interconnections to form a series and/or parallel array of cells. The properties of the electrical energy generated by a PV cell for a particular intensity of incident light are typically characterized by an open-circuit voltage $V_{OC}$, a short-circuit current $I_{SC}$, and a maximum power delivered $P_{MAX}$, which occurs at a particular output voltage $V_{MAX}$ (where $V_{MAX} \leq V_{OC}$) and output current $I_{MAX}$ (where $I_{MAX} \leq I_{SC}$). (For many PV cells, $I_{SC}$ and $I_{MAX}$ are roughly proportional to the intensity of the incident light across several orders of intensity magnitude, whereas $V_{SC}$ and $V_{MAX}$ are comparatively constant, perhaps changing by a factor of only 2 or 3 across the same large variation of incident lighting conditions).

The PV cells may be based on a number of different technologies, including monocrystalline silicon, multicrystalline silicon, amorphous silicon, thin-film, or other photovoltaic technologies. If the collector 210 uses more than one cell, the cells may be connected together in series to provide a higher voltage than a single cell, in parallel to provide a higher current, or in a hybrid configuration to provide higher current and voltage than a single cell. The cells may be physically arranged at the best possible location to receive incident light, such as above the SPD. In some embodiments, the cells form an integral part of the SPD housing so as to not detract from the appearance of the device. Also in some embodiments, energy collection procedures 236 (described further below) are configured to notify the user of the power output from the collector 210, such that the user may determine the best physical location of the cells for optimal energy collection. For example, the SPD may display an indication or emit an audible tone that varies and/or is representational of the instantaneous collected power. Since the SPD may have the ability to store excess collected energy, the ability to maximize the collected energy over some extended time may be particularly valuable for some SPD applications.

In some embodiments, the SPD 200 is intended to be used over a wide range of lighting conditions, varying from direct sunlight to low-level indoor fluorescent lighting. In these embodiments, the SPD 200 may efficiently collect and convert the incident light energy to usable electricity. Selection of the appropriate type and size of PV cell(s) to use for a particular embodiment of the SPD 200 is typically determined by the corresponding power required, expected radiant light conditions, and cost constraints for that embodiment of the SPD 200.

The energy converter 212 is electrically coupled to the collector 210 and the optional energy storage device 214. The converter 212 converts the energy collected by the collector 210 into a form that is usable by the SPD 200. Typically, this conversion is from one voltage to another, for example from the maximum power voltage (Vmax) of the PV cell(s) to the appropriate supply voltage(s) of the rest of the subsystems in the SPD 200. The storage device 214, which may more generally include an energy storage device such as a battery or capacitor, stores the converted energy for later use by the SPD 200. When excess energy is collected, this excess energy is stored until the battery 214 is fully charged. When there is insufficient energy being collected, the battery 214 provides additional energy until it has discharged or reached a minimum useable level. If the energy from the collector 210 is otherwise deemed adequate for use by the SPD 200, then the battery 214 of the collector may be minimized or eliminated.

For some embodiments, the SPD 200 may need a useful life of many years, and the converter 212 may need to operate over this lifetime without requiring replacement of any internal energy storage device(s), such as the battery 214. This lifetime may need to be maintained over the expected range of operating temperature and humidity, and also after many charge/discharge cycles, in some cases many of these cycles occur every day.

The network interface 218 and/or wireless transceiver 206 may include hardware as well as associated firmware and/or software components. The network interface 218 provides communications connectivity to the remainder of the system 100 (FIG. 1) via wired connections, while the wireless transceiver 206 and antenna 208 provide communications connectivity to the remainder of the system 100 (FIG. 1) via wireless connections. Some embodiments may include both wired and wireless connectivity, while other embodiments may include one or the other. Furthermore, some embodiments may include more than one network interface 218 and/or wireless transceiver 206. In still other embodiments, no network interface 218 or wireless transceiver 206 is provided, as the SPD 200 does not require connectivity to the system 100 (FIG. 1), such as for stand-alone, sense-and-display or sense-and-control applications.

The network interface 218 may be of any suitable type, such as a parallel interface, a serial interface, or the like. These interfaces may be based on a proprietary format or on industry-standard protocols, such as SCSI, printer-style Parallel Port, ESDI, GPIB, PCI, RS-232, Ethernet, I2C, USB, FireWire, Token Ring, DS1, or DS3. For purposes of this discussion, the possible wired connectivity also includes communication through optical fibers. These optical-fiber-based communications protocols may similarly be serial or parallel, and may be based on industry standards (e.g.—Fiber Channel, OC-3, OC-12, etc.) or may be proprietary in nature.

Possible wireless connectivity for the wireless transceiver 206 include radio-based protocols, light-based protocols, magnetic-induction-based protocols, or other methods of communicating that do not require some sort of physical connection. Radio-based interfaces may be based on industry standards, such as Wi-Fi (IEEE 802.11-based protocols), BlueTooth, RFID, and other interfaces known to those skilled in the art, or may be proprietary in nature. Light-based protocols may be industry standard (e.g.—IrDA, or other industry-standard protocols) or may be proprietary in nature.

The user input and/or output devices 216 may include input devices for controlling the SPD 200, such as one or more buttons or switches, a keyboard, a touch screen, a proximity sensor, a microphone, and other input functions known to those skilled in the art, or some combination of these. The user input and/or output devices 216 may also include output devices, such as one or more indicators (such as light-emitting diodes, or passive reflective indicators), multi-digit numeric or alpha-numeric displays, an array of pixels (such as bit-mapped LCD screen or another pixeled array of indicators), speakers, or the like. Inputs and outputs may be initialized and/or updated, through an automatic process and/or through user interaction, and coordinated remotely and/or locally at the installed location.

A number of techniques can be used to conserve the power of the user input/output devices, including operating the output devices at a lower duty cycle or turning the output devices off when available power is low. Depending on the underlying technology, displays may also be dimmed, or operated at reduced contrast or refresh rate, with different encoding/decoding parameters, and other power-conservation techniques known to those skilled in the art. In addition, various forms of input and output functions may be combined, such as the use of proximity sensors as a "user input" so that the display may activate automatically when sensing a user's presence.

The sensory I/O subsystem 220, if present, may include input and/or output functionality. For example, the sensors may include input device(s), such as temperature, humidity, pressure, vibration, light, motion, sound, proximity, flow rate, electrical voltage, and/or electrical current sensors; and/or output device(s), such as relays, electromechanical actuators, heaters, fans, speakers, solenoids, motors, electrical and/or magnetic field generators.

The memory 204 may comprise Random Access Memory (RAM) and/or Read Only Memory (ROM). The memory 204 may include an operating system 226 that has instructions for communicating, processing, accessing, storing, or searching data. Examples of suitable operating systems include embedded LINUX or a proprietary or scaled-down operating system. In addition, memory 204 may include communication procedures 228, wireless procedures 230, power management procedures 232, sensor procedures 234, the energy collection procedures 236, input/output procedures 238, and other applications, such as applications 240 and 242.

The communication procedures 228 are used for communicating with the remainder of the devices in the system 100 (FIG. 1). The communication procedures 228 may also control power management of the wireless transceiver 206 and/or network interface 218, protocol implementation and participation (such as with 802.11b, etc.), persistent network interface or wireless operating parameter management, network interface statistics management, bridging/routing functions, encryption and security services, etc.

The wireless procedures 230 may work in conjunction with the communication procedures 228 to facilitate wireless communication between other devices in the system 100 (FIG. 1) and the SPD 200. In some embodiments, the SPD 200 may also include a wireless network adapter, for example, as at least part of a printed circuit board that controls communication at the data link level (OSI layers 1 and 2) between an external computing device and the SPD 200.

For some embodiments of the SPD, conserving power is of utmost importance. In these embodiments, numerous techniques may be used to reduce power consumption. One or more of these techniques may be implemented using hardware and/or software, such as the power management procedures 232. For example, power consumption may be reduced by maximizing gain of the passive input components; coalescing messages; explicit attention to latencies; access point placement; duty cycling and/or sleep modes; priority ranking based on power levels; static and/or dynamic tokenization of commonly exchanged information blocks; static and/or dynamic distillation of repeated information blocks; periodic (versus continuous) transceiver enable; peer-forwarding based on power disparities; gateway routing based on power disparities; and other power-conservation techniques known to those skilled in the art.

Thus, in some embodiments, the power management procedures 232 are used to reduce power consumption by the SPD 200 by (i) initiating a series of prioritized shut-downs of partial or entire subsystems when the available power from the collector 210 and/or battery 214 becomes insufficient to keep the SPD 200 fully powered, and/or (ii) ensuring partial or entire subsystems are powered back on when sufficient power again becomes available to support additional operation usually according to the priority of each function in the subsystem.

The sensor procedures 234 are used to measure variables from the sensors and/or communicate with output devices. For example, the procedures may be monitoring the sensors for ambient and/or external stimuli, collecting and formatting the information, and then initiating any appropriate action based on that input information. For the output function(s), these procedures initiate, modify, and/or terminate the operation of the output device(s). In conjunction with the power management procedures 232, the sensor procedures 234 also manage the power consumption and operating characteristics of the sensors and/or the output devices 220.

The energy collection procedures 236 are used to control and manage energy collection and storage, such as by (i) monitoring the voltage and current produced by the collector 210 and, based on the known properties of the collector 210, determining the intensity of the input energy (light, heat, motion, etc.) to the collector 210 as well as the overall energy being made available to the SPD 200, (ii) ensuring that the current drawn from the collector 210 is adjusted to maximize the power extracted from the collector 210, (iii) ensuring that the storage device 214 (if present) is properly charged, and/or (iv) monitoring and controlling the available energy stored in the battery 214, etc.

The user input/output procedures 238 control and manage the user input/output devices 216, such as by collecting and formatting (thresholding, debouncing, etc.) the user input, and initiating any appropriate action based on that input. For the output function(s), these procedures are responsible for any necessary formatting/construction of the information to be displayed, as well as updates of that displayed information. In addition to these primary functions, these procedures in conjunction with the power management procedures 232 manage the power consumption of the user input/output devices 216.

Figure 5:
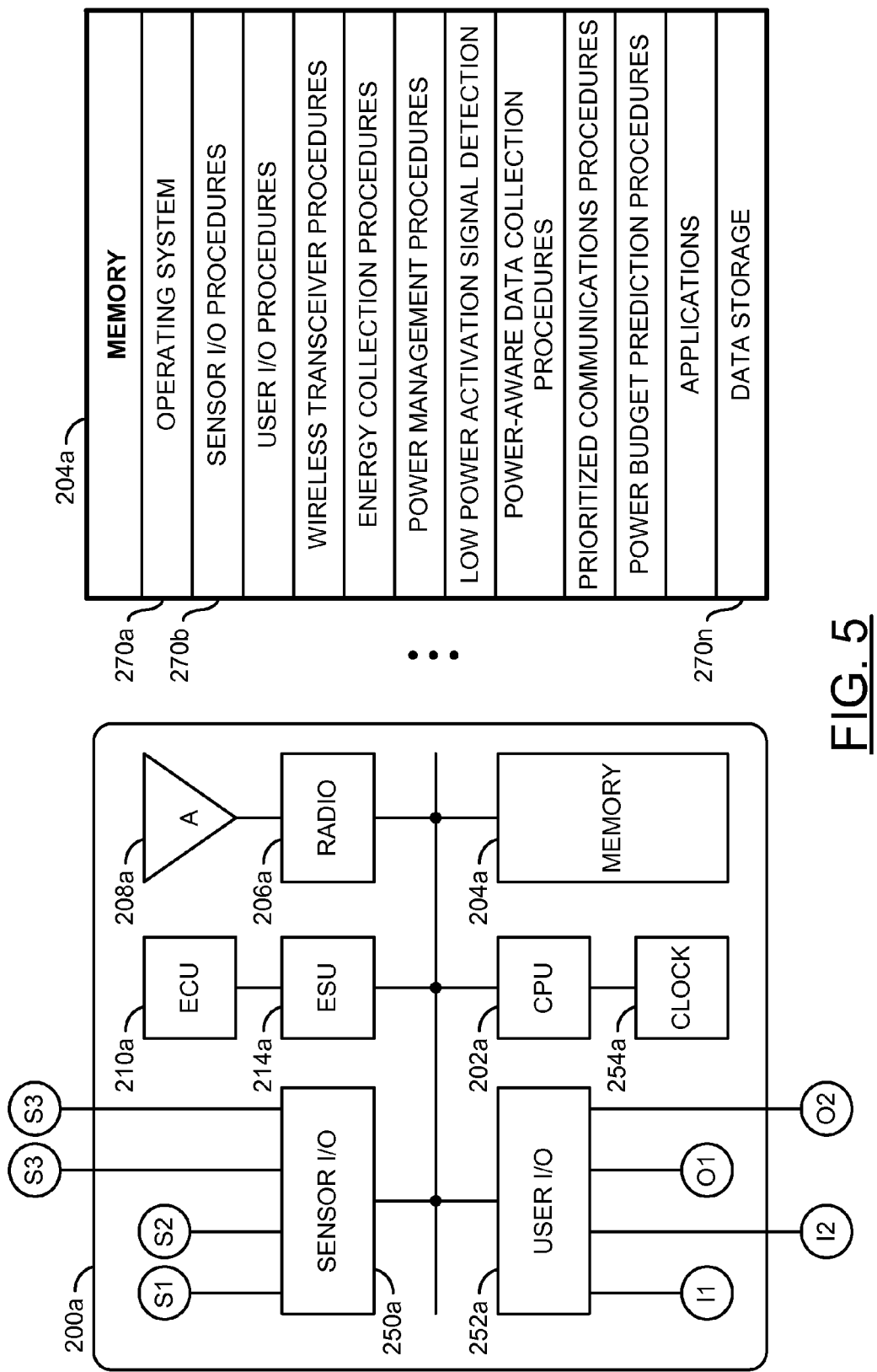
FIG. 5 is a more detailed diagram of one of the sensor nodes.

Referring to FIG. 5, a more detailed diagram of one of the sensor nodes 102a is shown as a block (or circuit) 200a. Each of the self-powered sensor nodes 102a-102n may include a processor, an RF transceiver, an energy storage unit, one or more sensors and a memory. The memory may store a set of instructions executable by the processor to evaluate and selectively store sensed data in the memory or transmit sensed data based on sensor data values and the stored instructions. The remote computing device 170 may be located separately from the sensor node 102a. The device 170 may be selectively coupled to one of the sensor nodes 102a-102n to collect stored data and/or to transmit new instructions to the sensor node.

The sensor node 200a is shown comprising a block 202a, a block 204a, a block 206a, a block 208a, a block 210a, a block 214a, a block 250a, a block 252a, and a block 254a. The block 202a may be implemented as a CPU (or processor) circuit. The block 204a may be implemented as a memory. Details of the memory 204a are shown by the blocks 270a-270n. The block 206a may be implemented as a radio. The block 208a may be implemented as an antenna. The antenna 208a and the radio 206a may form a transceiver. The block 210a may be implemented as an energy capture unit (ECU). The block 214a may be implemented as an energy storage unit (ESU). The block 250a may be implemented as a sensor I/O. The block 252a may be implemented as a user I/O circuit. The block 254a may be implemented as a clock generation circuit.

The output portion of the user I/O 252a may be configured to preset one or more signals to a speaker, a display, an LED, a vibrator, an actuator, an electrical field, a magnetic field, etc. The signals presented to the I/O 252a may be an electrical signal (such as a DC signal), a data signal, etc. The input portion of the user I/O 252a may be configured to receive signals from a microphone, a camera, a light sensor, a motion sensor, a position sensor, a button, a touch screen, a proximity sensor, etc. The signals presented to the I/O 252a may be an electrical signal, such as a DC signal, a data signal, etc.

In one example, the sensor 102 may implement a learning process and/or predictive modeling on the CPU 202a (to be described in more detail in connection with FIGS. 12-14). New rules may be stored in the memory 204a. In another example, the machine learning process(es) may be run on the mobile computing device 170 and/or the network computing services block 174. The processing power and energy to implement the learning process(es) may use more aggregated data and/or processing power than the sensor 102 can process efficiently while running on the energy storage unit 214a. By offloading the processing, the overall energy used by the sensors 102a-102n may be reduced.

Figure 6:
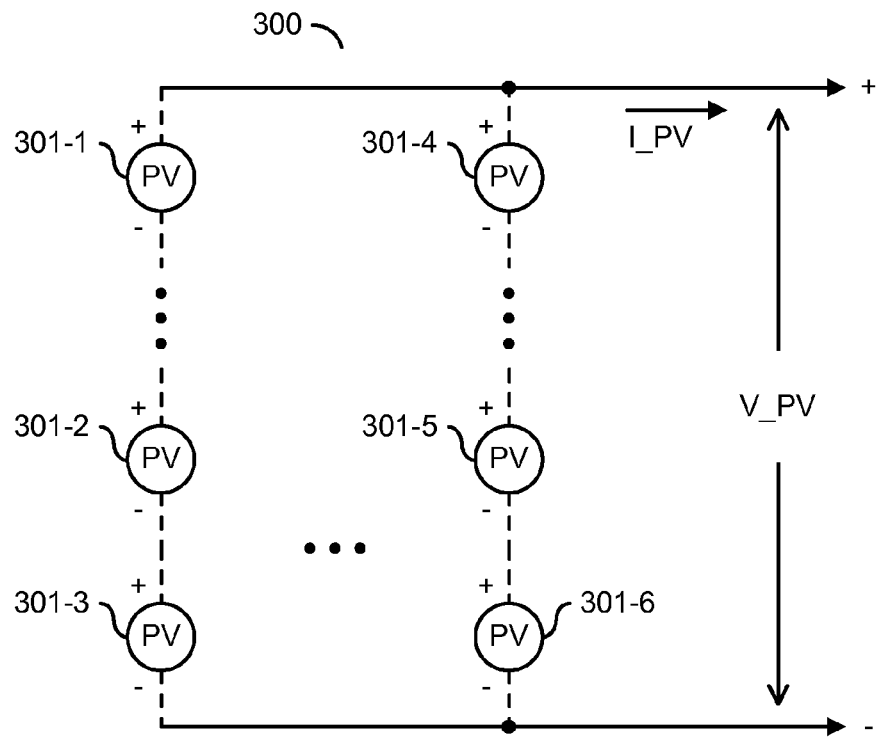
FIG. 6 is a block diagram illustrating an embodiment of a photovoltaic collector of FIG. 4.

FIG. 6 is a block diagram of a photovoltaic collector 300 of a self-powered device, such as the SPD 200 (FIG. 4). As described above, in some embodiments the collector 300 includes one or more PV cells 301 connected together to supply power to the converter 212 (FIG. 4). When illuminated, the interconnected PV cells 301 together produce a current $I_{PV}$ at a voltage $V_{PV}$. In other embodiments, other forms of energy collection and generation of electricity from external energy sources may be used. Whether the generator(s) derive their input power from light, heat, motion, chemical energy, vibration, pressure, network interface communications, other electromagnetic radiation, or some other form of energy, or some combination of these external sources, the electricity produced is characterized by an output voltage at some output current.

An optimal operating point typically exists where the output voltage at a particular output current yields a maximum power from the available input energy and operation at this optimal operating point may be achieved using the methods described below. Furthermore, more than one of these PV cells 301 may be combined as shown using PV cells of the same or different types. Furthermore, in some embodiments, switching mechanisms are provided so that the presence of one set of PV cells 301 do not adversely affect the operation of another set of PV cells 301, such as when one set is operating, and another set is not operating.

Figure 7:
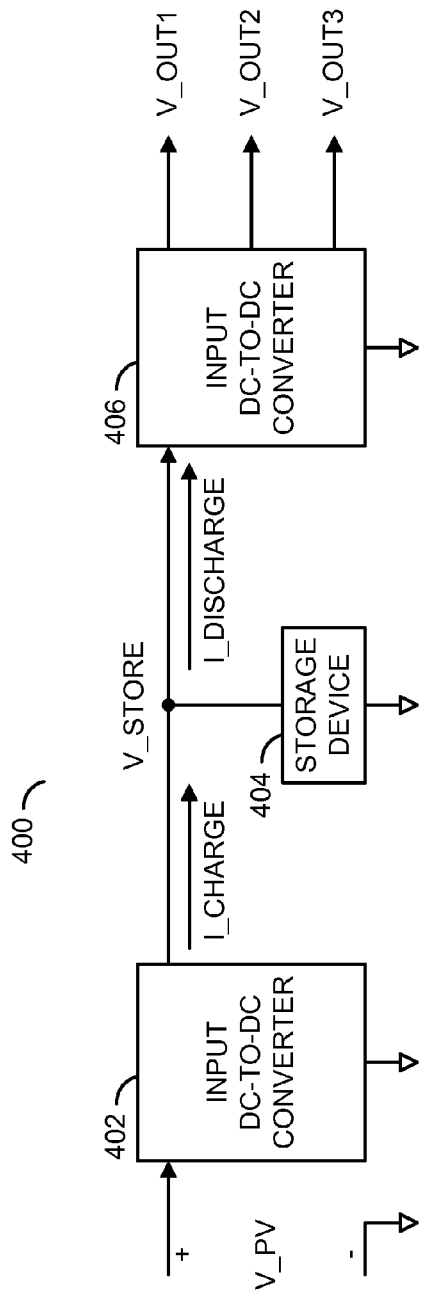
FIG. 7 is a block diagram illustrating an embodiment of a converter and storage system of FIG. 4.

FIG. 7 is a block diagram illustrating an embodiment of a converter 400, such as the converter 212 (FIG. 4). In some embodiments, the converter 400 includes an input DC-to-DC converter 402, a storage device 404, and an output DC-to-DC converter 406. The input DC-to-DC converter 402 transforms the current coming from the collector at $V_{PV}$ to the voltage $V_{STORE}$ of the storage device 404. The output DC-to-DC converter 406 transforms the current flowing from the storage device 404 to the voltage(s) used by the other subsystems in the SPD, known as $V_{OUT1}$, $V_{OUT2}$, etc. These output voltages may be the same or different depending on the requirements of the SPD. If present, the storage device 404 includes one or more physical rechargeable storage devices interconnected in series and/or parallel that meet the requirements of that embodiment. One should note that in some embodiments, a storage device may not be required. In these embodiments, all that is required is to convert the input voltage derived from the collector 210 (FIG. 4) to the output voltage required by the rest of the subsystems in the SPD. Additionally, other embodiments do not require the input DC-to-DC converter 406 if the optimal voltage supplied by the collector 210 (FIG. 4) is within a predefined acceptable range. Likewise, some embodiments do not require the output DC-to-DC converter 406 if the rest of the subsystems in the SPD are able to operate using the output voltage from the storage device 404.

Figure 8:
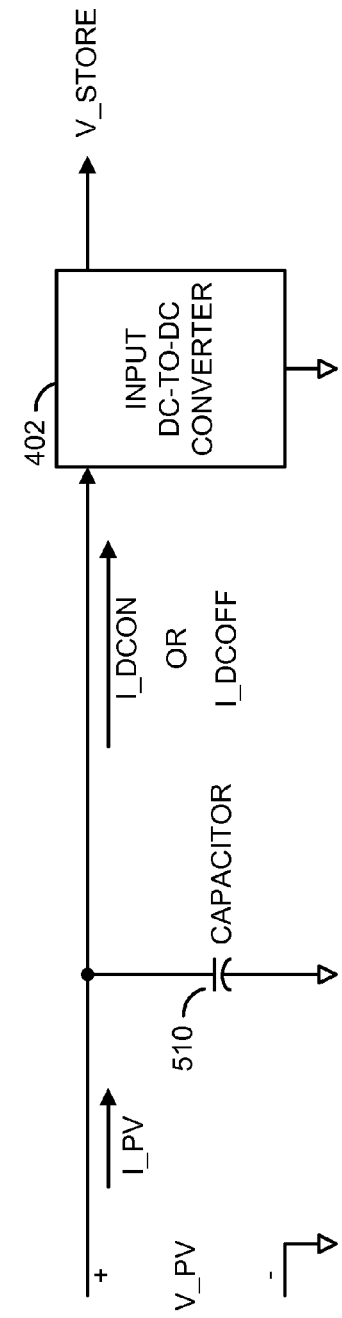
FIG. 8 is a block diagram illustrating an embodiment of the current flow from the collector of FIG. 4.

FIG. 8 is a block diagram illustrating an embodiment of the current flow 500 from the collector 210 (FIG. 4). In order to maximize the power taken from the collector 210 (FIG. 4), the converter 212 (FIG. 4) attempts to maintain the current flowing from the PV cells 301 (FIG. 6) at about $I_{MAX}$, which yields a voltage of approximately $V_{MAX}$. Since the optimal voltage $V_{MAX}$ of the collector 210 (FIG. 4) may be different from the voltage $V_{STORE}$ of the storage device 404 (FIG. 7), some embodiments may make use of a DC-to-DC converter (as described above) to make the voltage transformation, preferably with minimal power loss. Suitable DC-to-DC converters operate in a switching mode, which is to say that they periodically draw some current to "charge" an inductor, then "discharge" that current (at a different voltage) into the load. These two operations may then be repeated when more power needs to be transferred.

For DC-to-DC converters, the time that the current is being drawn into the converter to charge the inductor may be referred to as $T_{ON}$, and the time that the DC-to-DC converter is transferring the stored charge to its load (or is otherwise waiting for the next cycle to begin) may be referred to as $T_{OFF}$. The full cycle time of the converter may be expressed as $T_{ON}+T_{OFF}$. Similarly, the current drawn into the DC-to-DC converter when it is on may be referred to as $I_{DCON}$, and the current drawn into it when it is discharging its inductor to the load (or it is otherwise waiting for the next cycle to begin) may be referred to as $I_{DCOFF}$. In order to maintain the maximum power output from the collector, the time average of these two converter input currents may be kept to about $I_{MAX}$.

For most switching DC-to-DC converters, $I_{DCOFF}$ is approximately equal to 0, and assuming that the converter is on for only a small fraction of its full cycle time ($T_{ON}+T_{OFF}$), the $I_{DCON}$ usually needs to be greater than $I_{MAX}$. Unfortunately, for a DC-to-DC converter operating in these conditions connected directly to the collector 210 (FIG. 4), the current drawn alternates between $I_{DCON}$ during $T_{ON}$ and approximately 0 during $T_{OFF}$, neither of which are the optimal current $I_{MAX}$. Therefore, to maintain the optimal current drawn from the collector at about $I_{MAX}$, a capacitor 510 or other charge-storage device may be connected across the output of the collector, as shown. With the addition of the capacitor 510, when the DC-to-DC converter is on, the net current into the capacitor is $I_{PV}-I_{DCON}$. Since $I_{DCON}$ is typically greater in magnitude than $I_{PV}$, the capacitor 510 is therefore discharging during $T_{ON}$. During $T_{OFF}$, typically $I_{DCOFF} \approx 0$, so the net current into the capacitor 510 is $I_{PV}-I_{DCOFF} \approx I_{PV}$, and the capacitor 510 is charging. The average value of the current into the capacitor 510 may be expressed as $$\frac{(I_{PV}-I_{DCON}) \cdot T_{ON} + (I_{PV}) \cdot T_{OFF}}{T_{ON}+T_{OFF}}$$

which may be set to be approximately $I_{MAX}$ for efficient operation of the collector 210 (FIG. 4). For large capacitances, the drop in the voltage of the capacitor 510 during $T_{ON}$ may be very small, and the rise in the voltage during $T_{OFF}$ may likewise be very small.

Since the average current drawn from the collector 210 (FIG. 4), $I_{PV}$, is now maintained at approximately $I_{MAX}$, the average voltage on the capacitor 510 (and the collector 210 in FIG. 4) is, therefore, approximately $V_{MAX}$. The value of the capacitor 510 is chosen such that the variation in voltage is small enough to be acceptably close to $V_{MAX}$.

As previously stated, the maximum power of one of the PV cells 301 (FIG. 6) typically occurs at a certain current $I_{MAX}$, and at a certain voltage $V_{MAX}$. However, the actual values of this operating point may change with incident light intensity, operating temperature, and may also vary from device to device due to processing and manufacturing differences. This may make it difficult to predetermine the ideal operating point values for any particular device at any particular light intensity and temperature. In some embodiments, the ideal operating point for the PV cell(s) 301 (FIG. 6) may be determined automatically and, furthermore, may be adjusted automatically as operating conditions change, using the following method.

To determine the power being delivered by the converter 212 (FIG. 4), the energy collection procedures 236 (FIG. 4) periodically measure the current $I_{PV}$ from the collector 210 (FIG. 4), and the voltage $V_{PV}$ on the collector 210 (FIG. 4), and multiplies these two values together. One way to increase the average current drawn by the input DC-to-DC converter 402, usually resulting in a reduced $V_{PV}$, is by increasing the on time of the DC-to-DC converter, $T_{ON}$. Likewise, by reducing $T_{ON}$, the average current drawn from the collector 210 (FIG. 4) may be decreased, allowing $V_{PV}$ to increase. Other means to increase or decrease the average current drawn by the input DC-to DC converter may be used.

To maintain the maximum power from the collector 210 (FIG. 4) under varying operating conditions, the energy collection procedures 236 (FIG. 4) (i) measure the power from the collector 210 (FIG. 4), (ii) increase $I_{PV}$ by a small amount, such as 0.1% to 1% of the full value, (iii) measure the power from the collector 210 (FIG. 4), (iv) if power has increased, go to step (ii) above, otherwise continue, (v) decrease $I_{PV}$ by a small amount, such as 0.1% to 1% of the full value, (vi) measure the power from the collector 210 (FIG. 4), (vii) if power has increased, go to step (v) above, otherwise go to step (ii) above. Using this process, the controller may continuously "hunt" for the maximum power delivered from the collector 210 (FIG. 4). As the operating conditions vary, this procedure may allow those changes to be tracked by the SPD, allowing the energy collection procedures to continuously adjust the operating point of the collector 210 (FIG. 4) in order to achieve maximum power delivery.

To prevent operating at only either the maximum current $I_{SC}$ or the maximum voltage $V_{OC}$, which may happen under very low lighting and/or other extreme conditions, when it may be difficult to determine how the power from the collector 210 (FIG. 4) has actually changed, the procedure may be modified to switch the direction of the "hunt" if the change in $I_{PV}$ value has moved in the same direction for the last 10 or 20 (or other appropriate number of) steps or iterations. This means that under extreme operating conditions, the operating point of the collector 210 (FIG. 4) may be scanned across a wide range of possible operating points to increase the likelihood that the maximum power delivery point is found. In some embodiments, to ensure that the storage device 404 (FIG. 7) in the converter 212 (FIG. 4) is maintained within its safe operating parameters, its voltage and/or current may be continuously monitored by the controller.

When the maximum capacity of the battery 214 (FIG. 4) is reached, the controller typically turns off the input DC-to-DC converter. This may be accomplished by setting the on time $T_{ON}$ of the DC-to-DC converter to approximately zero, or otherwise disabling its operation.

When the energy held in the battery 214 (FIG. 4) gets low, and/or is not otherwise being sufficiently recharged from the collector 210 (FIG. 4), the energy collection procedures 236 (FIG. 4) may reduce the power consumption of the other subsystems in the SPD. In some embodiments, the energy collection procedures 236 (FIG. 4) may compare the energy in the battery 214 (FIG. 4) against one or more predetermined low-energy thresholds, and once the threshold(s) is crossed, the energy collection procedures 236 (FIG. 4) may take one or more action(s) to reduce the energy demand from the battery 214 (FIG. 4), if appropriate.

When the remaining energy in the battery 214 (FIG. 4) drops to the lowest threshold, below which proper operation of the SPD may no longer be guaranteed, in some embodiments, the energy collection procedures 236 (FIG. 4) and/or the power management procedures 232 (FIG. 4) initiate a series of controlled shutdowns of any subsystems that remain on, including the majority of the SPD itself. Once this is accomplished, the SPD may be held in a reset condition, through the use of an automatic circuit until sufficient energy is delivered to the battery 214 (FIG. 4) to allow initiation of SPD startup.

When the energy level of the battery 214 (FIG. 4) transitions from below the lowest threshold to above that threshold, a subset of the SPD may be automatically brought out of reset and may begin to turn on various subsystems of the SPD, typically in a prioritized sequence, depending upon how much energy is in the battery 214 (FIG. 4), and/or how quickly it is being recharged. As increasing energy becomes available in the battery 214 (FIG. 4) and/or more power is available from the converter 212 (FIG. 4), and the various low-power thresholds are overcome, more and more SPD subsystems may be brought out of any low-power states until eventually the SPD may be returned to its full-power mode.

To eliminate unnecessarily repeated or oscillatory transitions between various low-power states, some embodiments may include an appropriate amount of hysteresis to be added to each threshold. This ensures that as a low-power threshold is approached in the decreasing direction, a slightly lower value than the nominal threshold value may be required to be achieved before transitioning the SPD to the next lower-power state. Likewise, when the energy in the battery 214 (FIG. 4) is increasing and that threshold is approached, a slightly higher value than the nominal threshold value may be required to be achieved before transitioning from the previous low-power state. The amount of hysteresis for each threshold level is chosen to minimize oscillatory transitions, yet not make the actual transition points too different from the nominal threshold value.

Figure 9:
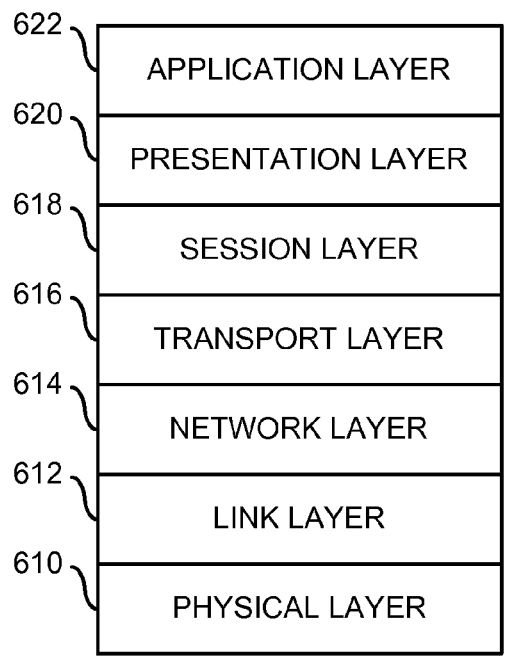
FIG. 9 illustrates an embodiment of a software protocol stack for a network interface of FIG. 4.

In a given embodiment, there may be zero or more network interfaces, such as the network interface 218 (FIG. 4) of one or more types. The specific type(s) of network interfaces utilized in an SPD do not necessarily imply a specific network behavior, and may include technologies such as, but not limited to, wired interfaces (RS-232, RS-485, USB, Ethernet, FDDI, Fiber Channel, or any other wire or cable-based protocol, standard or proprietary) and wireless interfaces (Bluetooth, Zigbee, IrDA, UWB, Wi-Fi, GPRS, GSM, CDMA, or any other wireless protocol, standard or proprietary). As illustrated in FIG. 9, typically each network interface includes the following hardware and software layers, as defined by the classic OSI networking reference model: physical layer 610 (such as RS-232, 100BaseT, T1 and radio), link layer 612 (such as Ethernet, FDDI, Wi-Fi and HDLC), network layer 614 (such as IP, IPX and similar protocols), transport layer 616 (such as TCP, UDP, RTP and SMB). Higher layers, such as session layer 618, presentation layer 620 and application layer 622, may be viewed as part of the client software, so are not discussed as part of the network interface itself.

In many embodiments, one of the key attributes of the network interface may be its operation on an extremely low power budget. This is discussed further below.

Numerous issues may affect power usage in an implementation of the network interface, including range requirements, the amount of power consumed per unit of time, the amount of power consumed per bit conveyed, and any needed networking layer overhead from the associated network interface software stack and its impact on the power consumed in generating, transmitting, receiving, and processing that overhead.

In general, the power consumption of a communication subsystem increases with the amount of data communicated and the distance that the communications traverse. Similarly, a low-bit-rate communications system may generally be designed to consume less power per unit of operating time than a high-bit-rate system, but may have a higher cost per bit communicated. Finally, communication subsystems based on newer, specialized, and/or proprietary communications protocols often consume less power for a given transmission distance or bit rate than existing, general-purpose, and/or standardized protocols.

Keeping in mind these general characteristics, the design, implementation, and usage of each network interface for a particular embodiment of an SPD may have various constraints including (but not limited to): The need for wireless vs. wired operation. The distance required for data transmission. The volume of data to be transferred for the SPD application. The sensitivity of the application to data stream latency. The frequency of communications needed to meet protocol requirements. Any compatibility requirements with installed network infrastructure. The average power available to the network interface subsystem. The tolerable cost and/or size of the subsystem.

Several methods to reduce average power in the network interface subsystem are described here. Embodiments of the SPD may use one, many, all, or none of these methods and strategies. Some strategies outlined are applicable to any network interface technology while others are applicable only to one or some network interface technologies.

One class of radio computer network technology is based on the IEEE 802.11 set of standards, commonly referred to as "Wi-Fi". Versions of this standard support various transmission distances and bit rates, and existing equipment may support more than one version simultaneously. In an exemplary embodiment, therefore, the SPD may be used with one or more IEEE 802.11 "Wi-Fi" Protocols. Implementation in embodiments that support a compatible version of Wi-Fi may typically not require installation of an additional wireless access point(s) in the external computer network. Instead, an existing, i.e., an already-installed, access point(s) may typically be used. In some cases, the access point functionality may already be incorporated into the remote device(s), such as computer devices 104 (FIG. 1), with which the SPD(s) 102 (FIG. 1) communicate.

An additional advantage of using a Wi-Fi radio is that the components needed to implement the radio are often readily available, physically small, and relatively inexpensive. The Wi-Fi data rate may also be high enough for most SPD applications. However, the existing component sets may consume relatively large amounts of power, even when not transmitting. Thus, in some embodiments, various schemes to dramatically reduce the power consumption of the Wi-Fi radio may be employed.

In some embodiments, the SPD includes sleep modes and/or duty-cycle control. Selectively shutting down or turning off some or all of circuits in the physical-layer networking subsystems may offer the ability to reduce power consumption. These features are typically referred to as "sleep modes". The duty cycle of such subsystems is the ratio of the time the subsystem spends in the "on" or "awake" state compared with the total time. Assuming the higher-layer protocols and/or applications may tolerate it, adjusting the duty-cycle of the network interface may allow the controller to reduce power consumption of the subsystem without requiring additional external hardware and/or reconfiguration of the device.

For some network interface technologies, a high-rate of power consumption when active may be more than offset by the low power consumption from remaining in sleep mode the majority of the time and powering the subsystem for the minimum time necessary to affect communication. Thus, for a given amount of data to be transferred, some implementations of the network interface may have a high power-per-unit-of-time cost but may still be efficient in the cost of the power per bit communicated.

This approach accepts a high power draw for short periods of time because it seeks to optimize the power per bit communicated through the network interface. It is possible for such an implementation to consume less average power than an implementation using a low-bit-rate protocol because the network interface may spend substantially less time powered on even though the network interface is drawing more power when it is powered on.

Often, it is not known beforehand when a message must be sent from an SPD to a remote device such as one of the computer devices 104 (FIG. 1) and vice-versa. In particular, if the network interface in an embodiment is operated with duty-cycle control (as described above and further below) then its transceiver spends some of its time active, and some of its time disabled in a sleep mode. If a message is to be properly communicated, the transmitting device must be enabled and the receiving device must likewise be enabled in order to detect the message and properly receive it.

When there are no power consumption constraints, the transceiver circuits in each device may be left enabled all of the time. In some embodiments, however, there may be power consumption constraints, so it may be desirable to use duty-cycle control as a power management technique. To ensure that message communication may occur reliably under these conditions, the duty cycles between the transmitting and receiving devices need to be aligned such that the transceivers are enabled in each device at the same time.

Figure 10:
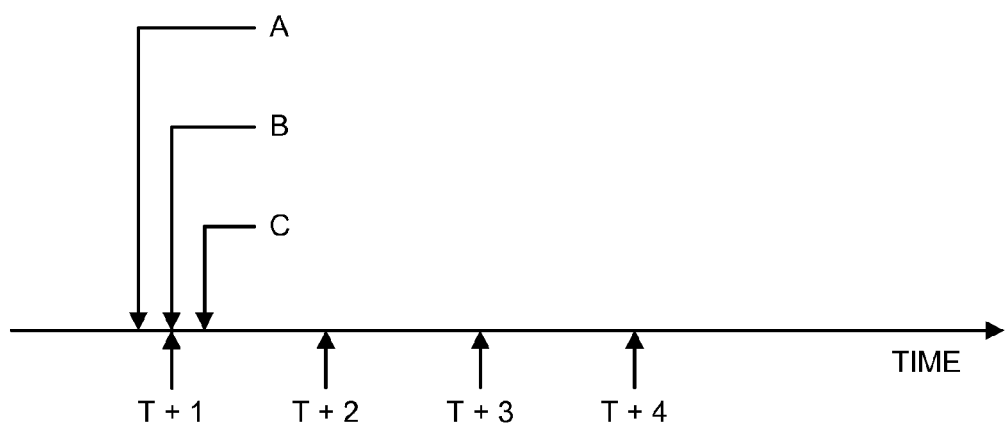
FIG. 10 illustrates periodic enabling of a transceiver of FIG. 4.

By using periodic communication windows, the duty-cycle alignment may be achieved through synchronization. This assures that the transmitter in the sending device and the receiver in the receiving device are enabled at the same time. This is illustrated in FIG. 10, in which (a) transceivers are enabled just prior to the communication time window, (b) communication occurs, often lasting just long enough to initiate a session (see FIG. 9) that will span numerous enable periods, and (c) each SPD shuts down its transceiver as soon as it can, but no later than after some limited period of time.

In some embodiments, therefore, periodic transceiver enabling is used. Different network interface protocols may support such enabling. For example, a sparsely populated Wi-Fi network may be used in conjunction with a periodic beacon signal having an appropriate rate. The periodic beacon signal may be adjustable. The periodic beacon signal notifies some or all radio NICs (the Wi-Fi nomenclature for a remote node versus an access point) of its presence, timestamp, supported rates, capabilities, and an indication of any traffic waiting to be transmitted (TIM). In concert with the beacon signal, a Wi-Fi NIC may be kept in sleep mode for an interval just short of the beacon signal interval, and then be automatically woken-up in time to receive the beacon signal. The NIC may then determine if there is any traffic queued up for it to receive, and then receive the traffic (if any). It may then send the pending items it has queued for transmission (if any) and then go to sleep again until the next beacon signal interval.

In some embodiments, to reduce the power consumed by a Wi-Fi radio subsystem that uses commercially-available chip sets, yet still maintain an adequate communications bit-rate, the radio may be kept in a low-power "off" or "standby" mode as much as possible. In some embodiments, the standby mode may be used the majority of the time. One way to do this is to take advantage of Wi-Fi's beacon feature, described above, whereby the Wi-Fi access point associated with an SPD periodically polls the SPD (and any other associated remote Wi-Fi devices the access point is aware of) at regular pre-set intervals. The beacon signal interval may often be set at once per 100 ms (although a different interval may instead be configured in the access point). By monitoring the beacon signal activity, the SPD determines the beacon signal period. Thus, the SPD knows when the next beacon signal will occur, thus when it must awaken to receive the next beacon signal.

By placing the SPD's radio in a low-power "off" or "standby" mode until just before the beacon signal arrives, the SPD's controller may ensure that the SPD radio is active during the beacon signal time so as to transfer any data to or from the access point, and then return the radio to its low-power state as soon as the data transfer is complete. Assuming the beacon signal interval is not set to be unreasonably short, this strategy may allow the SPD radio to spend the large majority of its time in a very low power state yet still maintain sufficiently low transmission latencies and adequate data throughput to support typical SPD operation.

Some techniques used to reduce power consumption in the network may benefit from having an SPD synchronized in some way with one or more other nodes and/or access points in the network. If all nodes and/or access points participating in the communications exchange are synchronized then they will know when to enable their transceivers for periodic communications.

In one embodiment, synchronization may be achieved using the Network Time Protocol (NTP) that is typically available in computer networks that adhere to the Internet Protocol (IP) set of standards. By utilizing the NTP facilities available in the network, an SPD and other nodes may accurately determine the time of day and, from this information, facilitate their periodic communications.

In another embodiment, synchronization may be achieved by leaving the SPD's network interface receiver enabled long enough to receive several periodic transmissions. By observing the periodicity of the transmissions, the SPD may then enter a sleep state between the periodic transmissions, gradually increasing the length of the intervening sleep states until the duty cycle of the network interface is low enough to achieve the desired power savings but high enough to ensure sufficient probability of being awake during the periodic transmissions.

Moreover, standardized communications between computers typically operate in layers. However, additional layers increase overhead costs that negatively impact efficiency, as measured in terms of payload data communicated per unit of energy and/or power consumed. Coalescing messages is a systems approach to efficiency, and allows for communications to be optimized by having additional knowledge about the communicating devices and/or the protocols they are using to communicate.

In a typical embodiment, messages for various purposes flow between the SPD and one or more remote device(s). In the event that more than one such message is going to the same remote device, it may be possible to examine the pending messages destined for that remote device and combine the messages into a form of multi-block message so that layering overheads are minimized.

Combining or coalescing messages may be combined with periodic transceiver enabling and duty-cycle control to create a natural collection or "queuing" point in time where opportunities for combining the messages prior to communication may be found.

Most messages to and from an SPD may be categorized into various classes. Attention messages include a message from a client node on the network requesting information or service from a server node. Information messages include a message to or from an SPD containing information. This message may be in response to an Attention Message and/or may contain unsolicited information. Ack/Nak Messages include a message to or from an SPD indicating that a previous message is being acknowledged, or negatively acknowledged.

In an exemplary embodiment of coalescing, an information block consisting of 1000 bytes in total of data is to be sent from a remote device to an SPD. Even though the 1000 bytes are to be sent from the same remote device to the same SPD, because of the way the information block is typically created using modern software methods, it is often sent as a series of smaller messages, each consisting of 50 to 100 bytes of payload data. Each message, if sent individually over Ethernet, typically may have a wrapper that includes the UDP header, the IP header, and the 802.3 header, plus the preamble. In total, this may double the number of bits transmitted in each message, as compared with just the bits in the payload data. Therefore, coalescing these messages into a multi-block message may require a frame to indicate the coalescing behavior (perhaps 4 bytes) and an additional approximately 2 bytes per block of data to demarcate each sub-block for later extraction. This multi-block message may still have the UDP header, the IP header, the 802.3 header, and the preamble, but only one for each of these, thus requiring approximately one tenth the overhead necessary as compared with no coalescing of the information.

Communicating a message from one computer to another generally involves some form of acknowledgment (positive or negative) that the message was seen, acted on, or otherwise processed. When an SPD sends a message to a remote device, the time that the SPD spends waiting for acknowledgment to return from the remote device may often be time that the SPD is waiting with its network interface and/or other subsystems powered on. Minimizing the time waiting for the return Ack/Nak Message minimizes the overall time that the SPD subsystems remain powered on, thus reducing the average power consumption of the SPD.

There are a variety of ways such latency may be reduced or minimized, including: Arrange for the remote device to acknowledge a message immediately upon its receipt by the remote device, and not to wait for the message to be fully processed and/or any message-requested action to be completed. Arrange for the remote device to acknowledge a message as a high-priority task in its internal task-scheduling algorithm. Allow the remote device to coalesce the Ack/Nak Messages it needs to return to an SPD and then let the SPD "decoalesce" them upon receipt for distribution to the SPD's internal sending entities. The coalescing of Ack/Nak Messages by the remote device may be performed separately for each SPD that is communicating with the remote device. Process the messages where the sender is awaiting a response preferentially over other message types. Some, all, or none of the above methods may be used in an SPD and/or remote device implementation in order to reduce the power consumption and/or otherwise increase the operating efficiency of an SPD.

In applications where a remote server is handling information for multiple requesting SPDs, there may arise cases where some SPDs have a lower average power budget than others. In such cases, the scheduling of resources when dealing with multiple SPDs simultaneously may favor those with lower power budgets to minimize the impact of latency on their power budgets.

Figure 11:
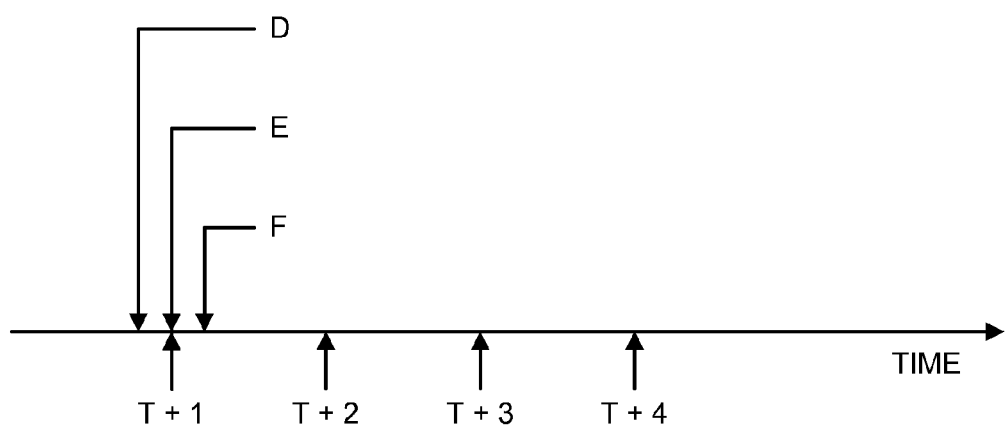
FIG. 11 illustrates coordinated communication.

In the case of multiple SPDs requesting communication in an environment using periodic transceiver enabling, one technique to optimize power consumption includes a coordinating element (such as the server handling the requests) giving preferential permission to communicate to the energy-poor SPD(s) ahead of the energy-rich SPD(s) during the period of permitted communication. The energy-poor SPD(s) may then disable their network interfaces(s) and/or other subsystems sooner, better conserving their less-abundant power than the energy-rich SPDs. This approach is illustrated in FIG. 11, in which (d) transceivers are enabled just prior to the communication time window, (e) numerous SPDs vie for the ability to communicate so that a coordinating element (such as a server) utilizes a token scheme to control which SPDs communicate thereby allowing energy-poor nodes to communicate preferentially in order to allow them to disable their transceivers sooner and save power, and (f) each SPD shuts down its transceiver as soon as it can, but no later than after some predetermined and limited period of time.

In the case of multiple SPDs requesting service from a remote device, another technique to optimize power consumption includes the server preferentially servicing the power-poor SPD(s) ahead of the energy-rich SPD(s) if requests from more than one SPD are pending completion at the server. Minimizing the response time to the energy-poor SPDs may help them conserve their less-abundant power by allowing them to place their network interface(s) and/or other subsystems in a sleep mode sooner at the expense of more energy-rich SPDs.

As a refinement on the ideas of periodic transceiver enable and duty-cycle power management, pseudo-time slot allocation may be used. This technique recognizes that multiple SPDs operating in a network or ecosystem may experience contention in communicating, especially to a central point such as a Wi-Fi access point and/or a server. This technique allows each client SPD to attempt to exercise its periodic communications during the same periodic interval but each in a time slot that occurs at a different, pre-assigned phase within the periodic interval. Just prior to the periodic communications interval, the master/server node may queue up time slot assignment messages, one destined to each client SPD, indicating when the SPD may exercise its right to communicate within the periodic interval. Alternatively, another method of assigning time slots may be used as long as only one client SPD is assigned a particular time slot or as long as there is an effective way to handle time-slot conflict issues.

At the beginning of the periodic interval, all SPDs accept one (or a small number of) message(s) to allow the time slot assignment message to be received. Alternatively, this part of the protocol may be eliminated if the time slots have already been assigned through some other method. If the assigned time slot for an SPD has not yet arrived, the SPD may place its network interface and/or other subsystems in a sleep state (if they are not already in such a state) and reawaken them just before the time slot arrives. When the assigned time slot does arrive, the appropriate SPD may then transfer any pending messages with the master/server node.

The method(s) used to assign the order of the time slots may use any number of algorithms or procedures, such as pseudo-random, round-robin, fairness, and other algorithms known to those skilled in the art, and may also offer the most energy-poor SPD in the ecosystem the first right to communicate, followed by the next-most-energy-poor SPD, and so on in an orderly progression. The scheduling algorithms may take advantage of information such as the energy available to the SPD, the estimated energy it may need to communicate, its communications bandwidth and/or latency requirements, how often it has communicated in the past, and/or other relevant information.

In a communications system between computers that implement an application having a predefined function, blocks of information are typically communicated repeatedly, and the contents of some of the blocks may often be known beforehand. For a communications subsystem where every communicated bit represents another reduction in the available power, replacing large blocks of this type with reference tags may reduce the number of bits that must be exchanged to accomplish a given functionality. Receipt of a particular reference tag may indicate to the receiving device that it may replace the reference tag with the associated block of information.

In an exemplary embodiment, an SPD is used to display a calendar. A calendar view may be represented by a series of visual "planes". Each plane may represent something either new to a day's calendar entry or something that does not change from one day to the next. The unchanging elements may be considered background planes that may be stored in the SPD memory and referenced by a symbolic name (a reference tag) that is shorter than the image they represent. Typically, when displaying a calendar, the elements that must change regularly from one day's view to the next are few and are generally the label for each block of allocated time. All other items may effectively be referred to by the reference tag, effectively reducing the number of bits that must be transmitted to display the calendar view.

An enhancement to traditional static distillation (as described further below) is a process of dynamic distillation of repeated blocks. In this dynamic process, a server (either an SPD or a remote device) may associate a block of information represented by a reference tag "on the fly". After establishing the meaning of the reference tag with the client (either a remote device or an SPD), the server thereafter utilizes the tag to communicate the intended information in a more cost-effective manner than communicating the information itself.

In an exemplary embodiment, an SPD is used to display a calendar. Consider a block of time on the calendar with a label describing that block of time. If the total calendar time was 8 hours and the label applied to a 30 minute interval, the label describing that time frame may typically be transmitted to the SPD, in full, approximately 16 times. Conversely, sending a single message to define the label image along with its reference tag may allow use of just the tag in all subsequent communications, thus reducing the amount of information transmitted (and possibly stored).

As discussed previously, it is often the case that proprietary and/or shorter range communication protocols may operate on less power than standard and/or longer-range protocols. In addition, it is possible for the different SPDs in a network or ecosystem to have vastly different power budgets due to available energy conditions, opportunity for wired operations, or other factors. In such cases, a gateway/ peer-forwarding behavior may be implemented that utilizes SPD power reserves as a link-cost metric. Combined with routing behaviors among SPDs in an ecosystem, such a routing algorithm may provide the optimal communications path by allowing the energy-rich SPD or SPDs to operate as gateway nodes to other parts of the network.

In an exemplary embodiment, a Wi-Fi transceiver and a very-low-power radio transceiver are provided as network interfaces in each of several SPDs in a network. The SPDs communicate with each other and with a non-SPD remote device. The Wi-Fi network interface has a power-per-bit-communicated cost of transceiver operation that is many times what the same bit costs to communicate over the very-low-power radio link. Furthermore, at least one of the SPDs may have an abundant energy source. In such a case, the SPD that has abundant energy may be selected to communicate through its Wi-Fi network interface to the remote device, forwarding messages to and from the other SPDs through its very-low-power radio link. The other SPDs, which may have relatively scarce energy sources, may therefore communicate through their very-low-power radio links, and, therefore, reduce the power consumed for communications.

In addition, some embodiments of the SPD contain software and/or hardware mechanisms to aid in the placement of an entire SPD and/or access point. These mechanisms may be utilized in order to maximize the quality of the wireless networking signal in order to improve communications bandwidth, to reduce the communications error rate, and/or to reduce the power consumed for communications. For example, in some embodiments, the SPD includes a mechanism that displays an indication or emits an audible tone that varies proportionally with and/or is representative of the quality of the communications signals to aid in the placement of the SPD and/or access point.

In addition to (or instead of) optimizing the placement of SPD nodes and/or access points, the existing placements may be utilized along with a mechanism to additionally take advantage of the nodes and/or access points with better placements. As an extension to the concept of gateway operations for wireless networks (described further below), the SPD may dynamically or statically select which SPD and/or access point is to be used as the gateway for the others based on a combination of SPD energy reserves and/or communications signal strength.

In an exemplary embodiment, obstructions may sometimes severely influence the signal strength seen by a wireless node on a network. Moving the antenna, emitter and/or detector for an access point or SPD by a few feet may make dramatic differences in signal strength. Treatment of a group of SPDs as a system and selecting the SPD(s) with the best signal strength to operate as the gateways for the group of SPDs may allow for higher communications quality and/or lower communications power.

In some embodiments, another method to reduce the power consumption of an SPD wireless radio subsystem is to turn the radio on briefly after a period of "off" time, such as once every 10 or 100 seconds. Assuming the "on" time during this period is kept to 10 or a few 10s of milliseconds (or less), this may result in a sufficiently low average power such that even low-cost, readily-available wireless protocol (such as Wi-Fi) chip sets may be used in SPDs with extremely tight power constraints. The ratio of "on" time to "off" time and the corresponding ratio of "on" power to "off" power determines the average power consumption of the SPD's communications subsystem. Thus, the "off" time may be chosen to achieve a particular low average power consumption given a minimum "on" time to complete the wireless protocol steps needed to send and/or receive a complete message, the "off" time may be chosen to be appropriately long.

One difficulty with this approach may be in keeping the access point (or other centralized wireless protocol device) from concluding that the remote wireless protocol device (in this case, the SPD) has left the wireless network. If the access point has concluded that the SPD has left the network and then subsequently the SPD attempts to reestablish communications with the access point, this may require the SPD to go through a complete wireless protocol "rejoin" procedure each time the SPD wanted to have data wirelessly transferred. By convincing the access point that the SPD has been subject to a temporary interference with its transmission signal, the communications may be reestablished without requiring the more involved, time-consuming, and power-consuming "rejoin" procedure. Various schemes known to those skilled in the art may be used to convince the access point that the SPD has not left the wireless network, even if the SPD has not communicated for many seconds.

Some embodiments may have a minimum amount of user input/output (I/O) functionality for setting basic operating parameters. In some embodiments, even this minimum amount of user I/O functionality may be unnecessary for normal operation and this I/O may be made inaccessible after initial deployment of the device.

In some embodiments, one or more SPDs may include a single-indicator display. A variety of power-saving techniques may be applied to a single-indicator display. These include (but are not limited to): Applying intermittent power to the indicator at a high-enough frequency such that it appears to be on continuously when viewed by the human eye. This frequency may be in the range of 60 cycles per second or greater. In concert with intermittently powering the single indicator, adjust the duty cycle of the power circuit for the indicator such that the indicator is powered for substantially less than 100% of each cycle. This technique relies on the human eye's propensity to integrate the light that it receives in such a way that a rapidly-pulsing indicator may appear to be on continuously if the frequency of pulsation is high enough, and also that the eye will tend to overestimate the width of the pulses such that the indicator will appear brighter than the duty cycle may otherwise suggest.

Also in some embodiments, one or more SPDs may include a simple numeric or alpha-numeric display. A variety of power saving techniques, such as those described above, may be used with these types of displays.

In some embodiments, one or more SPDs may include a pixeled display. A variety of power-saving techniques may be applied to pixeled displays. These include (but are not limited to): Application of sleep modes based on scheduled "night" periods. Leaving the display in sleep mode until user proximity is automatically detected and/or the user otherwise triggers active operation of the display. Requiring an explicit user trigger for high-power-drain items such as backlights.

Depending on the application being served by the SPD, numerous forms of sensors may be utilized in an SPD embodiment. Sensors with implications for power management or other unique purposes are described below, but any form of sensor operable within the SPD's power budget, size restrictions, product cost, and/or other constraints may be supported.

In some embodiments, one or more SPDs may include a passive infra-red (PIR) device or some other mechanism to effect proximity detection of personnel. Their application in an SPD embodiment for display of information may alter the behavior of the SPD to minimize power consumption. For example, driving or updating an LCD display consumes power that may be reduced or eliminated by suppressing updates to the display and/or shutting down the display if no one is present to observe the content of the display.

In some embodiments, one or more SPDs may include a photo-detector, since the presence of light may be an indicator of current or pending activity. In one embodiment, to display information, the absence of light may also indicate it may be prudent to enter a power-down state. The SPD may also inform a central monitoring point that insufficient light is present in an area that is intended to be lit for security, safety, aesthetic, or other reasons.

A variety of methods and strategies may be used to reduce power in the controller. Some embodiments of the SPD may use one, many, all, or none of these methods and strategies.

In some embodiments, operating power is reduced during periods of inactivity. Often times the controller's periodic tasks may be arranged such that they are completed in a burst of activity followed by a period of inactivity until the periodic tasks again need to be performed. As long as these periods of activity and inactivity are kept relatively short and frequent, it may appear to the rest of the SPD that the controller is performing these tasks continuously, albeit at a slower rate.

In some embodiments, the controller may be designed to "sleep" during the periods of inactivity, and "wake up" in response to some stimulus, change of state, and/or elapsed time. This may be useful when the power consumption of the controller during sleep is lower than when it is awake. The average power consumption for the controller operating in this way may be less than if it were awake all of the time.

Some techniques to reduce power in the controller during periods of inactivity include running the controller's internal circuitry at a lower frequency and/or lower voltage than when it is fully awake, executing fewer instructions per unit time than when it is fully awake, and selectively disabling some or all of the functions within the controller.

In some embodiments, operating power may be reduced during periods of reduced activity. For example, the controller may have several different reduced-power modes of operation, as compared with its full-power, full-operation mode. Often, only a subset of the full capabilities of the controller is needed at any particular time. In this case, some of the functions of the controller may be unused except during specific times and may be disabled the rest of the time to reduce average power consumption. Additionally, some of the functions within the controller may be needed but only at a slower operating rate so operating them at a lower frequency may reduce average power consumption. Continuously adjusting the operating frequency of one or more subsystems to better match the needed performance at any particular time may also reduce the controller's average power consumption. By automatically selecting the appropriate low-power operating mode appropriate for the tasks it needs to perform at any particular period of time, the controller may reduce its average power consumption while still allowing the SPD to operate acceptably well.

In some embodiments, operating power is reduced by running at a lower or lowest voltage. Often, the circuitry that may be used to implement a particular controller embodiment is specified to operate properly over a range of voltages. Typically, the lowest power consumption is achieved at the lowest supply voltage. In some embodiments, the maximum frequency of guaranteed operation is reduced when the supply voltage is reduced, even if the supply voltage remains within the specified operating range. Also, in some embodiments, certain functions of the controller may be guaranteed to operate only at a higher minimum voltage than the minimum voltage required by other functions.

By allowing the operating voltage of the controller to be varied, some embodiments may have the controller select its operating voltage based on the frequency at which it needs to operate and/or which functions it needs to use during any particular period of time. Using this technique, the average power consumption of the controller may be lower than if the controller were to be operated at the highest minimum guaranteed operating voltage of all of its frequencies and functions.

In some embodiments of the SPD, updating the controller's non-volatile program and/or data memory may allow the controller to maintain the contents of its memory after a loss of power. In some cases, these non-volatile memory circuits require a higher operating voltage during update operations than during read operations. Allowing the controller to adjust the operating voltage of the non-volatile memory subsystem, such that it is operated at the higher voltage only during update operations, and operated at the lower voltage during read operations, may reduce the average power consumption of some embodiments of the SPD.

In some embodiments, the total extra power consumption needed in the controller when the higher voltage is used for writing to non-volatile memory circuits may be further reduced by grouping together the non-volatile-memory update operations. The "overhead" time spent raising and lowering the voltage may, therefore, be shared among multiple update operations. This means that for a given set of update operations, the time (and excess power) spent on most of the "overhead" may be eliminated.

A variety of methods may be used to initialize the SPD operating parameters. One method that may be used is through the inclusion of a USB port or similar serial interface for initial configuration and/or initial power charge of the SPD and to use a laptop or computer that is able to directly operate at the MAC layer of the Wi-Fi protocol to set up the higher layer operations. In many environments where the SPD is operating, the DHCP protocol is often available, so the IP address(es) may be obtained automatically. In environments where the DHCP protocol is not available or is otherwise inappropriate to be used, the IP address(es) and other relevant operating parameters may be allocated manually.

Some embodiments include a button on the back of the SPD that invokes the display of the IP address momentarily. With the IP address known, a configuration utility downloadable from a web site or other convenient location may be used to configure the operating behaviors of the SPD. Alternatively, for embodiments in which the SPD includes touch-screen capability, triggering a configuration mode may lead to a series of menu queries that may adequately drive initial configurations.

For some of SPD applications, compromise of the host network by the SPD is typically not possible due to the limited network interface power budget and/or lack of standard higher-layer protocols that will be present on the device. For example, in many SPD embodiments, there will not typically be support for TCP operations. The SPD functional behaviors, therefore, will be governed by an entirely proprietary message set. In some embodiments, however, passwords and/or other means may be used to limit access to the SPD to authorized personnel and/or designated remote device(s).

Figure 12:
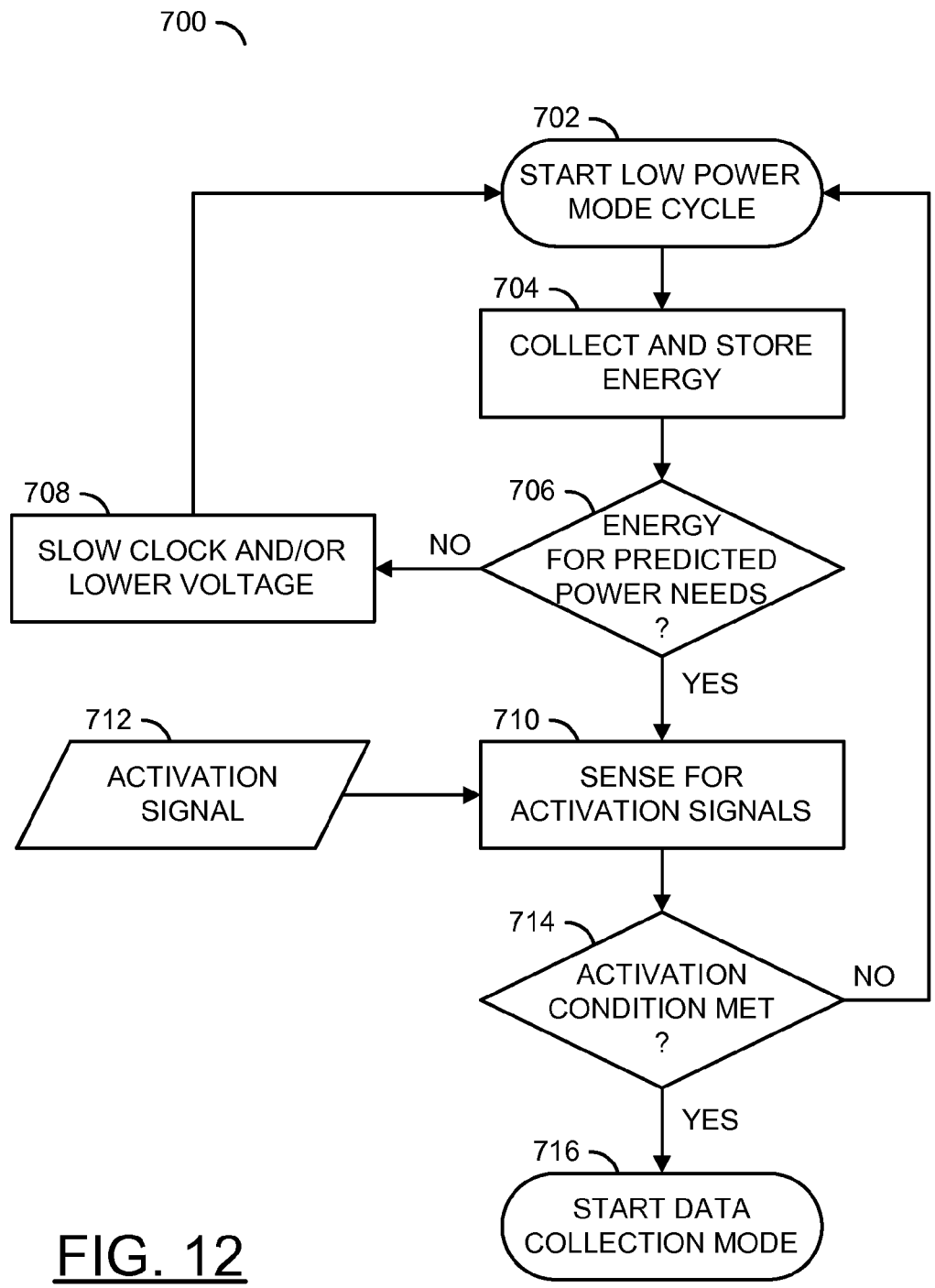
FIG. 12 is a flow diagram illustrating a low power activation signal monitoring mode cycles.

Referring to FIG. 12, a method (or process) 700 is shown. The method 700 illustrates an example of a low power activation signal monitoring process. The method 700 generally comprises a step (or state) 702, a step (or state) 704, a decision step (or state) 706, a step (or state) 708, a step (or state) 710, a step (or state) 712, a decision step (or state) 714, and a step (or state) 716. The step 702 may start a low power mode cycle (or process). Next, the step 704 may collect and store energy. Next, the step 706 may determine the amount of energy needed for the predicted power usage. If there is not enough energy stored, the method 700 moves to the step 708. To reduce power usage, the step 708 may slow down an internal clock to the CPU 202a and/or may lower the operating voltage. If there is enough energy for the predicted power needs, the method 700 moves to the step 710. The step 710 senses one or more activation signals. If an activation signal is present, such as a signal received from the step 712, the decision step 714 determines if an activation condition has been met. If not, the method 700 moves back to the step 702. If an activation condition has been met, the method 700 moves to the step 716. The step 716 starts a data collection mode (to be described in more detail in connection with FIG. 13).

Figure 13:
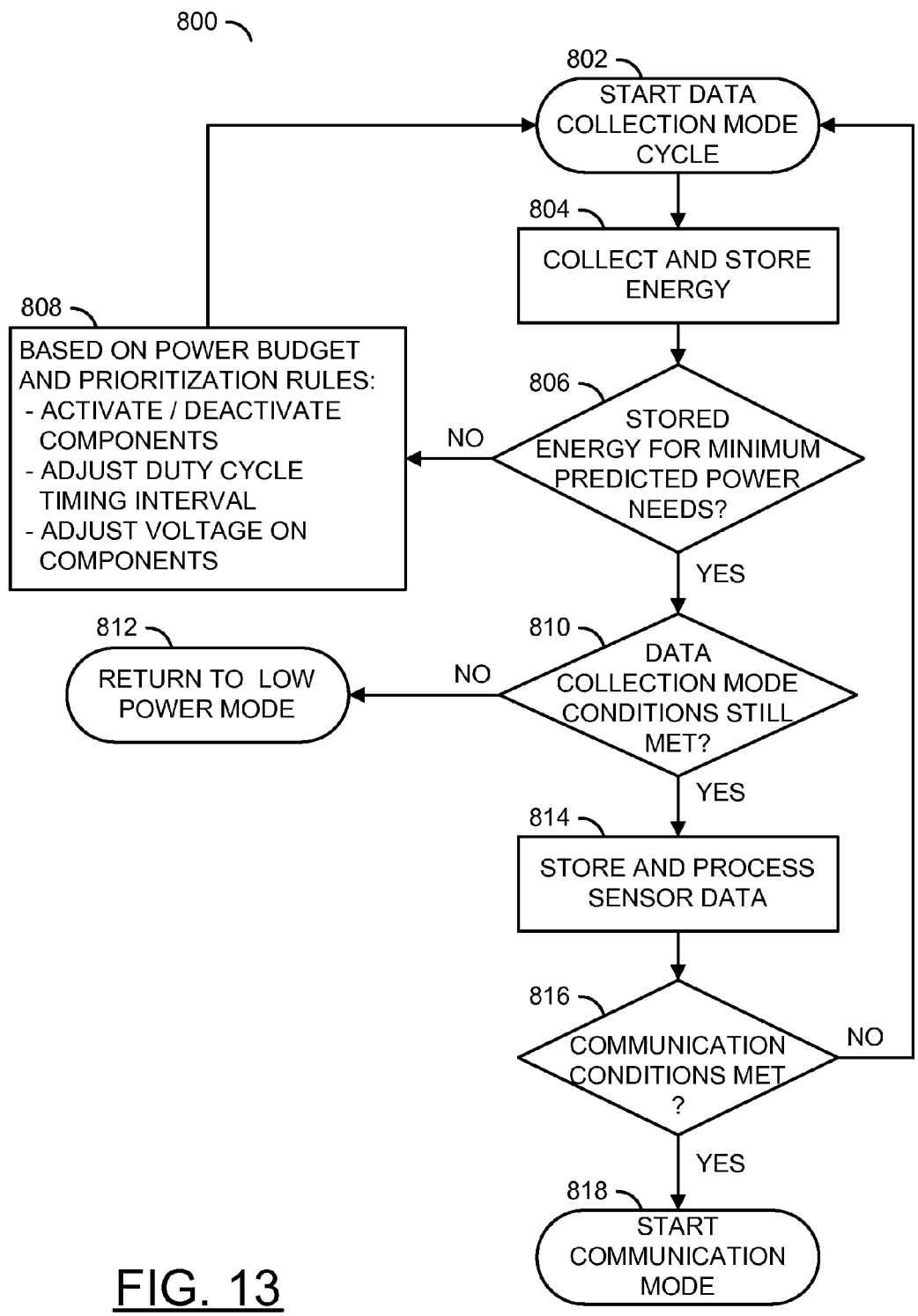
FIG. 13 is a flow diagram showing a power-aware data collection mode cycle.

Referring to FIG. 13, a method (or process) 800 is shown. The method 800 illustrates an example of a power-aware data collection process. The method 800 comprises a step (or state) 802, a step (or state) 804, a decision step (or state) 806, a step (or state) 808, a step (or state) 810, a step (or state) 812, a step (or state) 814, a step (or state) 816, and a step (or state) 818. The step 802 starts the data collection mode cycle. Next, the step 804 collects and stores energy. Next, the step 806 determines if enough energy has been stored to perform a minimum predicted operation based on the predicted power needs. If not, the method 800 moves to the step 808. The step 808 may perform a number of prioritization rules based on a power budget. For example, the step 808 may activate/deactivate one or more components, adjust the duty cycle and/or timing interval, adjust a voltage on the components or other power saving parameters (or rules). If there is enough energy stored for the predicted power needs, the method 800 moves to the state 810. The decision state 810 determines if the conditions are still met to remain in the data collection mode. If not, the method 800 moves to the state 812, which returns to the lower power mode. If the conditions are still met, the method 800 moves to the state 814. The state 814 stores and processes sensor data. Next, the decision state 816 determines if the communication conditions have been met. If not, the method 800 moves back to the state 802. If the communication conditions have been met, the method 800 moves to the state 818. The state 818 starts the communication mode (to be described in more detail in connection with FIG. 14).

Figure 14:
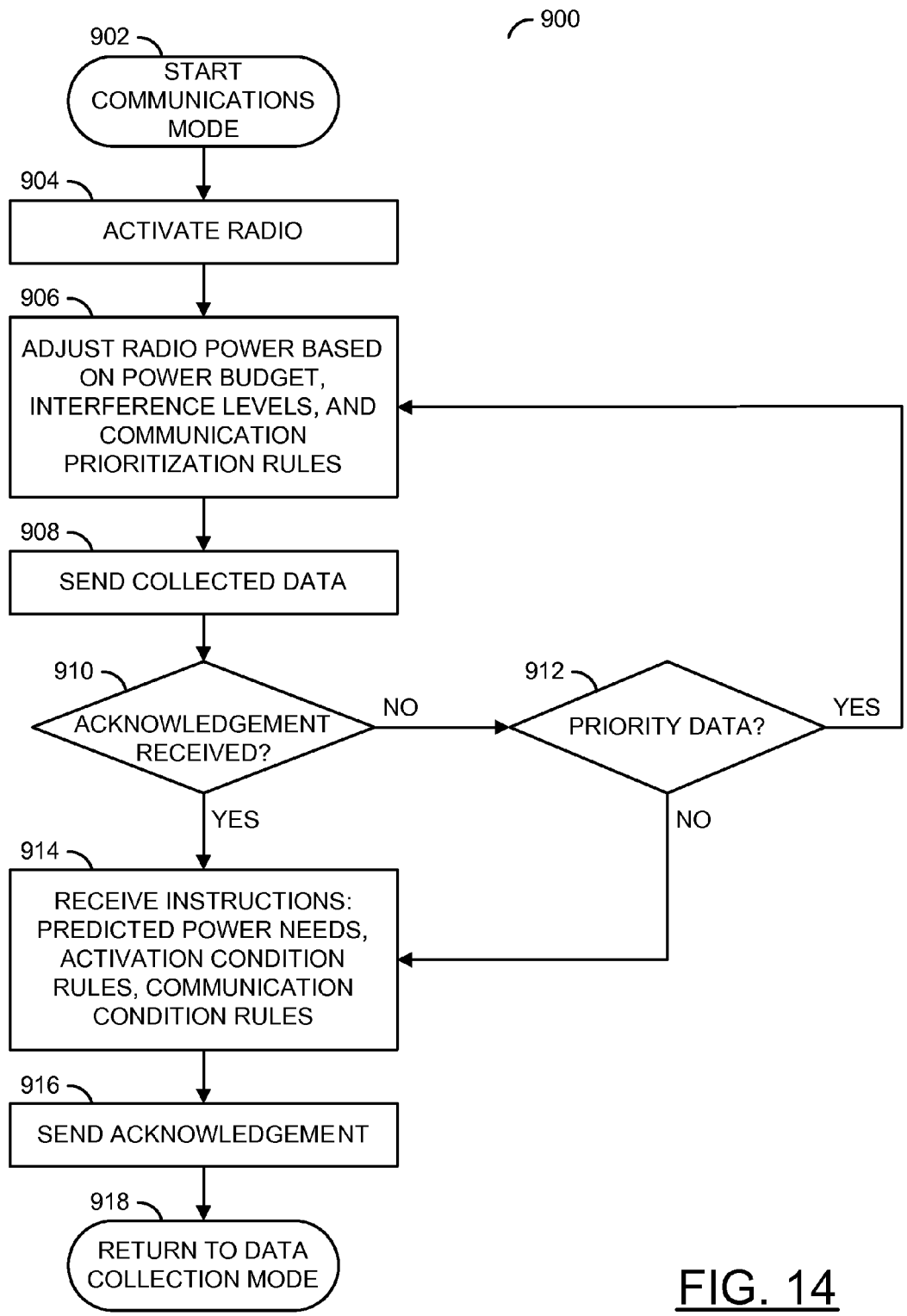
FIG. 14 is a flow diagram showing a power-aware communications mode.

Referring to FIG. 14, a method (or process) 900 is shown. The method illustrates a power-aware communications mode. The method 900 generally comprises a step (or state) 902, a step (or state) 904, a step (or state) 906, a step (or state) 908, a decision step (or state) 910, a decision step (or state) 912, a step (or state) 914, a step (or state) 916, and a step (or state) 918. The state 902 starts the communication mode. Next, the state 904 activates the radio (or wireless transceiver). Next, the state 906 adjusts the broadcast power of the radio based on a power budget, interference levels, and/or communication prioritization rules. Next, the method 900 moves to the state 908. The state 908 sends collected data. Next, the decision state 910 determines if an acknowledgment has been received. If not, the method 900 moves to the decision state 912. The decision state 912 determines if the data received is priority data. Priority data may be considered data that may break low power operation rules. If so, the method 900 moves back to the state 906. If the data is not priority data, the method 900 moves to the state 914. In the decision state 910, if an acknowledgment has been received, the method 900 moves to the state 914. In the state 914, the method 900 receives instructions related to predicted power needs, activation condition rules, and/or communication rules. Next, the method 900 moves to the state 916, which sends an acknowledgment. Next the state 918 returns to the data collection mode (e.g., the process 800).

The controller in the SPD may maintain the physical and logical address of the SPD. A default set of these addresses may be pre-programmed when the SPD is manufactured. If necessary, some or all of these addresses may be set or changed when the SPD is initially deployed and/or changed while the SPD is operational.

In the event that the SPD is deployed in a network that does not broadcast its security information, the network interface access codes will need to be entered as part of the initial configuration of the SPD.

The issues of privacy and encryption are of concern when there is a need for protection of information communicated across an open network interface. This need may be addressed in a number of ways with respect to SPD communications with a remote device, including: Information communicated across the external computer network may be sent in a proprietary format, minimizing the risk of casual observance through the use of a network "sniffer" or similar device. Standard encryption techniques may be applied to communications across the external computer network for even more robust privacy and protection against unauthorized observation.

In embodiments that include communication with the remote device(s), this communication typically takes place through the external computer network. Some embodiments of the SPD may contain one or more network interfaces that implement a wireless communications protocol. The wireless protocol may be a standard, commonly-deployed technology, such as "Wi-Fi" (IEEE 802.11a, IEEE 802.11b, IEEE 802.11g, etc.), or the protocol may be a specialized one particularly tailored to the low-power transmission distance, and/or other needs of the SPD and/or its application. Combinations of different network interface types are also possible, allowing for gateway operations where applicable.

Regardless of the type of wireless protocol, one (or more) devices in the external computer network typically provide the wireless connection to the overall external computer network. Whether the external computer network is inherently wireless or a hybrid of wired and wireless networking technologies, the device that operates as the intermediary to provide the connection is often referred to as a wireless access point. In some cases, the wireless access point may be built into a node on the network, and/or may be part of one or more remote device(s). In some cases, the wireless access point may be a device dedicated to bridging the wireless network to a wired network. In some cases, the remote device may use a built-in wireless interface to directly communicate to the SPD (in Wi-Fi nomenclature, this is known as "ad-hoc" operation mode).

The wireless access point used by the SPD may be a standard commercially-available device that is typically used with other standard wireless products or the access point may be a specialized device whose wireless port may be used only with the SPD. The access point may be configured to support one or more SPDS, one or more other commercially-available wireless products, or any combination of these. In most cases, the function of the access point for the SPD may be to convert the wireless messages from the SPD to the wired networking protocol used by the external computer network and vice-versa.

A role of the external computer network when used with the SPD is typically to transfer messages from the SPD to the remote device(s) and vice-versa. In many cases, it is expected that standard, already-installed computer networks may be used for this function. Therefore, the SPD may typically be operated such that its messages may be easily converted by the existing wireless access point(s) for carriage across the computer network.

Typically, the SPD does not require any protocol changes in the wired part of the external computer network and in some cases, requires no special protocol changes for the wireless portion either. SPD messages may therefore be constructed, formatted, and addressed for easy transport across the external computer network to the remote device(s), and vice-versa.

In cases where proprietary communication methods are used between SPDs, a gateway function may exist either among the SPDs or in a special-purpose device co-located with the SPDs but connected to the external computer network via a standards-oriented wired or wireless means.

Once the network connectivity has been established between the SPD and the remote device(s), they may typically communicate with each other using the standard messaging format and protocol(s) used in the external computer network. Each SPD may have a unique network address, or other means to be addressed uniquely, and likewise, each remote device may have a unique network address, or a means to be addressed uniquely. Properly-addressed messages may be sent across the external computer network by both the SPD(s) and the remote device(s) using the existing networking mechanisms.

Figure 15:
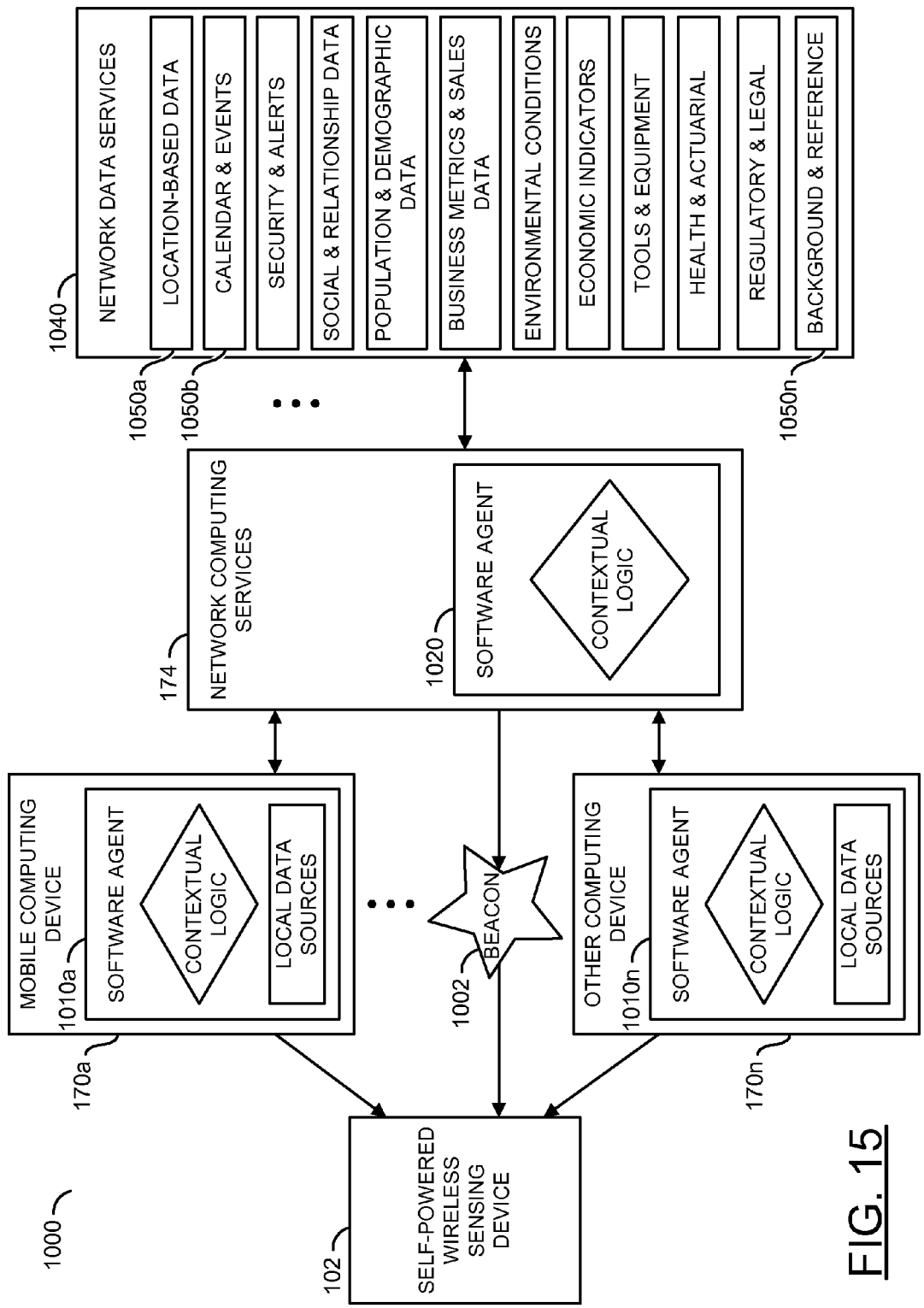
FIG. 15 is a context diagram showing wireless signal configurations.

Referring to FIG. 15, a context diagram of a system 1000 showing wireless signal configurations is shown. The memory 204a may contain instructions outlining a set of threshold conditions for storing sensed data (e.g., the process 800). The memory 204a may also contain instructions outlining a set of threshold conditions for transmitting sensed data (e.g., the process 900). The instructions for storing and/or transmitting data may be based on a power budget and/or available power. The instructions may contain computational logic for computing a threshold condition based on one or more types of sensed data and/or one or more data points over time. A beacon 1002 is shown connected between the network computing services block 174 and the wireless sensing device 102. The beacon 1002 may be used to send a signal from the network computing device 174 to the sensor node 102. The beacon 1002 may send a signal to wake up the node 102, or to prepare the node 102 to receive new instructions, etc. A software agent block 1010a is shown in the mobile computing device 170a. Similarly, a software agent block 1010n is shown in the computing device 170n. A software agent block 1020 is shown in the network computing services block 174. The software processing may be distributed between the mobile computing devices 170a-170n and the network computing services block 174. A network data services block 1040 is shown connected to the network computing services block 174. The network data services block shows a number of classifications of network data services 1050a-1050n.

In one example, the computational logic may include a cascade (e.g., one or more) of threshold conditions that may be used to determine when additional features of the sensor node 102 will be powered on or powered off. For example, when the sensor node 102 determines that one of the sensors (e.g., a sensor A) detects a signal over a determined threshold, then one or more other sensors (e.g., a sensor B and/or a sensor C) may be activated. In another example, when the sensor node 102 determines that the sensor B in combination with the node C are below a threshold, then the sensors B and C may be turned off. In such an example, one of the sensors 160a-160n may be awake (or operational) continuously. Other sensors 160a-160n may only be powered on when the sensor node 102 determines that monitoring is needed (e.g., by the continuously operated one of the sensors 160a-160n). Other input parameters may be uploaded by the mobile computing device 170 to the sensor node 102. Such parameters may include a schedule of when sensor data should be captured and/or stored.

The computational logic cascade may implement a power-aware prioritization of sensor data capture and/or communications information. For example, when power stored in the ESU circuit 214a is low, the duty cycle of the sensor node 102 may be changed less frequently. In one example, the logic may only receive signals from the sensors 160a-160b when power is sufficient.

The computational logic may include logic for coalescing data, such as only recording changes to a base state or expected state. A computationally efficient process may be implemented. For example, a process that only records the average value of one or more of the sensors 160a-160n over a period of time may be used. The sensor 102 may begin to record events if a measurement received from the sensors 160a-160n is significantly above average.

Since the sensor nodes 102a-102n are self-powered (through the energy storage unit 214a), the power budget of the sensor nodes 102a-102n is generally kept small. By capturing additional energy with the ECU 214a, the nodes 102a-102n may operate for long periods of time on a single battery. The energy storage unit 214a may be implemented as a battery or other storage device. The energy capture unit 214a may store energy through various sources, such as energy created through harvesting of light, vibration, thermal variation, thermal gradient, infrared, chemical, RF sources or some combination.

The computational logic for determining the threshold conditions for storing and/or transmitting data may be based on currently available power, predicted future energy harvesting opportunities (e.g., based on forecasting the future environment), and/or predicted energy consumption (e.g., based on applying the threshold rules to the forecast environment).

A machine learning process that optimizes the predictive model may be set up as a series of energy input functions and/or energy consumption functions with scaling factors that are optimized based on historical data for the sensor nodes 102a-102n. Based on prior patterns, the model may operate with techniques of machine learning optimization including, but not limited to, a least square minimization of the difference between model predictions and actual historical data, various gradient descent techniques, etc.

In order to adapt the duty cycle, the sensor sampling rates, the adaptive and conditional powering of additional sensors based on a set of initial sensors, the data storage and data transmission policies of the sensor node 102, each energy use in the system 150 may be characterized as an energy cost function. For example, energy harvesting may be a negative cost, or energy contribution. Each data captured may be characterized as a utility or benefit function. An optimization may be performed to maximize the utility within a set of cost parameters. Alternatively, optimization may be performed to maximize utility per unit of cost.

In one example, the remote computing device 170 may be a local device on the edge of the network. For example, the remote computing device 170 may be implemented as a smartphone, or personal digital assistant (PDA) type device, which in turn is connected to the central data storage and computing facility 174. In such an implementation, some or all of the computational logic for determining the threshold conditions and/or rules may be implemented on the devices 170a-170n. In such an example, only the threshold values (or simplified rules) may need to be transmitted to the sensor nodes 102a-102n. In one example, a subset of the processing is done on the sensor nodes 102a-102n. If power is not an issue, the devices 170a-170n may capture a more complete stream of data from the local sensor nodes. The data may then be processed and/or be evaluated locally before being sent to a central server on the computers facility 174. Such an implementation may reduce network traffic and/or storage needed at the central data center 174. The central data center 174 may send program instructions to one␣␣␣or more of the smartphones 170a-170n for computing threshold conditions. The program instructions may in turn be sent to one of the sensor nodes 102a-102n.

Various sources of data may be used to generate energy consumption and/or harvesting predictions. Such sources may include (i) a schedule of upcoming calendar events in the neighborhood of the sensor, (ii) the proximity to or presence of nearby people, objects, buildings, vehicles, (iii) security or threat conditions that increase the importance of sensing, (iv) location-based data (such as features of the location of the sensor), (v) weather forecasts and/or other environmental conditions, (vi) scheduled or location-based energy harvesting opportunities, (vii) presence of increased ambient or directed RF power, (viii) known or observed cycles including day, week, month, season, and/or (ix) other patterns in prior data.

Various energy harvesting technologies may be used in the energy capture unit 214a. Examples of such technologies include piezoelectric effects of stress and/or strain, vibration, thermal gradient, thermal variation, solar photovoltaic, ambient light photovoltaic, infrared, radio frequency, chemical energy, air or fluid flow, and electromagnetic fields. Many of these effects are context dependent and may vary with location, time, proximity to other devices or environmental features and other factors. Being able to predict future energy inputs based on the context of the sensor node 102 may help to determine the current power budget.

In addition to the environmental context, the predicted power inputs and predicted power consumption may take into account various application rules encoded in the control logic of the memory 204a. Such inputs may be used to determine the duty cycle sensor node 102, the sampling rate of the sensor, the conditional powering of different components, as well as the data storage and/or data transmission policies.

In an example of a security application used to detect intruders, the sensor node 102 may have a very different predicted power need than the same presence or proximity sensor node 102 used to optimize lighting and heating based on building or room usage. The security application may consume power when an office is closed. The lighting and heating application may need to be active during the scheduled office hours. The energy harvesting opportunities may also be different. The security application may need to store enough power during the day to last throughout the night. The office energy application may be able to harvest enough energy during the day to meet most needs. The transmission policies for the security application may be immediate during non-office hours. The transmission policy for the energy application may be daily or weekly. In another example, a seismic vibration sensor might have a high sampling rate after an initial threshold event, while a temperature sensor might be needed less frequently. For many applications, a diminishing return on the value of the data occurs at higher sampling rates. The particular value depends on the application.

The predicted power needs and/or harvesting opportunities may be computed through machine learning techniques in which the contribution of environmental features to energy harvesting and energy consumption are learned based on prior observations. For example, consider an application where during a time interval $t_i$, and at location l, energy contribution or cost is expressed as a linear relationship between a set of environmental features f and energy the contribution by the following equation:

$$\Delta e(t_i,l)=a_1 f_1(t_i,l)+a_2 f_2(t_i,l)+a_3 f_3(t_i,l)+a_4 f_4(t_i,l)$$

For environmental factors that cost energy, the scaling factors are negative. For environmental conditions that add to energy harvesting, the factor is positive. The change in energy does not go over the storage capacity of the node. The charge does not generally fall under a threshold without shutting down the sensor node 102.

For a time series over all the time intervals, an expression with F being a matrix (where each row is a time interval and each column is a feature) may result in a total energy contribution or drain from environmental factors of $$E=\underline{F}\times\underline{a}$$

The time intervals before the current time, the actual features and/or energy needs or contributions have already been measured and may be considered the ground truth or training set for a predictive model. The scaling factors may be fit using well known machine learning techniques. The functions describing dependence of the change in energy and features of the environment may first be estimated with known relationships (e.g., such as solar radiation and the contribution to a photovoltaic) so that the machine learning is focused on scaling the relationship to the particular sensor node rather than discovering the relationship in the first place. The sensor node 102 may be implemented with known components. The energy inputs and/or cost functions of such known components should be related to the technology used. The scaling factors are normally related to the context and/or application.

In order to create the most efficient power management in a wireless sensor network, the machine learning techniques may be trained with data collected on a subset of the sensor nodes and/or for a subset of time. The power budget and/or power predictions may be calculated at a central computer in the network computing services block 174 for larger calculations. For calculations with fewer features, the power budget may be calculated on the remote computing device 170. The results of the optimization of the model may be communicated to the sensor node 102 in the form of program instructions and/or thresholds.

The optimization of the scaling factors of the predictive model may also take into account the effect of the control logic and the rules currently in use to adapt the duty cycle sensor of the node 102, the sensor sampling rate, as well as the data recording and/or transmission policies. The functions that express the relationship between a predicted feature of the environment or context to power consumption can include the rules in the calculation so that the optimization is application-specific.

In some SPD applications, the software agent(s) 1010a-1010n running on the remote device(s) 170a-170n may be used to communicate with the SPD through the external computer network. In some embodiments, the communication may be automatic, with each interaction triggered by some change of status in the remote device, the SPD, or both. In some embodiments, the communication may be manually initiated by a user of the remote device, such as to change the configuration or other state of the SPD. In some embodiments, both initiation modes may be supported.

Note that in some embodiments, the user directly interacts with the remote device(s), such as with a keyboard and/or mouse and/or display/monitor. In some embodiments, the user interacts indirectly with the remote device(s), such as across a computer network and/or additional communications link.

In some embodiments, communication is automatically initiated by the remote device. Some examples of uses of automatic communication initiated by the remote device may include: The SPD displays a subset of database information: a software agent running on the remote device periodically searches a database resident in the remote device and/or in a computer reachable through the external computer network. The results of the search, possibly along with other relevant information, are formatted by the software agent and are sent to the SPD, especially when those results have changed since the previous update. The SPD displays meeting room information: a software agent running on the remote device monitors the reservations for the meeting room to which the SPD is attached. The software agent may periodically interrogate the networked calendar and/or reservation system (such as Microsoft Outlook, IBM/Lotus Notes, etc.) and send the reservation information, possibly along with other relevant information, to the SPD for display. This application may be useful for general businesses, as well as businesses making rooms available to third parties, such as hotels, convention centers, etc. The SPD displays examination room information in a hospital or doctor's office. A software agent running on the remote device monitors the patient reservations for the room to which the SPD is attached. The information may allow the medical personnel to know who is in the room without having to enter the room and disturb the patient, and without having to find the reservation clerk and ask him/her about the status of the room. The SPD displays news, advertising, and/or market information: a software agent running on the remote device gathers various news, advertising, stock quotes, headlines, or other relevant information from internal and/or external sources (such as from the Internet). The software agent may format the information and periodically sends the formatted information to the SPD for display. The SPD displays pricing or other product status information: the SPD (or a set of SPDs) may be positioned adjacent to its (their) corresponding retail product(s). Each SPD may be used to display up-to-date pricing and/or other product status information in a supermarket, retail store, warehouse, or other locations. The software agent running on the remote device may gather data to be displayed on each SPD from a database or other computer system, and/or from direct user input at the remote device. The SPD is used as a personal display for each employee/user/customer: an SPD may be attached to each employee's cubicle or office, and may be used to display personal information, such as where the employee is presently, if the employee is on vacation, if the employee is available for drop-in conferences, or other employee circumstances. The employee may update the display by sending messages through the software agent running on the remote device, and this information may be sent to the SPD, possibly along with other relevant information, such as scheduling derived from other sources. The SPD displays room status information: an SPD may be placed in a room used by many people, such as an area with several cubicles, a ball room, an auditorium, or other locations. The software agent running on the remote device may gather any messages relevant to that room, such as general notices, announcements, or other messages, and may merge that with relevant local data, such as time, date, the current temperature in the room, and may send the formatted information to the SPD for display. The SPD is used as an annunciator: the SPD may be used to display important real-time information needed by people in the room where the SPD is located. For example, in a technical support or telephone call-center application, the SPD may display the average wait for customers on hold, the number of customers presently being served, whether the wait time is increasing, or other relevant information. The software agent running on the remote device may collect real-time information from the telephone switch and combine that information with other relevant information, such as time of day, recent history, or up time, to generate formatted data to send to the SPD for display. The SPD is used as an actuator: the SPD may contain one or more motors, actuators, electrical contacts, or other similar components which may be used to move or position some external mechanical or electrical apparatus. The SPD may receive a message from the remote device requesting that the mechanical or electrical apparatus be moved, repositioned, turned on, turned off, or otherwise adjusted. Alternatively, the SPD may receive a message requesting the status of the mechanical or electrical apparatus, and the SPD may respond with a message reporting that status.

In some embodiments, communication is automatically initiated by the SPD. Some examples of uses of automatic communication initiated by the SPD may include: The SPD used as a security sensor: the SPD may contains sensors to detect various environmental states, such as temperature, humidity, lighting, motion, vibration, noise, shock, pressure, or other environmental states. For example, in a security application, a small SPD may be attached to a window and used to detect if the window has been opened or broken. If such a stimulus is detected, the SPD may send a message to the remote device for further processing. The SPD may also send non-urgent messages periodically to confirm its continued correct operation and/or that the communication link is still functional. SPD reports its own health status: the SPD may send messages to the remote device to indicate that the SPD continues to operate correctly and/or the communication link is still intact. When the SPD detects an internal problem, such as insufficient input power and/or internal energy storage to continue operation, the SPD may send a message to the remote device to request maintenance service or other appropriate action. When the remote device does not receive a periodic health status message from the SPD, the remote device may conclude that the communications link and/or the SPD have failed, and the remote device may then take an appropriate action. SPD used as a HVAC sensor: the SPD may be used in a heating/ventilation/air-conditioning application, and may sense temperature, humidity, lighting, or other environmental states. The information may be sent to the remote device for further processing with data from other sensors, and the state of the HVAC system may then be sent to the SPD for display, along with current time, date, local temperature, or other relevant information. SPD used as an intercom: the SPD may contain a microphone and speaker, and perhaps "doorbell" and "talk" buttons. The SPD may send a message to the remote device when the "doorbell" button is pushed, and may digitize/decode voice signals for use with the internal microphone and speaker. The digitized voice data may be sent to and from the remote device, or another computer interconnected with the external computer network.

The software agent (SA) running on the remote device(s) may perform a variety of tasks, depending upon the embodiment(s) of the SPD(s) with which it communicates and the intended functionality of the SA and its embodiment(s). SA embodiments typically contain combinations of subprograms which each perform a specific task or set of tasks. For example, some subprograms may be responsible for reading information from a database while other subprograms write to a database. Some subprograms may perform both tasks. SAs that contain both readers and writers may have complex interactions with their corresponding database(s) as well as when communicating with the associated SPD(s).

An example SA application and associated environments that may be used with SPD(s) are described below. Actual embodiments of SAs may implement one, some, all, or none of the following examples.

In an exemplary embodiment, the SA may implement a calendar. This application allows an SPD (or set of SPDs) to be used for resource management, such as for reservation management of a conference room. The SPD(s) used for this application may typically contain a display of some sort that may show resource scheduling information. The SPD(s) may communicate with the remote device(s) running the calendar SA(s), and the calendar SA(s) may typically interact with a separate calendar management program/database, such as Microsoft Outlook or IBM Lotus Notes. Through the interaction with the separate calendar management program/database, the SA(s) may gather the necessary data to send to the SPD(s) for appropriate display of scheduling information, and/or gather the necessary data from the SPD(s) to appropriately update the separate calendar management program/database.

The calendar application may be implemented in a variety of environments. Exemplary environments include small offices using off-site hosted MS-Exchange services, small offices using off-site hosted World Wide Web Distributed Authoring and Versioning or WebDAV services (a set of extensions to the Hypertext Transfer Protocol (HTTP) that allows users to collaboratively edit and manage files on remote web servers), medium-to-large offices using MS-Exchange, and medium-to-large offices using local WebDAV.

Figure 16:
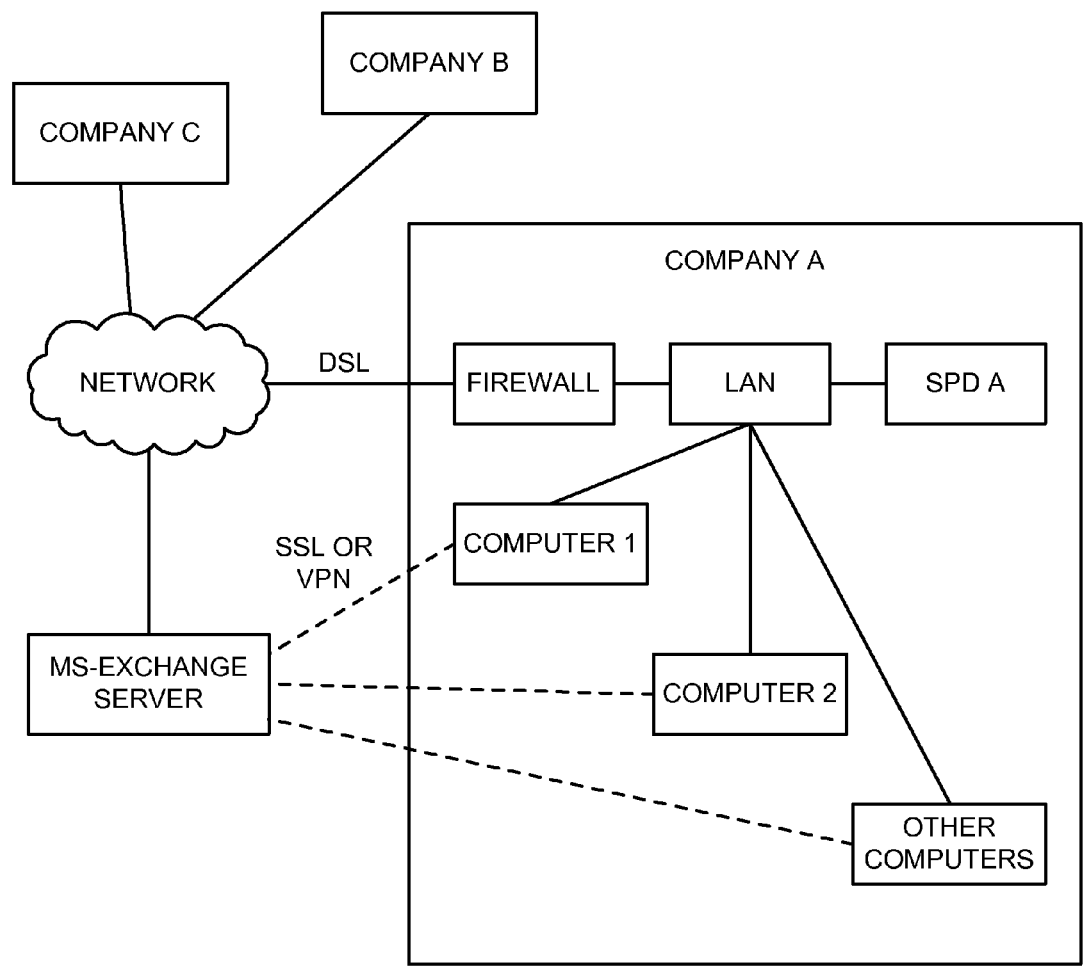
FIG. 16 is a block diagram illustrating a computer network having an MS-Exchange server.

For small offices using off-site hosted MS-Exchange, FIG. 16 illustrates an expected environment for a small office using a hosted MS-Exchange server for their mail services. In this example, company A may have 3 conference rooms, and computer 2 may be an administrative computer that is running Outlook and the SPD A Software Agent (SA). Note that in this example, multiple companies share a single MS-Exchange server, accessing the server via their internet connection perhaps over SSL or VPN connections through a firewall. Routers, hubs, etc. are assumed to be in the LAN cloud but are omitted for clarity.

The configuration illustrated in FIG. 16 poses several challenges: Installation/operational simplicity: Small offices often operate with little to no information technology staff available for applications training, management or installation. Exchange server modification avoidance: hosting companies providing MS-Exchange services often resist extensions to shared server platforms. Additional outlook license avoidance: MS-Outlook seat license costs are often high for small offices. As a consequence, they typically have less volume discount and purchasing leverage. Minimizing communications hops: Offsite hosting often creates large, variable latencies in communications to the MS-Exchange server. A variety of software architectures may be used to address these challenges. These are described below.

In some embodiments, installation and operational simplicity are linked as an issue but may be accomplished in several only somewhat-related ways as follows: Software Agents (SAs) may be designed to be installed only on client workstations.

In this way, access to a server machine by an SPD administrator may not be necessary. Two software elements may be used to fulfill the SA behaviors in each of two client workstations: one is an Outlook VBA extension (a version of Visual Basic that is embedded in Outlook) and the other is a separate supporting service. Both software elements may be installed in the same process. As a consequence, decisions about which is needed under what conditions may not be necessary. Delegation may be "hooked" so that the notification of delegate status for a resource managed with an SPD may be provided to the (potentially new) delegate with the option of installing the necessary components to manage the resource. Standard Outlook resource management may be used for creation and management (i.e., delegation) of the resource as a mailbox. This may allow meeting organizers, even for those individuals who are not administrators of the rooms, to use the source when scheduling meetings. Standard Outlook resource management may be used to avoid data collisions or conflicts in accepting resource booking requests. Installation of VBA elements may be largely invisible. To all appearances there may be an additional tool available to manage the SPDs and client software but otherwise it is just standard Outlook for handling the resource. The supporting service may be "fed" information by the Outlook VBA extension in the background on an event-driven basis. This may provide display updates to the SPD, such that no user intervention may be necessary. The supporting service may be a member of a cooperating group of services running on the machines of all resources owners and delegates. SPD communication may be performed only by the currently elected master whose role may be constantly negotiated behind the scenes without administrator input.

In some embodiments, utilization of the Outlook VBA mechanism and a local high-priority software service may allow scheduling and creation of resources without changes to the MS-Exchange server.

In some embodiments, utilization of the Outlook VBA mechanism and the creation of the resources as a resource mailbox may avoid any need for an additional Outlook license.

In some embodiments, utilizing the locally-located workstation of the administrator(s) reduces the latency and communications delays to a best case path over the LAN versus the uncertain path to the MS-Exchange server, thereby minimizing communication hops.

Figure 17:
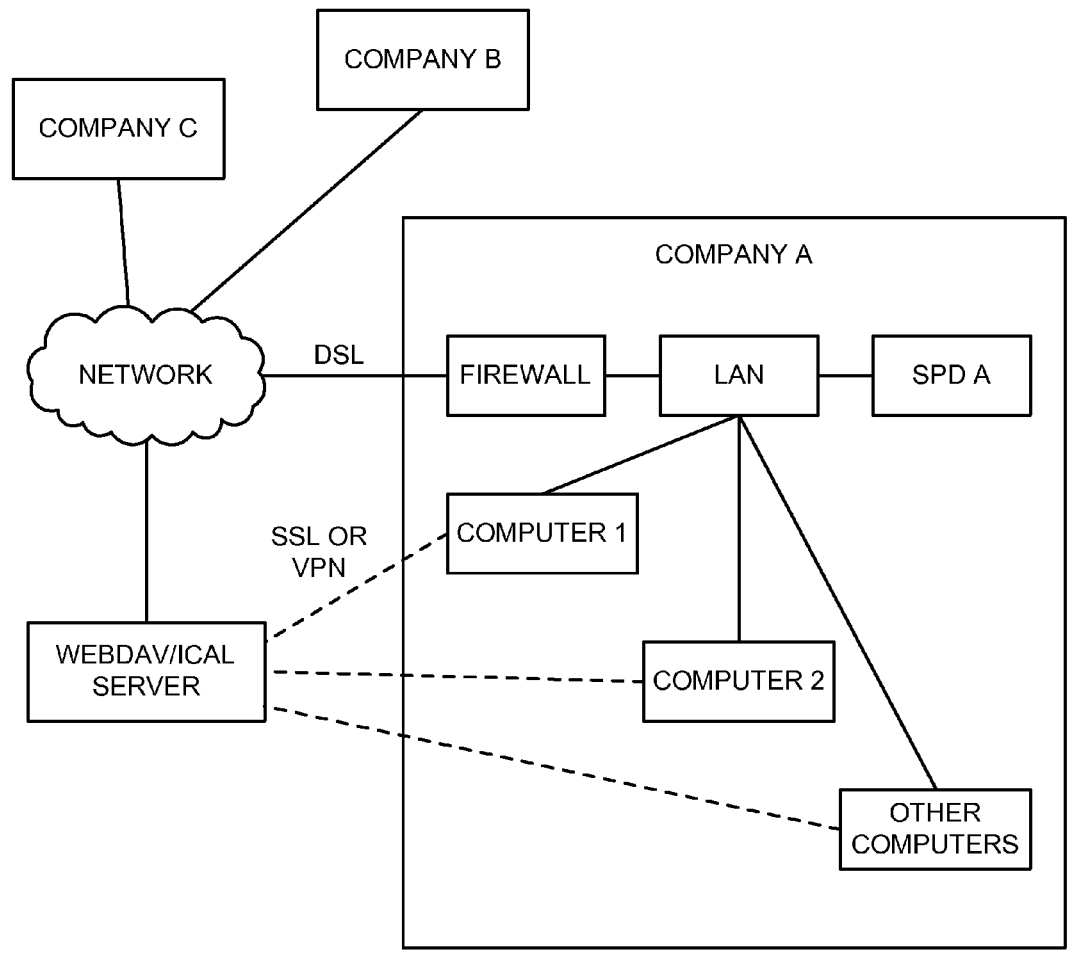
FIG. 17 is a block diagram illustrating a computer network having a web DAV/iCal server.

For small offices using off-site hosted WebDAV, FIG. 17 illustrates an environment for a small office using an offsite hosted iCalendar (a calendar application developed by Apple Computer). In this example, company A may have 3 conference rooms, and computers 1 and 2 may be running the SPD management utilities and Software Agent (SA). Note that the server is accessed via an Internet connection, such as over SSL or VPN connections through a firewall. Routers, hubs, etc. are assumed in the LAN bubble above but are omitted for clarity.

The configuration illustrated in FIG. 17 poses several challenges: Installation/operational simplicity: Small offices often operate with little to no information technology staff available for applications training, management or installation. The generic nature of WebDAV/iCal services: No calendar behaviors really exist within a WebDAV/iCal service. Instead, the application provides a web-based transactional-based information storage service on which a group calendaring system may be built. Minimizing communications hops: Offsite hosting creates large, variable latencies during communication with the WebDAV server. A variety of software architectures may be used to address these challenges. These are described below.

In some embodiments, installation and operational simplicity are linked as an issue but are accomplished in several only somewhat related ways as follows: Installation of software may be limited to client workstations such that no administrator access to any form of server machine is necessary. Two software elements may be used to fulfill the SA behaviors in each of two client workstations. One of these may be an SPD management utility to fulfill the same purpose as the Outlook VBA application. The other may be a separate supporting service. Both software elements may be installed in the same process. In this way, no decisions regarding which one is needed under what conditions may be necessary. Delegation may be handled using an email notification that indicates the delegation status for the resource to be managed. An attached executable file, which is generated and pre-configured for the WebDAV options necessary, may be optionally installed to install the components necessary to manage the resource.

Figure 18:
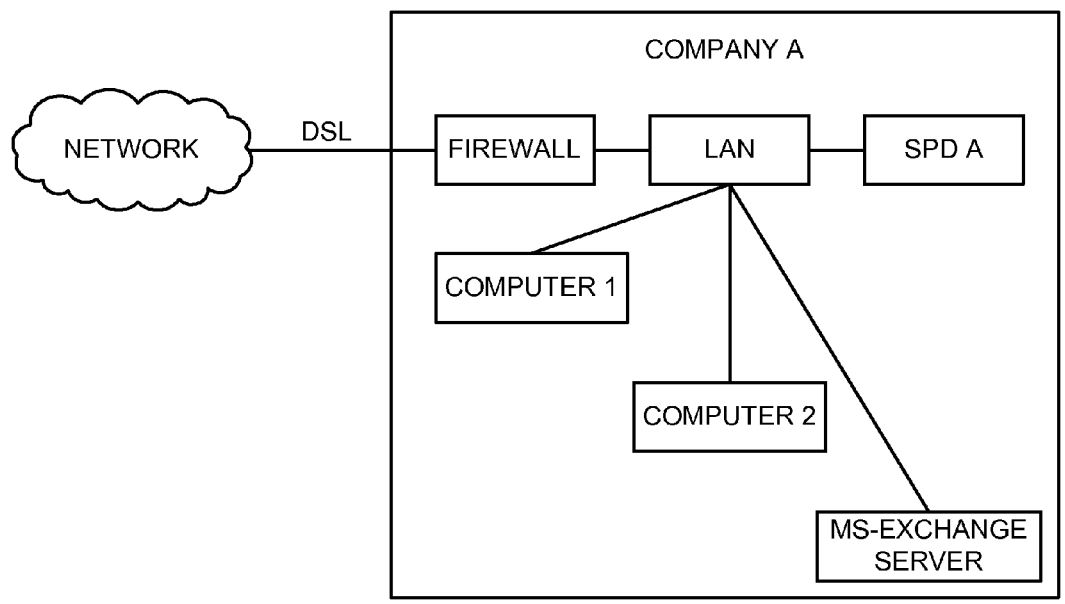
FIG. 18 is a block diagram illustrating a computer network having an MS-Exchange server.

For medium-to-large offices using MS Exchange, FIG. 18 illustrates a local MS-Exchange server for their mail services. In this example, Company A may have 3 conference rooms, and computers 1 and 2 may be running Outlook and the SPD Software Agent (SA). Note the more direct connections between the system components. Once again, routers, hubs, etc are assumed in the LAN bubble above but are omitted for clarity.

Figure 19:
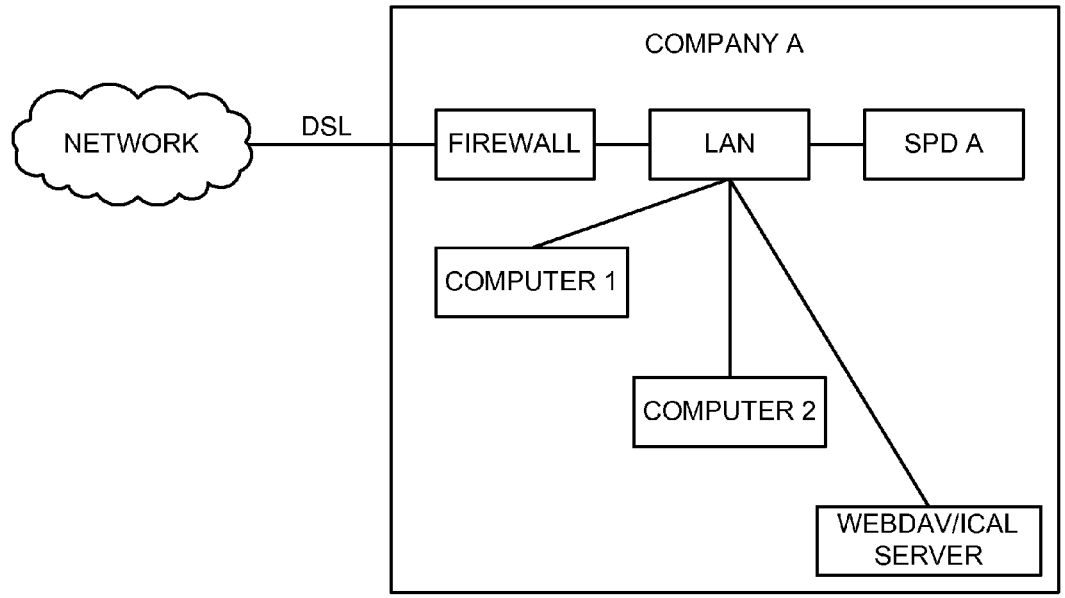
FIG. 19 is a block diagram illustrating another computer network.

For medium-to-large offices using off-site hosted WebDAV, FIG. 19 illustrates a local WebDAV server for iCalendar services. In this example, company A may have 3 conference rooms, and computers 1 and 2 may be running SPD management utilities and Software Agent (SA). Note the more direct connections between the system components. Once again, routers, hubs, etc are assumed in the LAN bubble above but are omitted for clarity.

In other embodiments (not shown), the SPDs may be used in systems that implement or use Microsoft Outlook and/or Lotus Notes (an application offered by IBM).

In some embodiments, the SPD 200 may be configured as a self-powered controlling device for embedded applications. Embedded applications may utilize consumables with a limited quantity. The SPD 200 may be configured to maximize a time between recharges and/or replacements for a limited consumable. For example, the SPD 200 may be configured as an embedded (or wearable) self-powered controlling device. In another example, the SPD 200 may be configured to operate in difficult to access and/or inaccessible locations. Increasing a time between recharges and/or replacement of the limited consumables (e.g., battery power) may increase the safety, utility, and/or number of applications of the SPD 200 and/or decrease operating costs.

A time between recharges may be driven by both power consumption of the SPD 200 and the depletion of a consumable. For example, operations by a CPU may result in power consumption. Generally, modern CPUs (or processors) may be "stepped down" to consume less power. However, a minimum clock rate for modern CPUs may still be much faster than a sampling rate of many real-time control applications. The SPD 200 may be configured to schedule procedures (or processes, or programs, or tasks) in a way that allows the SPD 200 to switch into "standby mode" (e.g., a low-power mode of operation). The standby mode of operation may be configured to conserve power of the battery 214. The SPD 200 may schedule procedures by exploiting contextual information.

The dynamic process (or plant) may be a process that receives an input based on various parameters. The parameters for the dynamic process may change as conditions (e.g., the environment) changes. The dynamic process may be controlled. Generally, the dynamic process is controlled to maintain a desired state. Control logic may be implemented to provide input for the dynamic process to maintain the desired state. Since the parameters for the dynamic process may change over time, the input to the dynamic system that maintains the desired state may not be consistent.

In one example, the SPD 200 may be implemented as a surgically implanted insulin pump. A dynamic process may be defined for regulating insulin in a patient. An actuator signal may be generated by the SPD 200 to steer the dynamic process into a desired state. Generally, there may be a plurality of actuator signals that may achieve the desired state of the dynamic process. Therefore, the actuator signal may be optimized (e.g., provide parameters selected to conserve power and/or to meet particular needs of the dynamic process). The SPD 200 may leverage contextual information to select the most appropriate optimizing criteria and/or system parameters to use for determining an output (e.g., the actuator signal) in the dynamic process.

Context information and/or historical data may be data collected by the SPD 200 and/or the remote device 104. The context information and/or historical data may be data that is relevant for creating and/or updating a predictive model for the dynamic process. For example, context information may be a measurement of environmental factors, operating conditions, past performance, and/or information from the sensory I/O subsystem 220. In some embodiments, the context information may provide feedback to the SPD 200. The context information may be used by the SPD 200 to determine and/or estimate computation times for calculating an output for the dynamic process. The context information may be used by state-of-the-art learning techniques to improve power and/or resource usage for the SPD 200.

The SPD 200 may be configured for various applications. In one example, the SPD 200 may be implemented as a surgically implanted insulin pump, glucose monitor and/or cardiac defibrillator. In another example, the SPD 200 may be implemented as a mini-bot for a swarm of mini-bots operating in a battle theater and/or underwater. The implementation of the SPD 200 may be varied according to the design criteria of particular application. In many applications, accessibility of the SPD 200 may be very limited (e.g., accessing a surgically implanted device many times for recharging or replacement may be impractical).

In some embodiments, the SPD 200 may control the consumption of a consumable. In one example, a space satellite may use propellant as the consumable. In another example, an insulin pump may use insulin as the consumable. In yet another example, for an embedded cardiac defibrillator an amount of charge of the battery 214 may be the consumable. In some embodiments, such as the embedded cardiac defibrillator, the actuator and the SPD 200 may both use the same resource (e.g., the electric charge of the battery 214). In some embodiments, the actuator consumable may not be the same as the power source of the SPD 200.

Figure 21:
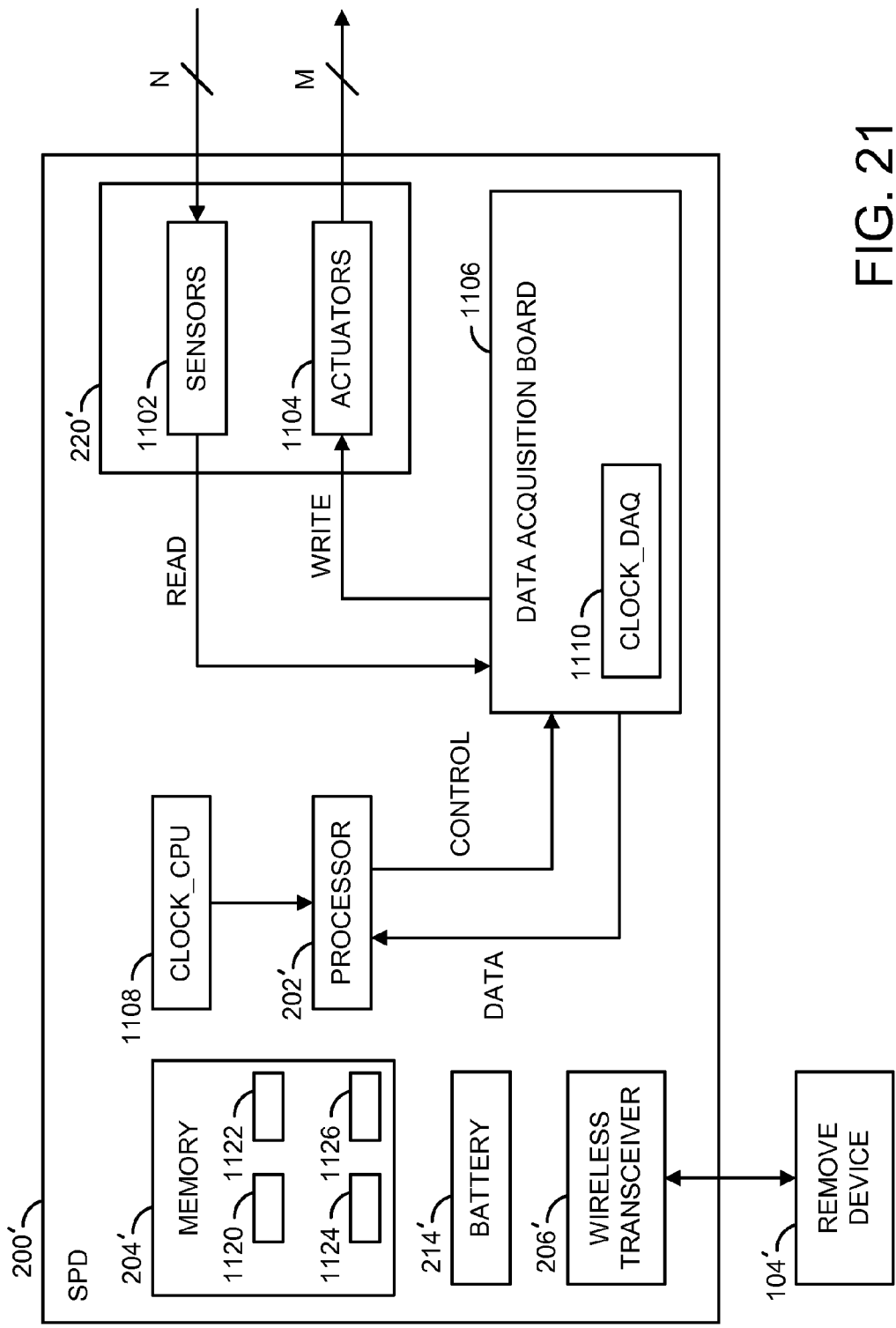
FIG. 21 is a block diagram illustrating an embodiment of a SPD with on-board DAQ and sensors/actuators.

Referring to FIG. 21, a block diagram illustrating an embodiment of the SPD 200' is shown. The SPD 200' is shown comprising the processor 202', the memory 204', the wireless transceiver 206', the battery 214', the sensory I/O subsystem 220', a block (or circuit) 1106 and a block (or circuit) 1108. The circuit 1106 may be a data acquisition board (DAQ). The circuit 1108 may be a clock generator circuit for the processor 202' (e.g., CLOCK_CPU). The sensory I/O subsystem 220' and/or the DAQ board 1106 may be on-board components of the SPD 200'. Other components may be implemented. The number and/or types of components comprising the SPD 200' may be varied according to the design criteria of a particular implementation.

The sensory I/O subsystem 220' is shown comprising a block (or circuit) 1102 and a block (or circuit) 1104. The circuit 1102 may be one or more sensors. The circuit 1104 may be one or more actuators. The DAQ board 1106 is shown comprising a block (or circuit) 1110. The circuit 1110 may be a clock generator circuit for the DAQ board 1106 (e.g., CLOCK_DAQ).

The clock rate of CLOCK_CPU 1108 may be faster (e.g., orders of magnitude faster) than the clock rate of CLOCK_DAQ 1110. The clock rate of CLOCK_CPU 1108 may be faster (e.g., orders of magnitude faster) than the sampling rate of the dynamic process. The clock rate of CLOCK_DAQ 1110 may be a multiple of the sampling rate of the dynamic process (e.g., based on the sampling rate of the dynamic process). The speed of the clock rates CLOCK_CPU 1108 and/or CLOCK_DAQ 1110 may be varied according to the design criteria of a particular implementation.

The processor 202' may be configured to generate a signal (e.g., CONTROL). The signal CONTROL may be presented to the DAQ board 1106. In some embodiments, the signal CONTROL may be a monitoring signal (e.g., for a smart sensing operation). The signal CONTROL may provide instructions to the DAQ board 1106. For example, the signal CONTROL may provide data for the DAQ board 1106 to write to the actuators 1104. In another example, the signal CONTROL may provide an instruction to hold (e.g., delay) operations of the DAQ board 1106. In yet another example, the signal CONTROL may provide monitoring logic to the DAQ board 1106. The instructions provided by the signal CONTROL may be varied according to the design criteria of a particular implementation.

The DAQ board 1106 may be configured to generate a signal (e.g., WRITE). The signal WRITE may be presented to the actuators 1104. The signal WRITE may be generated based on information received from the processor 202' (e.g., the monitoring signal CONTROL). The actuators 1104 are shown generating one or more signals in response to the signal WRITE. For example, the signal WRITE may provide a next output for the dynamic process (e.g., indicate an amount of the consumables generated by the actuators 1104).

The sensors 1102 may be configured to generate a signal (e.g., READ). The signal READ may be presented to the DAQ board 1106. The signal READ may comprise sensor information read by the sensors 1102. The sensors are shown receiving one or more signals. The sensors 1102 may sample a current state of the dynamic process. For example, the sensor information may comprise environmental data observed and/or calculated by the sensors 1102. The sensor information may provide information about the current state of the dynamic process.

The DAQ board 1106 may be configured to generate a signal (e.g., DATA). The signal DATA may be presented to the processor 202'. The signal DATA may be generated in response to the signal READ. The signal DATA may provide the processor 202' with the sensor information. The processor 202' may process the sensor information received from the DAQ board 1106.

The memory 204' may be configured to store data. The memory 204' is shown comprising a block (or circuit) 1120, a block (or circuit) 1122, a block (or circuit) 1124 and a block (or circuit) 1126. The circuit 1120 may store a predictive model for the dynamic process. The circuit 1122 may store context information. The circuit 1124 may store a current state of the dynamic process. The circuit 1126 may store scheduling data for the SPD 200'. Other types of data may be stored in the memory 204'. The various other types of data stored by the memory 204' may be varied according to the design criteria of a particular implementation.

In some embodiments, the memory 204' may be configured to store the predictive model 1120 for the dynamic process. The predictive model 1120 stored in the memory 204' may be updated based on information calculated by the processor 202'. The predictive model 1120 for the dynamic process may be used by the processor 202' to determine and/or estimate a computation time for various states of the dynamic process.

In some embodiments, the memory 204' may store the context information 1122. The context information 1122 may be based on the environmental data (e.g., sensor information) observed by the sensors 1102 and/or processed by the processor 202'. The context information 1122 may be used by the processor 202' to update the predictive model 1120.

In some embodiments, the memory 204' may store information related to the current state 1124 of the dynamic process. The current state 1124 of the dynamic process may be used by the processor 202' to determine a next output for the dynamic process. The current state 1124 may be determined by the processor 202'. The processor 202' may determine the current state 1124 based on the sensor information sampled by the sensors 1102.

In some embodiments, the memory 204' may store the scheduling data 1126 for the SPD 200'. The scheduling data 1126 may be one or more procedures (or processes, or programs, or tasks) to be executed by the SPD 200'. For example, the scheduled procedures 1126 may comprise reading the sensor information from the sensors 1102, writing data to the memory 204', writing data to the actuators 1104, providing monitoring logic to the DAQ board 1106, communicating to an external device (e.g., the remote device 104', an external device, another one of the SPDs 200', etc.), entering a standby mode of operation to conserve power, etc. For example, one of the procedures of the SPD 200' may transmit the monitoring logic signal (e.g., CONTROL) to an external device. The types of procedures may be varied according to the design criteria of a particular implementation.

The processor 202' may generate the monitoring signal (e.g., CONTROL). The monitoring signal may be generated in response to the sensor information, the predictive model 1120 and/or the desired state of the dynamic process. The processor 202' may be configured to determine the computation times of the procedures. The computation times may be based on the context information 1122 and/or the predictive model 1120. In some embodiments, the computation times may be based on the desired state of the dynamic process. The scheduling data 1126 may be determined by the processor 202'. The scheduling data 1126 may be based on the sampling rate of the dynamic process, the computation times as determined by the processor 202' and/or opportunities to enter the standby mode of operation. The processor 202' may be further configured to determine the context information 1122 based on the sensor information and/or information from the remote device 104'.

The wireless transceiver 206' may be configured to send/receive data to/from external devices. The wireless transceiver 206' is shown connected to the remote device 104'. In some embodiments, the remote device 104' may be configured to provide the SPD 200' with the context information 1122. The wireless transceiver 206' may receive the context information 1122 from the remote device 104' and present the context information to the processor 202' and/or the memory 204'. In some embodiments, the wireless transceiver 206' may be configured to connect to another one of the SPDs 200'. For example, the SPD 200' may be one device of a network of devices. The network of devices may comprise of multiple SPDs 200' and/or other devices (e.g., routers, repeaters, switchers, sensor systems, the remote device 104', etc.).

The battery 214' may be configured to provide power to the SPD 200' and/or the various components comprising the SPD 200'. The capacity and/or chemistry of the battery 214' may be varied according to the design criteria of a particular implementation. The battery 214' may be rechargeable and/or replaceable. In some embodiments, the battery 214' may be the consumable (e.g., the output) for the dynamic process.

Figure 22:
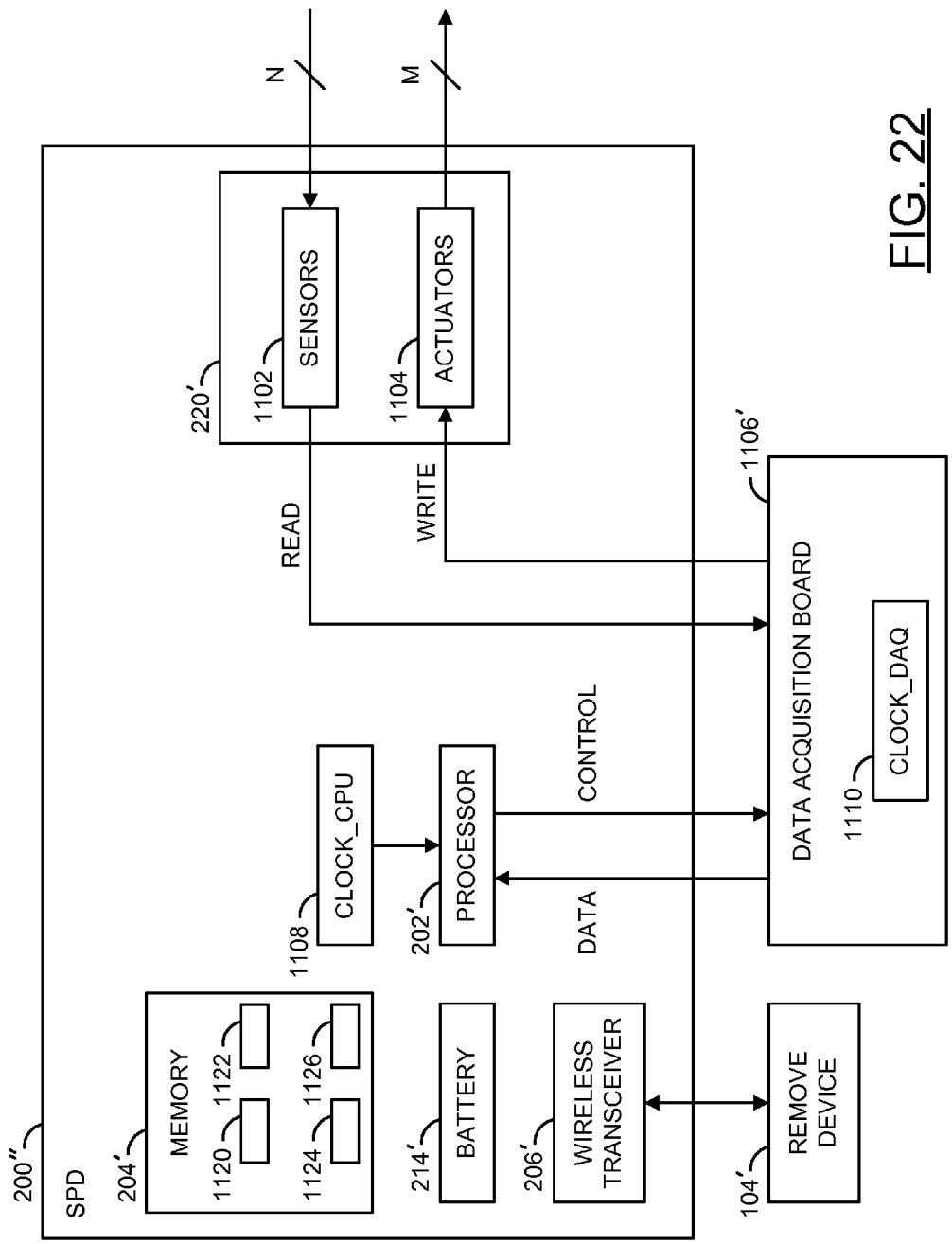
FIG. 22 is a block diagram illustrating an embodiment of a SPD with on-board sensors/actuators connected to a DAQ.

Referring to FIG. 22, a block diagram illustrating an alternate embodiment of the SPD 200'' is shown. The SPD 200'' is shown comprising the processor 202', the memory 204', the wireless transceiver 206', the battery 214', the sensory I/O subsystem 220' and/or the CLOCK_CPU 1108. Other types of components may comprise the SPD 200''.

The SPD 200'' is shown connected to the remote device 104' and/or the external DAQ board 1106'. The external DAQ board 1106' may be configured as an off-board (e.g., external) component of the SPD 200''. Generally, an interface may be implemented between the SPD 200'' and the external DAQ board 1106'. In some embodiments, the external DAQ board 1106' may be configured to generate the signals DATA and/or WRITE and/or receive the signals CONTROL and/or READ for one or more of the SPDs 200''. For example, the DAQ board 1106' may allow for a more distributed network of devices. The proximity of the external DAQ board 1106' to the SPD 200'' may be varied according to the design criteria of a particular implementation.

Figure 23:
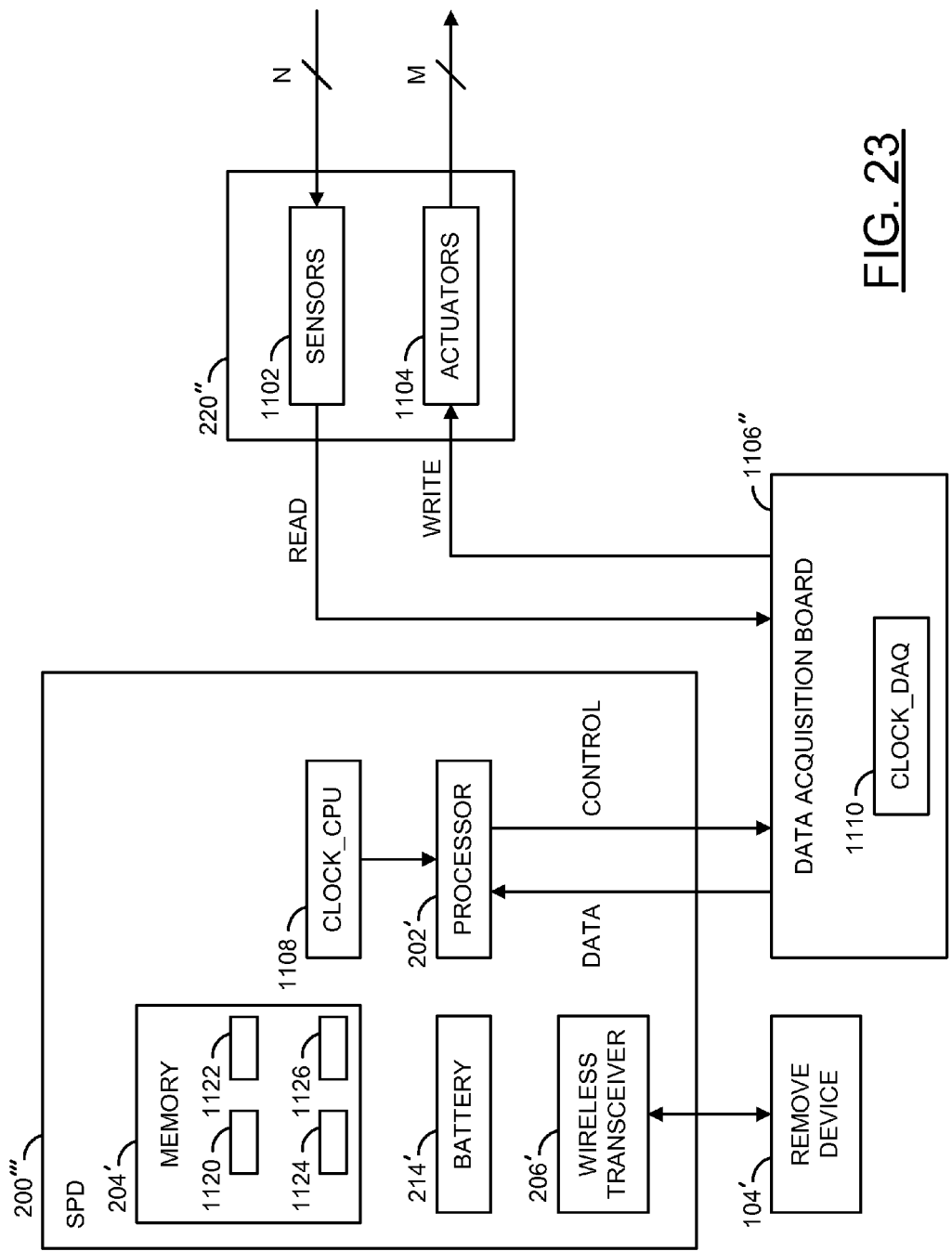
FIG. 23 is a block diagram illustrating an embodiment of a SPD connected to a DAQ.

Referring to FIG. 23, a block diagram illustrating an alternate embodiment of the SPD 200''' is shown. The SPD 200''' is shown comprising the processor 202', the memory 204', the wireless transceiver 206', the battery 214' and/or the CLOCK_CPU 1108. Other types of components may comprise the SPD 200'''.

The SPD 200''' is shown connected to the remote device 104', the DAQ board 1106'' and/or the sensory I/O subsystem 220''. The DAQ board 1106'' and/or the sensory I/O subsystem 220'' may be configured as off-board (e.g., external) components of the SPD 200'''. Generally, an interface may be implemented between the SPD 200''' and the external DAQ board 1106'', between the SPD 200''' and the external sensory I/O subsystem 220'' and/or between the external DAQ board 1106'' and the external sensory I/O subsystem 220''.

In some embodiments, the DAQ board 1106'' may be configured to generate the signals DATA and/or WRITE and/or receive the signals CONTROL and/or READ for one or more of the SPDs 200''' and/or one or more of the sensory I/O subsystems 220''. In some embodiments, the external sensory I/O subsystem 220'' may be configured to generate the signal READ and/or receive the signal WRITE from one or more of the SPDs 200''' and/or the DAQ boards 1106''. For example, the external DAQ board 1106'' and/or the external sensory I/O subsystem 220'' may allow for a more distributed network of devices. The proximity of the external DAQ board 1106'' to the SPD 200''' and/or the external sensory I/O subsystem 220'' may be varied according to the design criteria of a particular implementation. The proximity of the external sensory I/O subsystem 220'' to the SPD 200''' may be varied according to the design criteria of a particular implementation.

Figure 24:
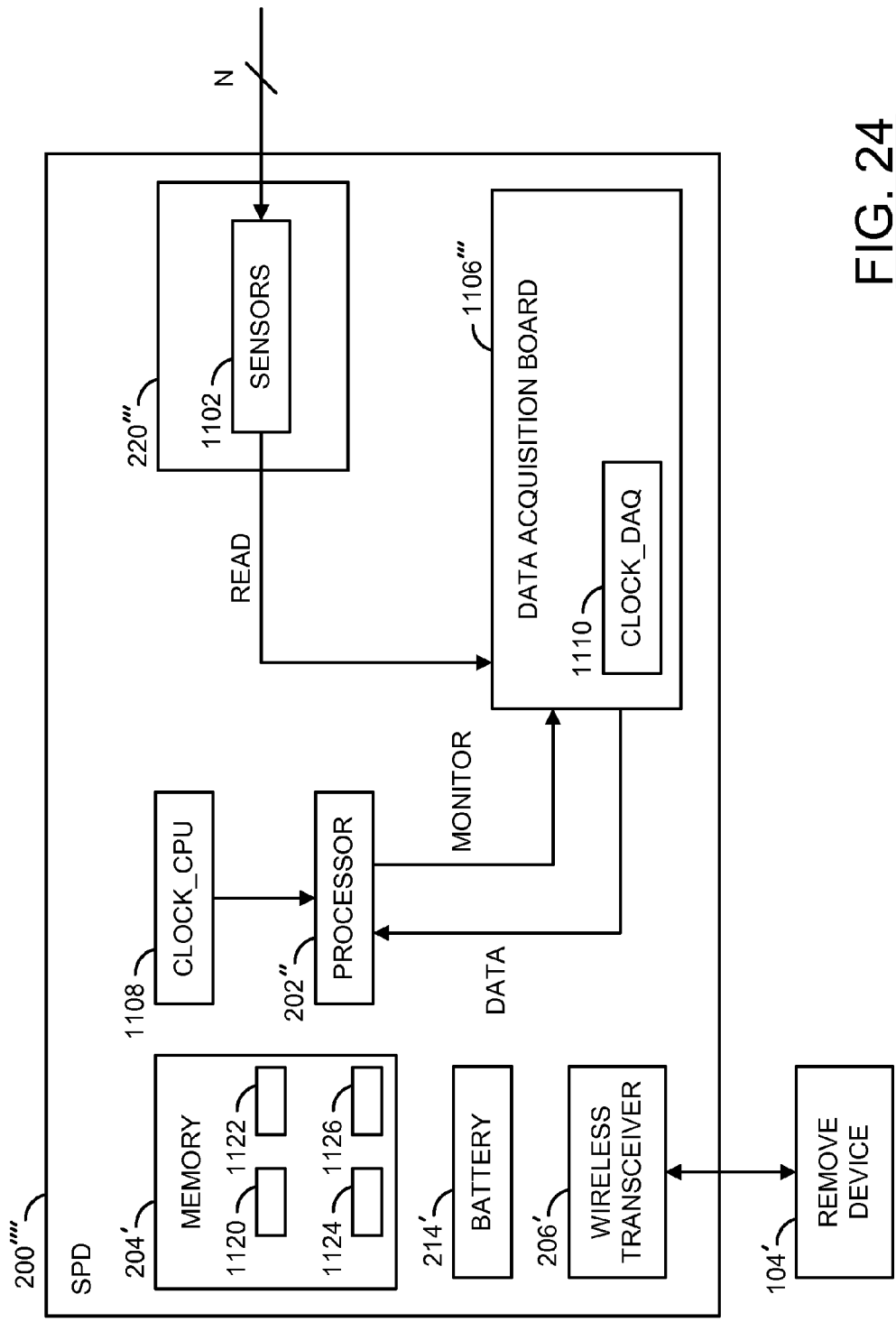
FIG. 24 is a block diagram illustrating an embodiment of a SPD smart sensor.

Referring to FIG. 24, a block diagram illustrating an embodiment of a SPD smart sensor 200'''' is shown. The SPD smart sensor 200'''' is shown comprising the processor 202'', the memory 204', the wireless transceiver 206', the battery 214', the sensory I/O subsystem 220''', the DAQ board 1106''' and/or the CLOCK_CPU 1108. Other types of components may comprise the SPD smart sensor 200''''. For example, The DAQ board 1106''' may be implemented on the SPD smart sensor 200'''' and/or as an off-board (e.g., external) component similar to the DAQ board 1106' and/or the DAQ board 1106''. Similarly, the sensory I/O subsystem 220''' may be implemented on the SPD smart sensor 200'''' and/or as an off-board (e.g., external) component similar to the sensory I/O subsystem 220''.

The SPD smart sensor 200'''' may be configured to implement a smart sensing operation. The processor 202'' may be configured to generate a signal (e.g., MONITOR). The signal MONITOR may be presented to the DAQ board 1106'''. The signal MONITOR may be a monitoring signal (e.g., for the smart sensing operation). The signal MONITOR may provide instructions to the DAQ board 1106'''. For example, the signal MONITOR may provide an instruction to hold (e.g., delay) operations of the DAQ board 1106'''. In another example, the signal MONITOR may provide monitoring logic to the DAQ board 1106''' (e.g., instructions on when and/or how to operate the sensors 1102). The instructions provided by the signal MONITOR may be varied according to the design criteria of a particular implementation.

The sensory I/O subsystem 220''' may comprise the sensors 1102. Generally, the smart sensing operation may not need to implement an output (e.g., the actuators 1104 may not be needed). The sensory I/O subsystem 220''' may present the signal READ from the sensors 1102.

In some embodiments, the DAQ board 1106''' may be configured to generate the signal DATA and/or receive the signals MONITOR and/or READ for one or more of the SPD smart sensors 200''''. In some embodiments, the external sensory I/O subsystem 220''' may be configured to generate the signal READ. The signal DATA may be presented by the DAQ board 1106''' to provide data from the smart sensing operation to the processor 202''. The smart sensing operation may be the dynamic process.

Real-time control applications may be characterized by a regulation and/or control of an external process (e.g., the dynamic process) through the use of feedback. Generally, a controller (e.g., the processor 202') samples the dynamic process, computes the actuator signals (e.g., the signal CONTROL) and presents the actuator signal to the actuator 1104 (e.g., the signal WRITE). The actuators 1104 may provide the output for the dynamic process. For example, the output may be the consumable having the limited supply. A control loop may be repeated periodically at some prescribed sampling rate (e.g., the sampling rate of the dynamic process).

The sampling rate of the dynamic process may be orders of magnitude lower than a clock rate of modern CPUs and micro controllers (e.g., the CLOCK_CPU 1108). The processor 202' may be configured to schedule the calculations for all the control loops of the dynamic process in a way that allows the SPD 200' to opportunistically switch to a standby mode of operation. The computation time for each control loop may depend on the current state 1124 of the dynamic process and/or other environmental factors. The SPD 200' may be configured to use machine learning techniques and/or the context information 1122 to constantly adjust and/or adapt the schedule data 1126. By using the predictive model 1120 for the dynamic process combined with the context information 1122 to create scheduling data 1126 for the procedures, the power consumption of the SPD 200' may become more efficient (e.g., optimized).

In some embodiments, the usage of the consumable may also be calculated for more efficient usage (e.g., optimize actions of the actuator 1104). In many applications, a plurality of control signals may be implemented to steer and/or regulate the dynamic process into the desired state. The SPD 200' may be configured to calculate and/or select control signals under some criteria that is a function of the consumable (e.g., optimize the control signal for the particular application and/or desired state). However, restrained use of the consumable often increases a settling time of the dynamic process (e.g., the time required by the dynamic process to achieve the desired state).

The SPD 200' may be configured to select appropriate criteria, determine tradeoffs and/or determine system parameters to use for calculating the control signals. For example, if the SPD 200' is implemented as a human-implantable device and a subject using the device is undergoing a period of intense physical activity (or is under a lot of stress) then the SPD 200' may be configured to be less mindful of the consumable depletion rate and more mindful of the settling time. In another example, during periods of low physical activity (or low stress), the SPD 200' may be configured to pay less attention to the settling time and more attention to the usage rate of the consumable. The context information 1122 is therefore crucial in the selection of the appropriate criteria and/or tradeoffs to use for the control optimization.

The SPD 200' may be configured to implement a control law for the dynamic process. The SPD 200' may read the sensor information as input from the signal DATA to determine the current state 1124 of the dynamic process (e.g., which is an output from a perspective of the dynamic process). Next, the SPD 200' may compute a next control output generated as the signal CONTROL (e.g., which is an input from the perspective of the dynamic process). The DAQ board 1106 may write the controller output to the actuator 1104 using the signal WRITE. The control law procedure may be repeated. The control law procedure may operate under the sampling period T (e.g., the sampling rate of the dynamic process). Therefore, the hardware (e.g., components) of the SPD 200' may be selected such that the computation of the next control output (e.g., the signal CONTROL) takes less time than the sampling rate T.

The SPD 200' may be configured to implement smart and/or composite sensors (e.g., the sensors 1102). In some embodiments, the computation of the next control output (e.g., CONTROL) may represent monitoring logic for a smart sensing operation. The smart sensing operation may be detecting a face in an image, counting the number of people in a room, detecting motions/gestures, etc. For embodiments of the SPD 200' implementing a smart sensing and/or monitoring operations, a step of writing the controller output to the actuator 1104 may be absent. For example, in a smart sensing operation the actuators 1104 may not be part of the SPD 200'

In embedded applications, maximizing the time between replacements and/or recharges is often desirable. The SPD 200' may increase the time between replacements and/or recharges using energy harvesting techniques and/or switching between various modes of operation (e.g., switching to the standby mode of operation). In embedded control applications, the SPD 200' may be more efficiently operated than in general purpose operations. For example, the dynamic process may introduce various constraints. The constraints may be used to form a model (e.g., the predictive model 1120). Using the context information 1122, the predictive model 1120 may be updated to provide more accurate estimations of computation times. More accurate estimations of computation times may allow the processor 202' to arrange the procedures in the scheduling data 1126 in a way that allows the SPD 200' to opportunistically enter the standby mode of operation more frequently and/or for longer continuous stretches of time.

The time between recharges may be driven by both a depletion of the consumable and the power consumption of the SPD 200'. The SPD 200' may be configured to perform dynamic scheduling for the dynamic process. The CLOCK_CPU 1108 may be orders of magnitude faster than the sampling rate T of the dynamic process being controlled. While the processor 202' may be "stepped down" to consume less power, the minimum clock rate of CLOCK_CPU 1108 may still be much faster than the sampling rate T. The SPD 200' may be configured to schedule the procedures in a way that allows the SPD 200' to switch into the standby mode periodically. Scheduling the SPD 200' to enter the standby mode of operation may be performed by exploiting the context information 1122.

In some embodiments, the SPD 200' may be configured to perform context-based control. The actuator signal (e.g., WRITE) may be configured to steer the dynamic process into a desired state. Entering the desired state may be related to controllability in control theory. In many applications there may be a plurality of actuator signals capable of achieving the desired state for the dynamic process. Control theory may be used to determine efficient signals. However, selection of the optimizing criteria and/or system parameters to use depend on context. The context information 1122 may be used to determine the criteria and/or system parameters. For example, optimal control theory mainly deals with how to solve the problem of entering the desired state. The SPD 200' may use the context information 1122 to determine what to solve.

The SPD 200' may be configured to perform adaptive procedure scheduling for the dynamic process. Adaptive procedure scheduling may enable the SPD 200' to arrange (and continuously or periodically re-arrange) the scheduling data 1126 to allow the SPD 200' to enter the standby mode of operation (or any other desired mode of operation). The predictive model 1120 may be used to determine and/or estimate computation times for procedures executed by the SPD 200'. The predictive model 1120 may be updated and/or refined based on the context information 1122 and/or feedback from the dynamic process. Based on the computation times estimated by the processor 202', the scheduling data 1126 may be determined.

The SPD 200' may be configured to connect to one or more of the sensors 1102 through dedicated connections (wired and/or wireless). Each of the sensors 1102 may be configured to be read (e.g., present the signal READ) by the DAQ board 1106. The sensors 1102 may be read simultaneously and/or nearly simultaneously. Output information for the actuators 1104 (e.g., the signal WRITE) may be written to the actuators 1104 by the DAQ board 1106. The actuators 1104 may be written to simultaneously and/or nearly simultaneously. For example, at every time CLOCK_DAQ, the DAQ board 1106 may read from the sensors 1102 and/or write to the actuators 1104.

The SPD 200' may be configured to instruct the DAQ board 1106 to skip a reading of the sensors 1102 and/or a writing of the actuators 1104 (e.g., for the next period CLOCK_DAQ). The DAQ board 1106 may be configured to operate semi-independently from the SPD 200'. For example, the DAQ board 1106 may generally perform read and/or write operations without instructions from the processor 202'. However, the processor 202' may instruct the DAQ board 1106 to stop and/or start performing particular operations.

The processor 202' may operate much faster (e.g., the clock rate from the CLOCK_CPU 1108) than the rate of the clock signals from the CLOCK_DAQ 1110. The processor 202' may execute a real-time operating system (e.g., stored in the memory 204'). The SPD 200' may operate under a limited power budget (e.g., determined based on the battery 214').

The dynamic (or evolving) process may be defined by the equation:

$$x\_k+1 = f(x\_k, u\_k) \quad (1)$$

The output of the dynamic process may be defined by the equation:

$$y\_k = g(x\_k) \quad (2)$$

The vector x may be the state vector. The vector u may be the input vector (e.g., an output from the actuators 1104). The vector y may be the output (or observable) vector (e.g., an input for the sensors 1102). Equations (1) and (2) may be a discrete representation of the dynamic process with the sampling rate T.

The processor 202' may implement a feedback law represented by the equation:

$$u\_k = h(y\_k-1, y\_k-2, \ldots, u\_k-1, u\_k-2, \ldots) \quad (3)$$

The dynamic process may be known or unknown, and the feedback law may be a linear controller, a non-linear controller a dynamic process, etc. The processor 202' may regulate and/or control the process under the same sampling rate T.

Similar equations may apply for embodiments implementing the smart and/or composite sensors (e.g., smart sensing). The function h( ) described in equation (3) may represent the smart sensing operation (e.g., detecting a face in an image, counting the number of people in a room, detecting motions, etc. . . . ). For smart sensing operations, the function h( ) may not be provided as feedback for the dynamic process.

The processor 202' may implement a control law by reading the input (e.g., the signal READ from the sensors 1102), computing a next control output for the dynamic process, writing the next output to the actuators 1104 (e.g., the signal WRITE to provide the consumable having a limited supply), and repeating the control law procedure. Since the control law may be designed to operate under the sampling rate T, the hardware of the SPD 200' may be selected such that computing the next control output for the dynamic process takes less time than the sampling rate T.

The processor 202' may be capable of executing the computation of the next control output for the dynamic process much faster than the sampling rate T. In many dynamic processes faster computation may not result in improved performance. For example, if the dynamic process comprises adjusting pressure in a water tank, changing the sampling rate T from 0.1 s to 0.01 s may not improve performance because the pressure may not be able to oscillate faster than a certain amount (e.g., a constraint of 5 Hz).

Since faster computation may not improve performance of the dynamic process, the SPD 200' may take advantage of the faster computation by opportunistically entering the standby mode of operation. For example, after computing the next control output for the dynamic process, the SPD 200' may enter the standby mode until the step of writing the next output to the actuators 1104 is due (e.g., reactivate for the next scheduled procedure).

The same SPD 200' may be configured to execute many similar control loops. Opportunistically entering the standby mode of operation may be scaled up for many executions of the control loop.

The dynamic process performed by the SPD 200' may comprise multiple procedures (e.g., k procedures). For example, the k procedures may be computational procedures (or programs, or tasks) that run within an operating system of the SPD 200'. Each procedure k may have a control loop. The processor 202' may be configured to compute the next output for the procedure k. The computation time may be a time value (e.g., C_k). The sampling rate of the procedure k may be T_k. T_k may be a multiple of the CLOCK_DAQ 1110:

$$T\_k = n\_k \ast \text{CLOCK\_DAQ}, \text{ for } n\_k = \{(1,2,3,\ldots)\} \quad (4)$$

In some embodiments, n_k may be equal to 1 for all k procedures (e.g., each value n_k is equal). The total computation time by the processor 202' may be:

$$C\_\text{total} = C\_1 + C\_2 + C\_3 + \quad (5)$$

The SPD 200' may be able to enter the standby mode of operation for a time:

$$\text{Standby\_total} = \text{CLOCK\_DAQ} - C\_\text{total} - T\_o \quad (6)$$

The time T_o may represent an overhead cost (e.g., switching between modes of operation, other instructions that may be executed before entering the standby mode of operation, etc.). After the processor 202' calculates the next output for the procedure k, the SPD 200' may enter the standby mode of operation for a fraction of the time Standby_total:

$$\text{Standby\_}k = (\text{CLOCK\_DAQ} - C\_\text{total} - T\_o)/\text{CLOCK\_DAQ} \quad (7)$$

In some embodiments, the values for n_k may not be equal to 1 and/or not be equal to other values of n_k. For an example dynamic process where n_1 = n_2 = 2 and C_1 + C_2 < CLOCK_DAQ, the SPD 200' may be configured such that there may be no computation for every other period CLOCK_DAQ. The standby ratio may be:

$$\text{Standby}=(\text{CLOCK\_DAQ}-0.5*C\_\text{total}-T\_o)/\text{CLOCK\_DAQ} \quad (8)$$

If the SPD 200' was to schedule the procedures 1 and 2 in different alternating periods, the standby ratio may be:

$$\text{Standby}=(\text{CLOCK\_DAQ}-0.5*C\_\text{total}-2*T\_o)/\text{CLOCK\_DAQ} \quad (9)$$

The standby ratio in equation (9) is less than the standby ratio in equation (8).

To increase the standby ratio, the SPD 200' may schedule the procedures such that entire "buckets" (e.g., timeslots) of width CLOCK_DAQ are empty (e.g., for n_k=1 and n_k'=2 and so on). Scheduling the procedures such that entire timeslots of CLOCK_DAQ are empty may reduce (e.g., minimize) the negative impact caused by the overhead T_o. The arrangement of the procedures may be stored in the scheduling data 1126. In some embodiments, each of the k procedures may have different priorities. Within each of the timeslots the procedure with the higher priority may be scheduled first.

The SPD 200' may be configured to schedule the procedures in order to increase the amount of time the SPD 200' may enter the standby mode of operation. The scheduling data 1126 may depend on the values of the computation times (e.g., C_1, C_2, C_3, etc.). Generally, the computation times may not be known in advance. For example, one of the computation times C_k may depend on the state of the procedure k and/or the context information 1122.

Figure 25:
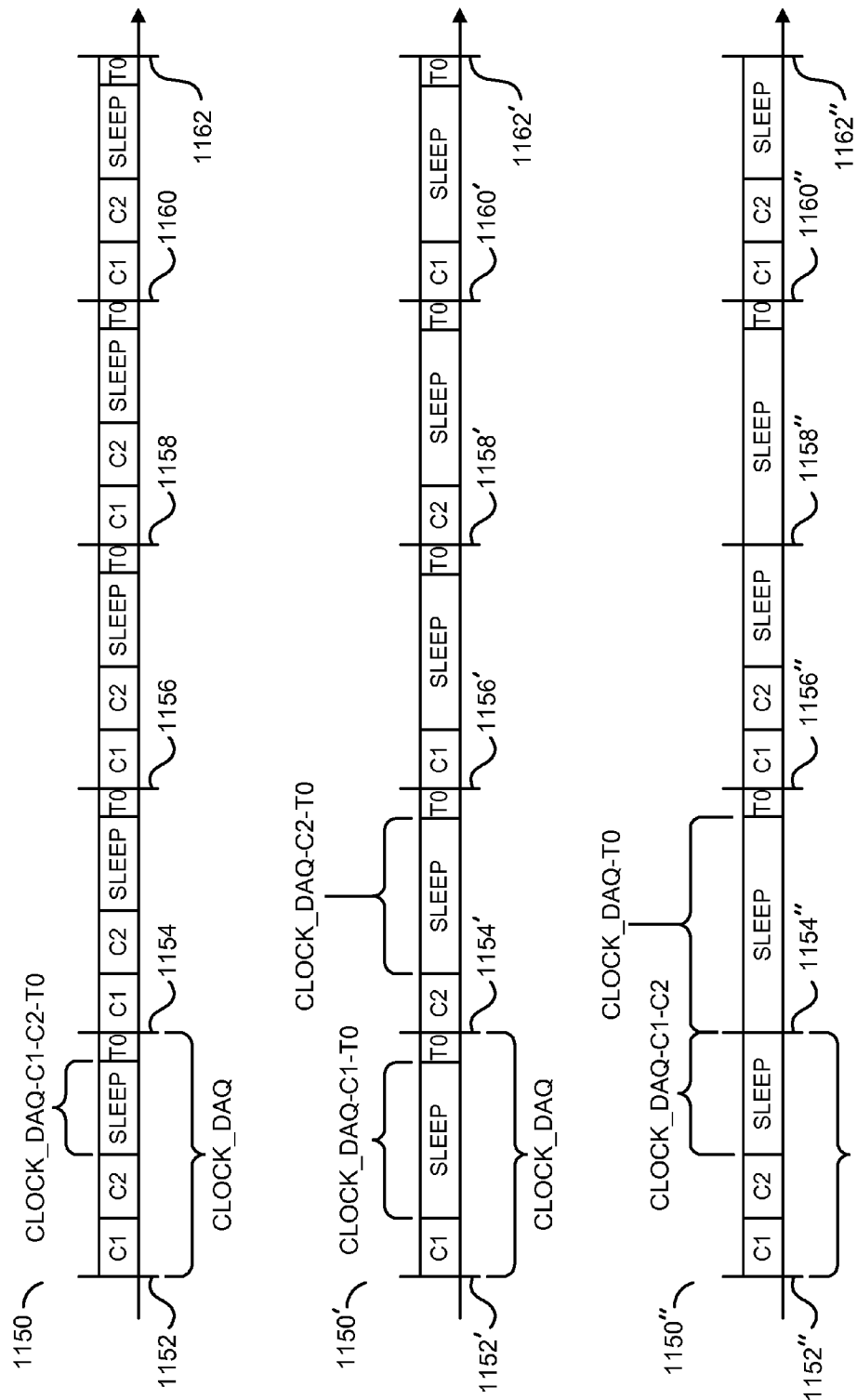
FIG. 25 is a diagram illustrating procedures scheduled for a dynamic process.

Referring to FIG. 25, a diagram illustrating timing diagrams for procedures scheduled for the dynamic process is shown. A first example schedule 1150, a second example schedule 1150' and a third example schedule 1150" are shown comprising two procedures (e.g., T1 and T2). Using the processor 202' (e.g., to compute the signal CONTROL and/or MONITOR), the procedure T1 may have a computation time C1 and the procedure T2 may have a computation time C2. The total computation time for the procedures T1 and T2 may fit within a single sampling period (e.g., C1+C2<CLOCKDAQ-T_o). For a numeric example, the computation time for C1 and C2 may be 0.25*CLOCK_DAQ and T_o may be 0.1*CLOCK_DAQ.

For the sample schedule 1150, the two procedures T1 and T2 may each have a sampling requirement equal to CLOCK_DAQ (e.g., T1=T2=CLOCK_DAQ). The sample schedule 1150 may have multiple periods each having a length CLOCK_DAQ. A first example period may start at a line 1152 and end at a line 1154. A second example period may start at the line 1154 and end at a line 1156. A third example period may start at the line 1156 and end at a line 1158. A fourth example period may start at the line 1158 and end at a line 1160. A fifth example period may start at the line 1160 and end at a line 1162.

The sample schedule 1150 shows each period comprising the procedure T1, the procedure T2, the standby mode of operation (e.g., SLEEP) and the overhead time T_o. Since there is overhead in switching from the standby mode of operation to the procedure T1, each period has the overhead time T_o. The sleep ratio (or standby ratio) may be:

$$\text{Standby}=(\text{CLOCK\_DAQ}-C1-C2-T\_o)/\text{CLOCK\_DAQ} \quad (10)$$

Using the numeric example, the sleep ratio may be 40%.

For the sample schedule 1150', the two procedures T1 and T2 may each have a sampling requirement equal to double CLOCK_DAQ (e.g., T1=T2=2*CLOCK_DAQ). The sample schedule 1150' may have multiple periods each having a length CLOCK_DAQ. A first example period may start at a line 1152' and end at a line 1154'. A second example period may start at the line 1154' and end at a line 1156'. A third example period may start at the line 1156' and end at a line 1158'. A fourth example period may start at the line 1158' and end at a line 1160'. A fifth example period may start at the line 1160' and end at a line 1162'.

The sample schedule 1150' may have the procedure T1 and the procedure T2 scheduled in different alternating periods (e.g., the procedure T1 is in a period bounded by the lines 1152' and 1154', then the procedure T2 is in a period bounded by the lines 1154' and 1156'). The sample schedule 1150' shows each period alternating between comprising the procedure T1, the standby mode of operation (e.g., SLEEP) and the overhead time T_o, and the procedure T2, the standby mode of operation (e.g., SLEEP) and the overhead time T_o. Since there is overhead in switching from the standby mode of operation to the procedure T1 or to the procedure T2, each period has the overhead time T_o. The sleep ratio (or standby ratio) may be:

$$\text{Standby}=(\text{CLOCK\_DAQ}-0.5*(C1+C2)-T\_o)/\text{CLOCK\_DAQ} \quad (11)$$

Using the numeric example, the sleep ratio may be 65%.

For the sample schedule 1150", the two procedures T1 and T2 may each have a sampling requirement equal to double CLOCK_DAQ (e.g., T1=T2=2*CLOCK_DAQ) as in the sample schedule 1150'. The sample schedule 1150" may have multiple periods each having a length CLOCK_DAQ. A first example period may start at a line 1152" and end at a line 1154". A second example period may start at the line 1154" and end at a line 1156". A third example period may start at the line 1156" and end at a line 1158". A fourth example period may start at the line 1158" and end at a line 1160". A fifth example period may start at the line 1160" and end at a line 1162".

The sample schedule 1150" may be configured for longer spans in the standby mode of operation (e.g., "long naps"). The sample schedule 1150" shows each period alternating between comprising the procedure T1, the procedure T2 and the standby mode of operation (e.g., SLEEP), and the standby mode of operation (e.g., SLEEP) and the overhead time T_o. Since there is no overhead while the SPD 200' remains in the standby mode of operation between periods and there is overhead in switching from the standby mode of operation to the procedure T1 only one of the two alternating periods has the overhead time T_o. The sleep ratio (or standby ratio) may be:

$$\text{Standby}=(\text{CLOCK\_DAQ}-0.5*(C1+C2)-0.5*T\_o)/\text{CLOCK\_DAQ} \quad (11)$$

Using the numeric example, the sleep ratio may be 70%. Generally, longer spans of time in the standby mode of operation may reduce the overhead of entering and/or waking up from the standby mode of operation.

The SPD 200' may be configured to store the predictive model 1120 and/or the context information 1122. Learning techniques may be implemented to estimate statistics for the computation times (e.g., C_1, C_2, C_3, etc.) under different conditions. The estimated statistics may be part of the prediction model 1120. The various conditions may be part of the context information 1122. In one example, the machine learning techniques may be implemented by the SPD 200'. In another example, the machine learning techniques may be implemented by the remote device 104' and transmitted to the SPD 200' via the wireless transceiver 206'.

The prediction model 1120 may provide useful information to the SPD 200'. For example, the prediction model 1120 may indicate that for a situation where n_1=n_2=3 the computation times C_1+C_2 may be less than CLOCK_DAQ on average. The processor 202' may attempt to schedule both of the procedures in one timeslot (e.g., to reduce the cost of overhead). However, if a variance of one of the procedures is large then the processor 202' may not schedule both of the procedures in one timeslot. For example, the processor 202' may determine there is too much risk of the sum of the computation times C_1 and C_2 exceeding the timeslot CLOCK_DAQ. If the computation times exceed the timeslot CLOCK_DAQ, there may be a detrimental effect on the dynamic process.

Using the predictive model 1120 and the context information 1122, the procedures may be arranged to increase the amount of time the SPD 200' may be in the standby mode (e.g., to conserve power). The scheduling data 1126 may be proactively re-arranged (e.g., shuffled). For example, the scheduling data 1126 may be re-arranged in anticipation of new conditions affecting the values of the computation times (e.g., C_1, C_2, C_3, etc.). The predictive model 1120 may be updated based on feedback from the SPD 200' related to the performance of the dynamic process (e.g., the current state 1124 of the dynamic process) and the context information 1122.

One or more features (or components) of the SPD 200' may be powered down in the standby mode of operation. The one or more features (or components) of the SPD 200' powered down during the standby mode of operation may be separate from the DAQ board 1106. For example, the SPD 200' may be powered down separately from the DAQ board 1106. The DAQ board 1106 may be configured to execute (e.g., schedule) read/write operations to/from the sensory I/O subsystem 220' semi-independently from the processor 202' (e.g., the DAQ board 1106 may continue to operate while the processor 202' is in a low duty-cycle mode).

The SPD 200' may be configured to perform embedded control applications. For example, the SPD 200' may not be a stand-alone computer. In some embodiments, the SPD 200' may be configured as a real-time system to take into account deadlines and/or time limits that may be considered crucial. For example, some of the procedures in the scheduling data 1126 may be considered as hard (or firm) deadlines (e.g., a deadline considered too important to miss). In another example, some of the procedures in the scheduling data 1126 may be considered soft deadlines (e.g., a deadline that may be missed depending on context). The types of procedures in the scheduling data 1126 may be varied according to the design criteria of a particular implementation.

The processor 202' may be configured to consider hard (or firm) and/or soft deadlines as part of the criteria for determining the scheduling data 1126. For example, the processor 202' may schedule procedures that are considered hard deadlines to ensure the hard deadlines are not missed (e.g., a hard deadline may be scheduled first in a timeslot, while a soft deadline may be scheduled second in the same timeslot to ensure that only the soft deadline may potentially be missed). In another example, the soft deadlines may be scheduled such that the SPD 200' occasionally misses the soft deadline in favor of conserving power. For example, a soft deadline may be missed and/or delayed to allow the SPD 200' to enter the standby mode of operation. The scheduling of soft and/or hard deadlines may be based on the context information 1122.

The SPD 200' may be configured to schedule multiple feedback computations into a single timeslot (or bucket) to reduce a cost of overhead due to context switching. The predictive model 1120 may learn from the context information 1122. The SPD 200' may exploit the fact that the sampling requirements (e.g., the sampling rate T) of many physical processes (e.g., the dynamic process) are often exceeded by the rate of generation of clock signals by CLOCK_CPU 1108.

The SPD 200' may be configured to estimate the current state of the dynamic process from a set of measurements (e.g., from the sensors 1102). The signal CONTROL may be computed as a function of the estimate (e.g., the control law, the policy function, etc.). The SPD 200' may exert an action on the dynamic process (e.g., using the actuators 1104) based on the signal CONTROL. The SPD 200' may be configured to drive the dynamic process into a desired state and/or maintain the dynamic process in the desired state. The SPD 200' may further be configured to attempt to provide more accurate (or appropriate) control signals and/or opportunistically enter the standby mode of operation based on the context information 1122.

The dynamic process may also be a plant or system. For example, the plant may be a combination of the dynamic process being controlled and one or more of the actuators 1104. The action may be executed by at least one of the actuators 1104 exerting an influence over the dynamic process. The set of measurements may be collected by at least one of the sensors 1102 monitoring the dynamic process. The processor 202' may be used to determine the current state 1122 of the dynamic process based on the sensor information.

In one example, the actuator 1104 may be configured as an insulin pump injecting insulin into the body of a person. In another example, the actuator 1104 may be configured as a valve that controls the amount of fluid in a vessel. In yet another example, the actuator 1104 may be configured as a motor that controls a position of some mechanical element. The type of actuator 1104 may be varied according to the design criteria of a particular implementation.

The actuators 1104 may be configured to exert an action as determined by the signal CONTROL. For example, a valve may be opened in proportion to the voltage of the signal CONTROL. In another example, the actuator 1104 may release the consumable (e.g., a propellant, a medication, a hormone, an amount of charge of the battery 214', etc.). In some embodiments, the actuator 1104 may have on-board logic and the signal CONTROL may be a digital signal configured to interface with the on-board logic of the actuator 1104.

In one example, the sensors 1102 may be configured as position sensors. In another example, the sensors 1102 may be configured as pH sensors. In yet another example, the sensors 1102 may be configured as pressure sensors. The sensors 1102 may be configured to measure some environmental variable. The types of sensors 1102 may be varied according to the design criteria of a particular implementation.

The sensors 1102 may generate readings and/or signals as determined by some physical measurement (e.g., the signal READ). For example, a pressure sensor may generate a signal with voltage proportional to the instantaneous pressure inside a vessel. In another example, the sensor 1102 may have an on-board logic configured to generate digital signals.

In some embodiments, the control law for the dynamic process may be computed/executed by the self-powered device 200'. In some embodiments, the control law for the dynamic process may be computed/executed by the remote device 104'.

The DAQ board 1106 may read information from the sensors 1102 (e.g., via the signal READ). In some embodiments, the DAQ board may be a separate device connected to the SPD 200' (e.g., the external DAQ board 1106' and/or the external DAQ board 1106").

In some embodiments, the sensors 1102 may be attached and/or embedded on the SPD 200'. The sensors 1102 may connect to the DAQ board 1106. In some embodiments, the sensors 1102 may be external to the SPD 200''' (e.g., as part of the external sensory I/O subsystem 220").

In some embodiments, the DAQ board 1106 may generate the driving signal (e.g., the signal WRITE) for the actuators 1104. The actuators 1104 may be attached and/or embedded on the SPD 200' and/or external to the SPD 200''' (e.g., as part of the external sensory I/O subsystem 220").

The SPD 200' may be configured to determine the predictive model 1120, the context information 1122 and/or the scheduling data 1126. In some embodiments, the predictive model 1120, the context information 1122 and/or the scheduling data 1126 may be provided by the remote device 104'.

Whether the DAQ board 1106 is implemented as an onboard component of the SPD 200' or the external DAQ board 1106', the DAQ board 1106 (or the external DAQ board 1106') may operate semi-independently from the SPD 200'. The DAQ board 1106 may provide sensor information (e.g., measurements) to other blocks (e.g., the SPD 200' and/or the remote device 104'). The DAQ board 1106 may set the actuators 1104 to a specified control input (e.g., a DAQ write operation via the signal WRITE). The DAQ board 1106 may be instructed to do periodic reads in response to the clock signal generated by the CLOCK_DAQ 1110. The processor 202' may instruct the DAQ board 1106 to "hold" the actuators 1104 until a new write operation is computed. The DAQ board 1106 may operate independently from other blocks in the SPD 200'.

The SPD 200' may be configured to perform a majority of the computation for the dynamic process, whereas the DAQ board 1106 may be configured to perform very simple functions that may be implemented with simpler logic. For example, the SPD 200" and/or the SPD 200''' may consume less power than the SPD 200'.

In some embodiments, the SPD 200' may implement a control law process (e.g., a dynamic process that has an output fed to the actuators 1104). In some embodiments, the SPD 200' may be configured to perform a smart sensing operation. For example, the smart sensing operation may comprise sensing of attributes of people and groups using one or more of the SPDs 200' in a public area. The smart sensing operation may involve a dynamic process that utilizes sensing (e.g., measurements by the sensors 1102) and processing/computation (e.g., the processor 202'). In general, smart sensing operations may not involve the actuators 1104. The processor 202' may be configured to perform computations on an aggregation of the sensor information in order to characterize an environment.

In a smart sensing operation, the SPD 200' may exploit the fact that the internal clock of the SPD 200' (e.g., the CLOCK_CPU 1108) executing monitoring logic is often orders of magnitude faster than the sampling rate required by the process being observed. The SPD 200' may be configured to schedule the execution of the monitoring logic for the smart sensing operation in a way that allows the SPD 200' to switch into the standby mode periodically.

In smart sensing applications, the monitoring logic involves the analysis, aggregation and/or processing of the sensor information. The analysis, aggregation and/or processing of the sensor information may be performed in order to extract a high level attribute of the dynamic process being observed. In control applications, the monitoring logic may comprise the computation of a control law. The output may then be fed into the actuator 1104 in order to regulate and/or control the dynamic process.

Figure 26:
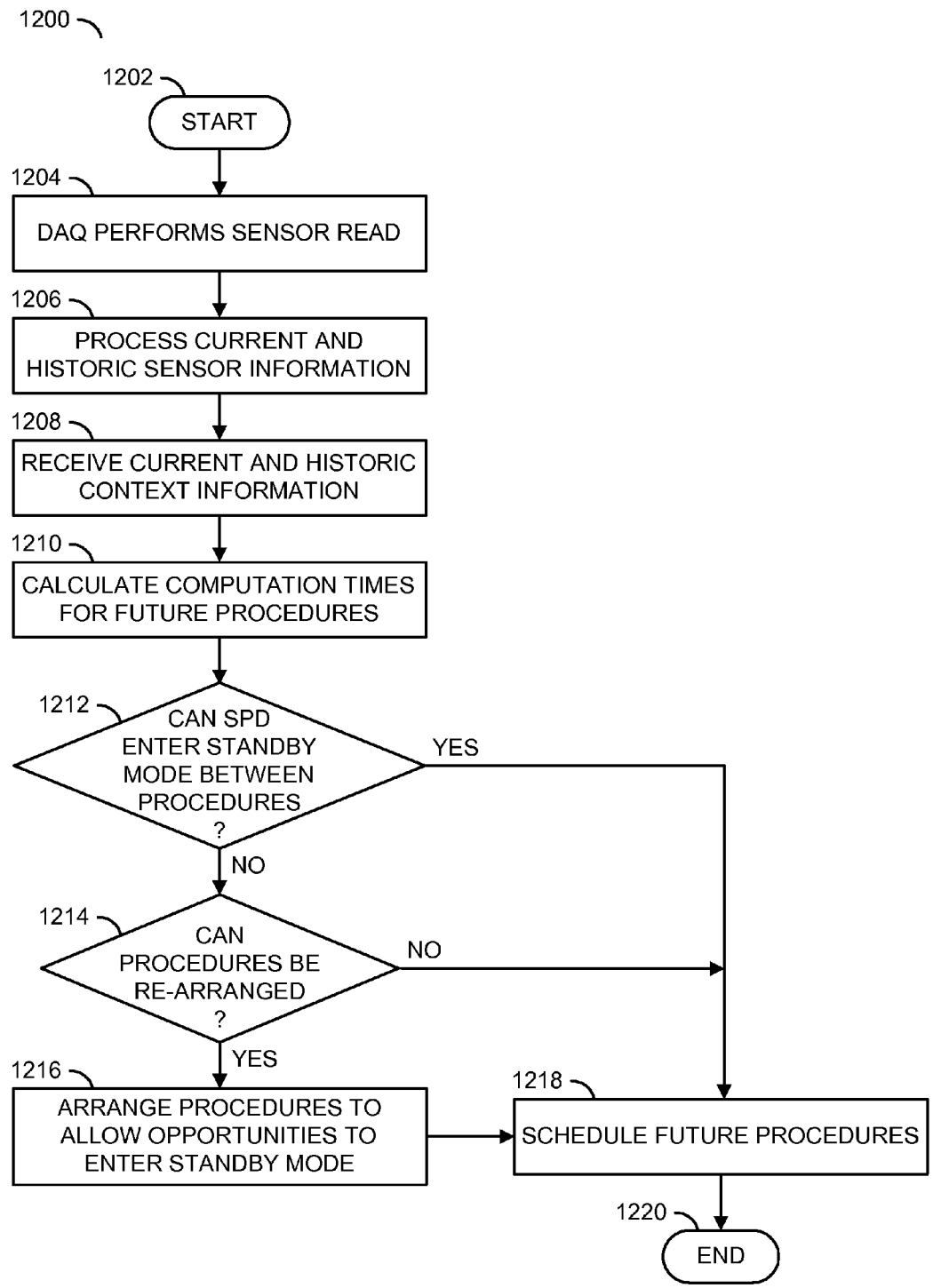
FIG. 26 is a flow diagram illustrating a method for scheduling procedures for a dynamic process.

Referring to FIG. 26, a method (or process) 1200 is shown. The method 1200 may schedule procedures for the dynamic process. The method 1200 generally comprises a step (or state) 1202, a step (or state) 1204, a step (or state) 1206, a step (or state) 1208, a step (or state) 1210, a decision step (or state) 1212, a decision step (or state) 1214, a step (or state) 1216, a step (or state) 1218, and a step (or state) 1220.

The state 1202 may start the method 1200. In the state 1204, the DAQ board 1106 may perform a sensor read (e.g., receive the signal READ). The state 1206 may process current and historic sensor information (e.g., the processor 202' may analyze the signal DATA as well as previous sensor reads stored in the memory 204'). Next, the state 1208 may receive current and historic context information 1122 (e.g., the processor 202' may analyze current context information and/or historic content information stored in the context information 1122). In the state 1210, the processor 202' may calculate the computation times for future procedures. For example, in some embodiments, the processor 202' may calculate the computation times for future procedures using a single sensor read and/or current context information. In another example, the processor 202' may calculate the computation times for the procedures by analyzing statistics about the history of the sensor reads and/or the history of the context information. Next, the method 1200 may move to the decision state 1212.

If the decision state 1212 determines the SPD 200' cannot enter the standby mode of operation between procedures, the method 1200 may move to the decision state 1214. If the decision state 1212 determines the SPD 200' can enter the standby mode of operation between procedures, the method 1200 may move to the state 1218.

If the decision state 1214 determines the procedures can be re-arranged, the method 1200 may move to the state 1216. If the decision state 1214 determines the procedures cannot be re-arranged, the method 1200 may move to the state 1218. The state 1216 may arrange the procedures to allow the SPD 200' opportunities to enter the standby mode of operation. Next, the state 1218 may schedule future procedures (e.g., store the scheduling data 1126). Next, the method 1200 may move to the state 1220. The state 1220 may end the method 1200.

Figure 27:
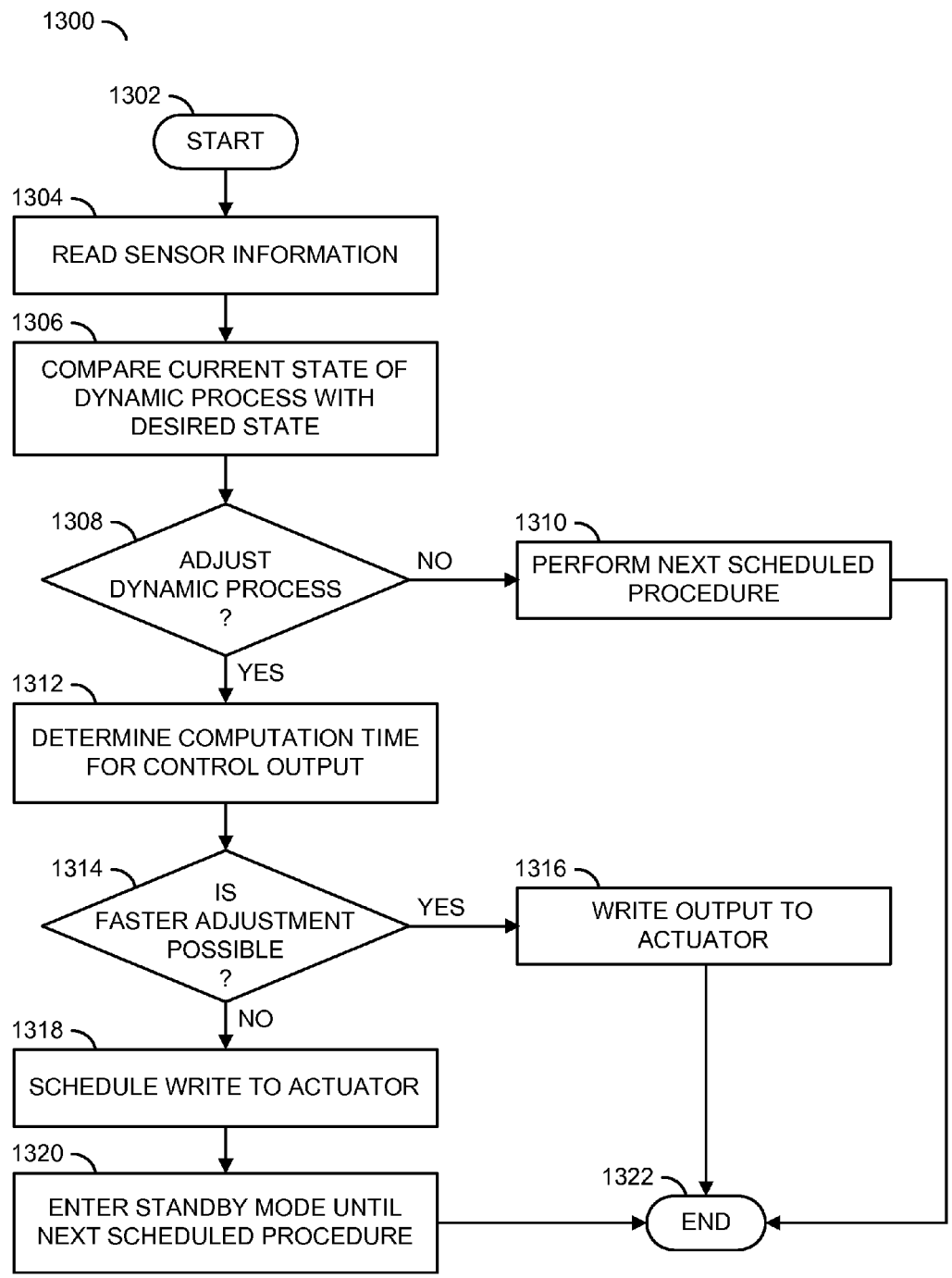
FIG. 27 is a flow diagram illustrating a method for entering a standby mode based on a dynamic process.

Referring to FIG. 27, a method (or process) 1300 is shown. The method 1300 may enter the standby mode based on the dynamic process. The method 1300 generally comprises a step (or state) 1302, a step (or state) 1304, a step (or state) 1306, a decision step (or state) 1308, a step (or state) 1310, a step (or state) 1312, a decision step (or state) 1314, a step (or state) 1316, a step (or state) 1318, a step (or state) 1320, and a step (or state) 1322.

The state 1302 may start the method 1300. The state 1304 may read the sensor information (e.g., data from the sensors 1102). The state 1306 may compare the current state 1124 of the dynamic process with the desired state. Next, the method 1300 may move to the decision state 1308.

If the decision state 1308 determines not to adjust the dynamic process, the method 1300 may move to the state 1310. The state 1310 may perform the next scheduled procedure (e.g., based on the scheduling data 1126). Next, the method 1300 may move to the state 1322. If the decision state 1308 determines to adjust the dynamic process, the method 1300 may move to the state 1312. The state 1312 may determine the computation time for the control output (e.g., based on the predictive model 1120 and the context information 1122). Next, the method 1300 may move to the decision state 1314.

If the decision state 1314 determines a faster adjustment for the dynamic process is possible, the method 1300 may move to the state 1316. The state 1316 may write the output to the actuator 1104 (e.g., via the signal WRITE). Next, the method 1300 may move to the state 1322. If the decision state 1314 determines a faster adjustment for the dynamic process is not possible, the method 1300 may move to the state 1318. The state 1318 may schedule the write operation to the actuator 1104 (e.g., stored in the scheduling data 1126). In the state 1320, the SPD 200' may enter the standby mode of operation until the next scheduled procedure. Next, the method 1300 may move to the state 1322. The state 1322 may end the method 1300.

Figure 28:
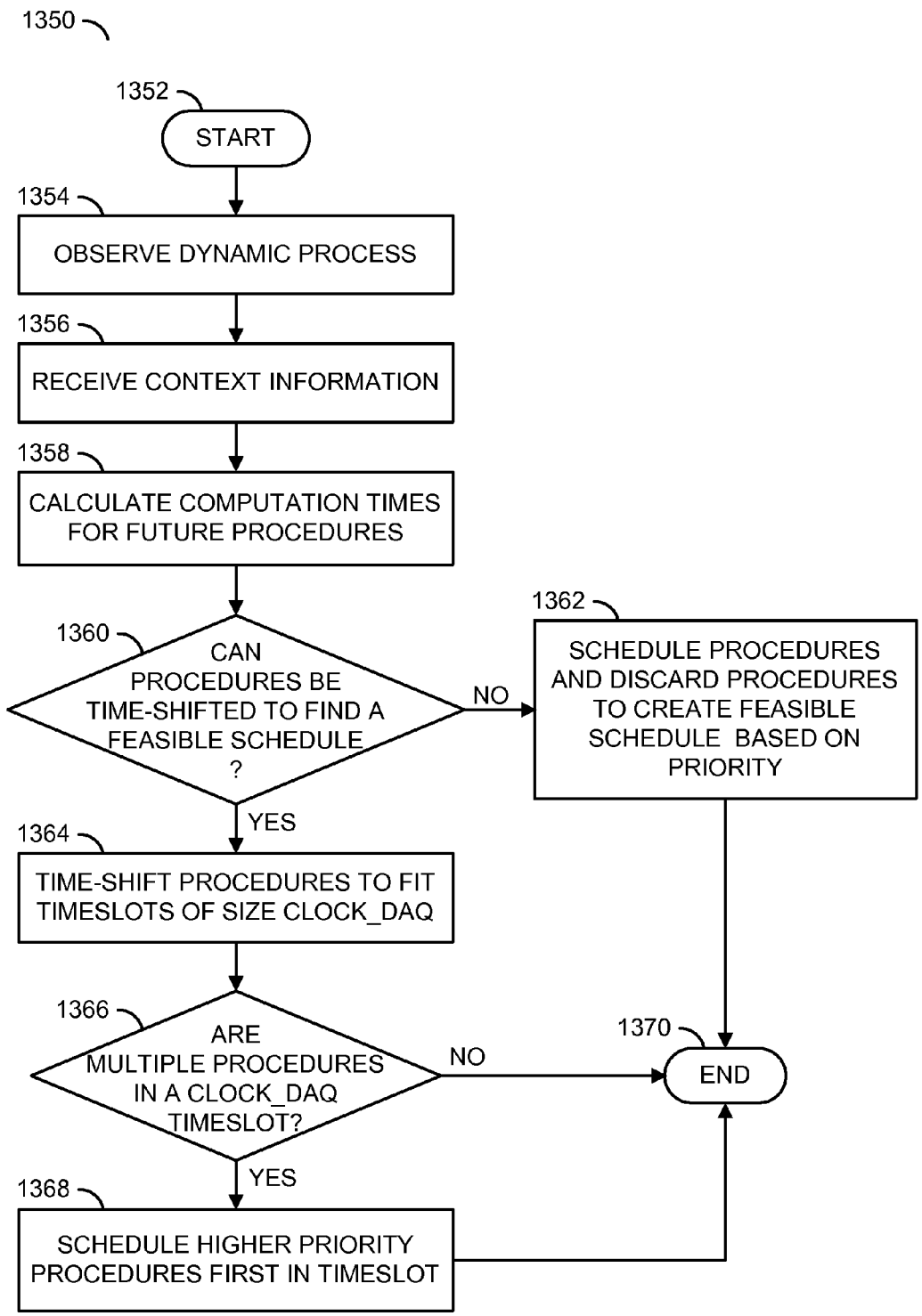
FIG. 28 is a flow diagram illustrating a method for arranging procedures based on finding a feasible schedule.

Referring to FIG. 28, a method (or process) 1350 is shown. The method 1350 may arrange procedures based on finding a feasible schedule. The method 1350 generally comprises a step (or state) 1352, a step (or state) 1354, a step (or state) 1356, a step (or state) 1358, a decision step (or state) 1360, a step (or state) 1362, a step (or state) 1364, a decision step (or state) 1366, a step (or state) 1368, and a step (or state) 1370.

The state 1352 may start the method 1350. The state 1354 may observe the dynamic process. Next, the state 1356 may receive the context information 1122 (e.g., from the memory 204' and/or the remote device 104'). In the state 1358, the processor 202' may calculate the computation times for future procedures. Next, the method 1350 may move to the decision state 1360.

If the decision state 1360 determines that the procedures cannot be time-shifted to find a feasible schedule, the method 1350 may move to the state 1362. The state 1362 may schedule the procedures and discard procedures to create a feasible schedule for the scheduling data 1126 based on priority. Next, the method 1350 may move to the state 1370. If the decision state 1360 determines that the procedures can be time-shifted to find a feasible schedule, the method 1350 may move to the state 1364. The state 1364 may arrange the procedures to fit timeslots of size CLOCK_DAQ. Next, the method 1350 may move to the decision state 1366.

If the decision state 1366 determines that there are not multiple procedures in a CLOCK_DAQ timeslot, the method 1350 may move to the state 1370. If the decision state 1366 determines there are multiple procedures in a CLOCK_DAQ timeslot, the method 1350 may move to the state 1368. The state 1368 may schedule the higher priority procedures first in the timeslot in the scheduling data 1126. Next, the method 1350 may move to the state 1370. The state 1370 may end the method 1350.

The processor 202' may be configured to find a feasible schedule for the scheduling data 1126. For example, a feasible schedule may be a schedule of the procedures where the procedures (or the most important procedures) may be successfully performed given the time and/or power constraints. In some examples, a feasible schedule may exist where all available procedures may be performed. In some embodiments, no feasible schedule may exist where all the available procedures may be performed. When no feasible schedule exists, some tasks (or subsets of tasks) may need to be discarded (or skipped) by the processor 202'. Tasks may be discarded based on priority. For example, higher priority tasks may be scheduled first in a particular timeslot. Higher tasks may be scheduled first to reduce a risk of higher priority tasks being preempted when the processor 202' confronts unexpected events (e.g., a sensor failure, a battery failure, etc.).

Figure 29:
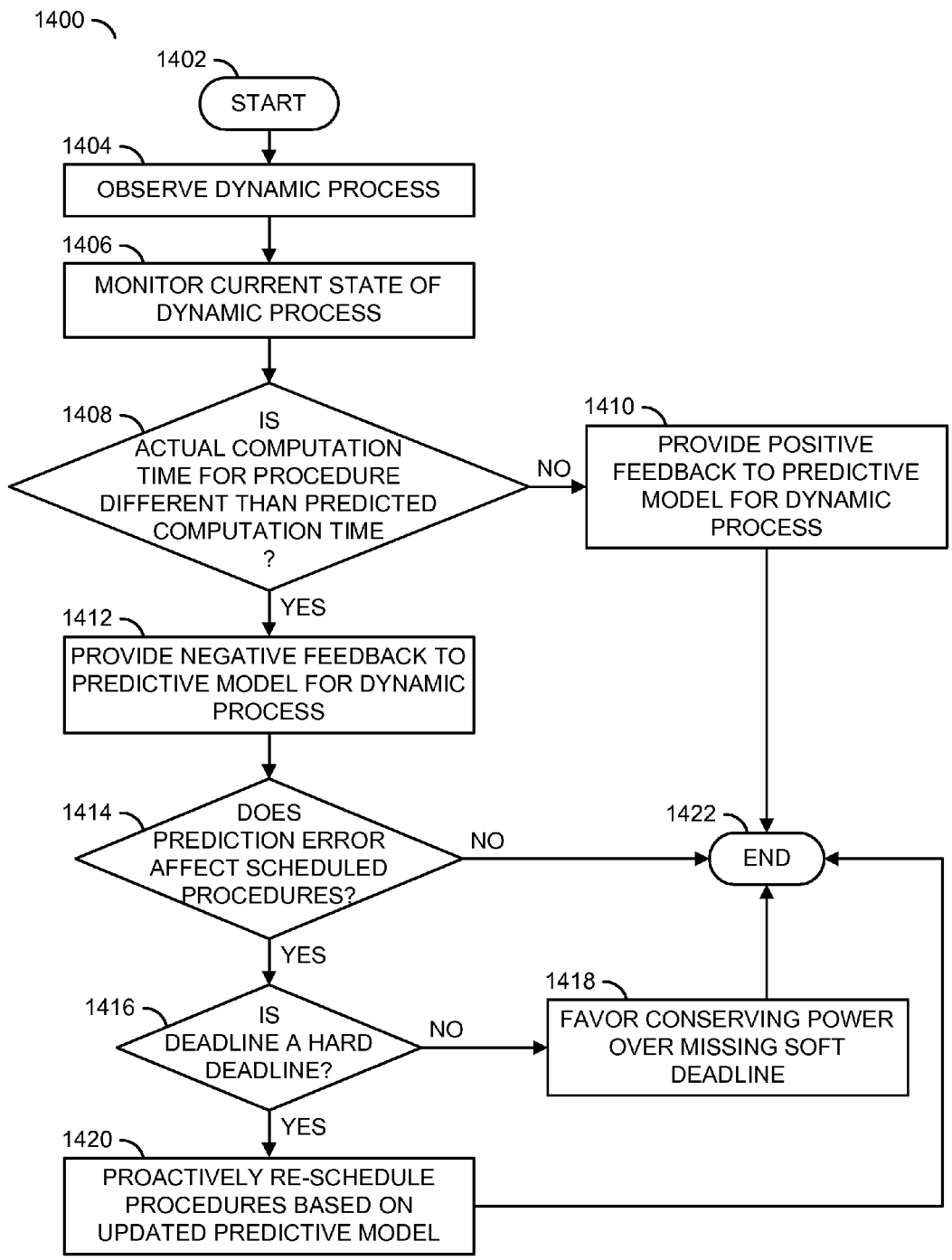
FIG. 29 is a flow diagram illustrating a method for adjusting a predictive model for a dynamic process.

Referring to FIG. 29, a method (or process) 1400 is shown. The method 1400 may adjust the predictive model 1120 for the dynamic process. The method 1400 generally comprises a step (or state) 1402, a step (or state) 1404, a step (or state) 1406, a decision step (or state) 1408, a step (or state) 1410, a step (or state) 1412, a decision step (or state) 1414, a decision step (or state) 1416, a step (or state) 1418, a step (or state) 1420, and a step (or state) 1422.

The state 1402 may start the method 1400. The state 1404 may observe the dynamic process. The state 1406 may monitor the current state 1124 of the dynamic process. Next, the method 1400 may move to the decision state 1408.

If the decision state 1408 determines the actual computation time for the procedure is not different than the predicted computation time, the method 1400 may move to the state 1410. The state 1410 may provide positive feedback to the predictive model 1120 for the dynamic process. Next, the method 1400 may move to the state 1422. If the decision state 1408 determines the actual computation time for the procedure is different than the predicted computation time, the method 1400 may move to the state 1412. The state 1412 may provide negative feedback to the predictive model 1120 for the dynamic process. Next, the method 1400 may move to the decision state 1414.

If the decision state 1414 determines the prediction error does not affect the scheduled procedures, the method 1400 may move to the state 1422. If the decision state 1414 determines the prediction error does affect the scheduled procedures, the method 1400 may move to the decision state 1416.

If the decision state 1416 determines the deadline for the procedure is not a hard deadline (e.g., the procedure is a soft deadline), the method 1400 may move to the state 1418. The state 1418 may favor conserving power (e.g., entering the standby mode of operation) over missing the soft deadline. Next, the method 1400 may move to the state 1422. If the decision state 1416 determines the deadline for the procedure is a hard deadline, the method 1400 may move to the state 1420. The state 1420 may proactively re-schedule the procedures based on the updated predictive model 1120. Next, the method 1400 may move to the state 1422. The state 1422 may end the method 1400.

Figure 30:
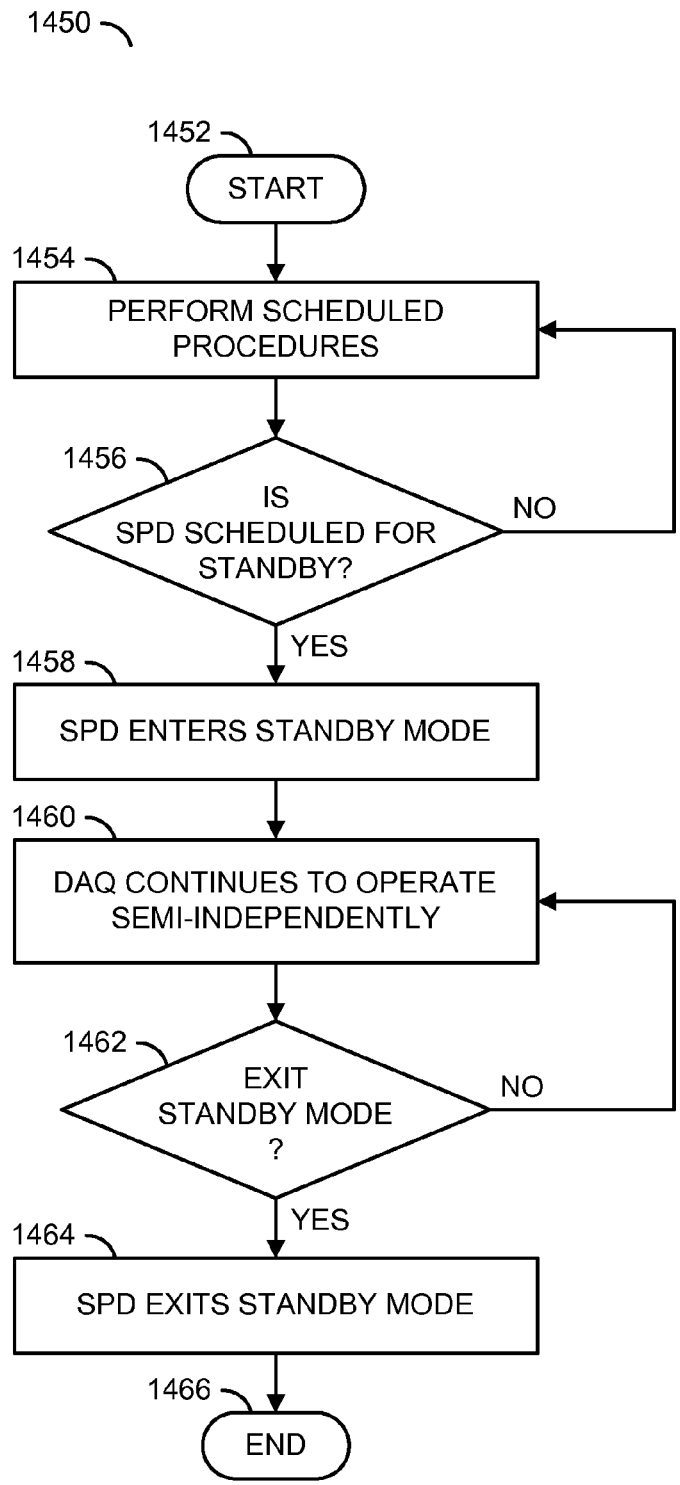
FIG. 30 is a flow diagram illustrating a method for semi-independent operation of a DAQ during SPD standby.

Referring to FIG. 30, a method (or process) 1450 is shown. The method 1450 may implement a semi-independent operation of the DAQ board 1106 during the standby mode of operation for the SPD 200'. The method 1450 generally comprises a step (or state) 1452, a step (or state) 1454, a decision step (or state) 1456, a step (or state) 1458, a step (or state) 1460, a decision step (or state) 1462, a step (or state) 1464, and a step (or state) 1466.

The state 1452 may start the method 1450. The state 1454 may perform the scheduled procedures (e.g., based on the scheduling data 1126). Next, the method 1450 may move to the decision state 1456.

If the decision state 1456 determines the SPD 200' is not scheduled for entering the standby mode of operation, the method 1450 may return to the state 1454. If the decision state 1456 determines the SPD 200' is scheduled for entering the standby mode of operation, the method 1450 may move to the state 1458. In the state 1458, the SPD 200' may enter the standby mode of operation.

In the state 1460, the DAQ board 1106 may continue to operate semi-independently. Next, the method 1450 may move to the decision state 1462. If the decision state 1462 determines the SPD 200' should not exit the standby mode of operation, the method 1450 may return to the state 1460. If the decision state 1462 determines the SPD 200' should exit the standby mode of operation, the method 1450 may move to the state 1464. In the state 1464, the SPD 200' may exit the standby mode of operation. Next, the method 1450 may move to the state 1466. The state 1466 may end the method 1450.

Figure 31:
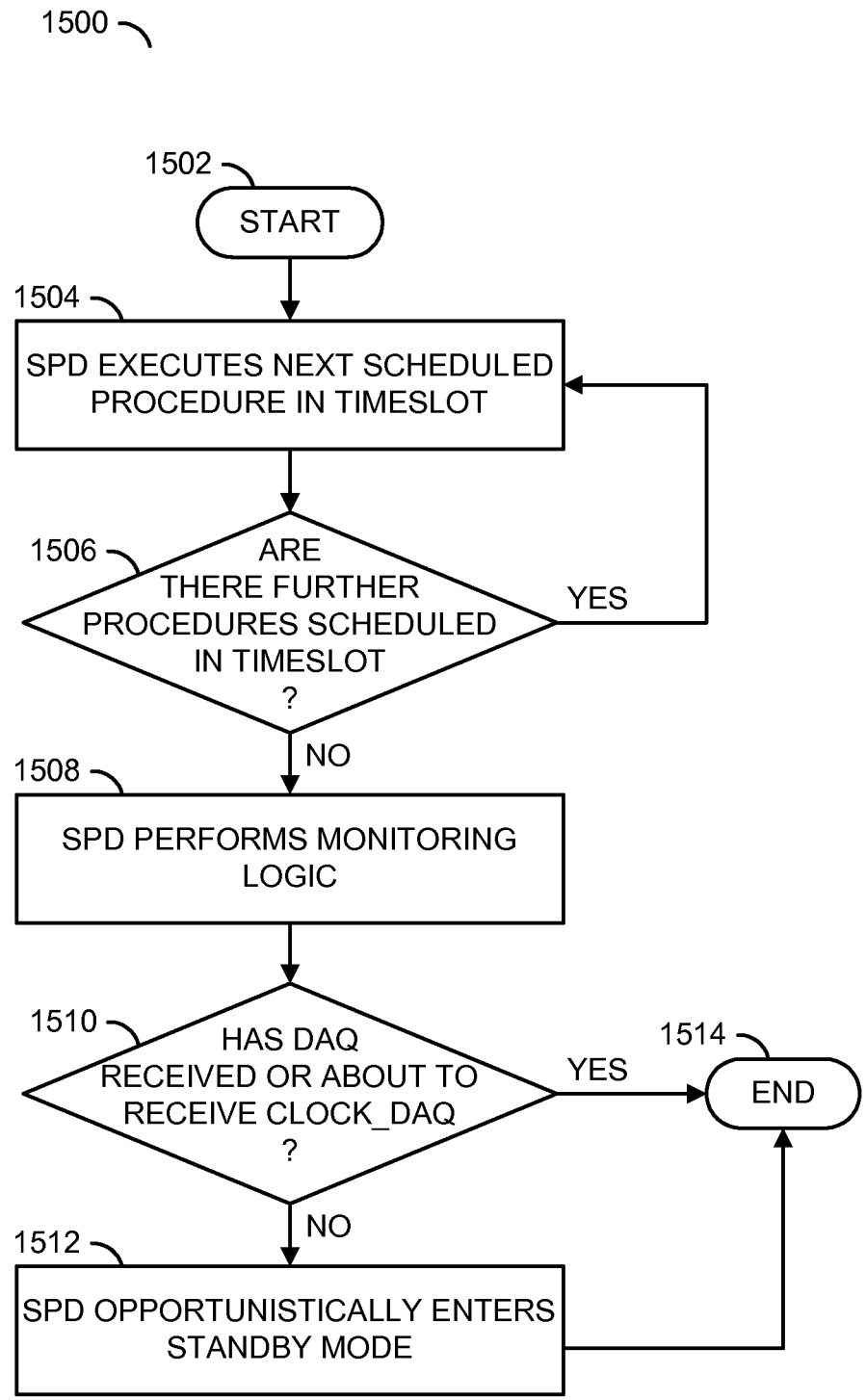
FIG. 31 is a flow diagram illustrating a method for leveraging differences in clock signals to opportunistically enter a standby mode.

Referring to FIG. 31, a method (or process) 1500 is shown. The method 1500 may leverage differences in clock signals (e.g., the rate of the CLOCK_CPU 1108 and the rate of the CLOCK_DAQ 1110) to opportunistically enter the standby mode. The method 1500 generally comprises a step (or state) 1502, a step (or state) 1504, a decision step (or state) 1506, a step (or state) 1508, a decision step (or state) 1510, a step (or state) 1512, and a step (or state) 1514.

The state 1502 may start the method 1500. In the state 1504, the SPD 200' may execute the next scheduled procedure in a timeslot (e.g., based on the scheduling data 1126). Next, the method 1500 may move to the decision state 1506. If the decision state 1506 determines there are further procedures scheduled in the timeslot, the method 1500 may return to the state 1504. If the decision state 1506 determines there are no more procedures scheduled in the timeslot, the method 1500 may move to the state 1508. In the state 1508, the SPD 200' may perform monitoring logic. Next, the method 1500 may move to the decision state 1510.

If the decision state 1510 determines that the DAQ board 1106 has not received or is not about to receive the signal from the CLOCK_DAQ 1110, the method 1500 may move to the state 1512. The state 1512 may be a potential opportunity for the SPD 200' to enter the standby mode of operation. The length of time for entering the standby mode of operation may be varied according to the design criteria of a particular implementation. Next, the method 1500 may move to the state 1514.

If the decision state 1510 determines that the DAQ board 1106 has received or is about to receive the signal from the CLOCK_DAQ 1110, the method 1500 may move to the state 1514. The state 1514 may end the method 1500. Generally, if all the procedures for the timeslot have been completed and the signal from the CLOCK_DAQ 1110 has not been presented, then the SPD 200' may opportunistically enter the standby mode of operation. The length of time for operating in the standby mode of operation may be set such that the SPD 200' may wake up just prior to the upcoming signal from the CLOCK_DAQ 1110. For example, the amount of time until the upcoming signal from the CLOCK_DAQ 1110 may be determined based on the context information 1120.

Figure 32:
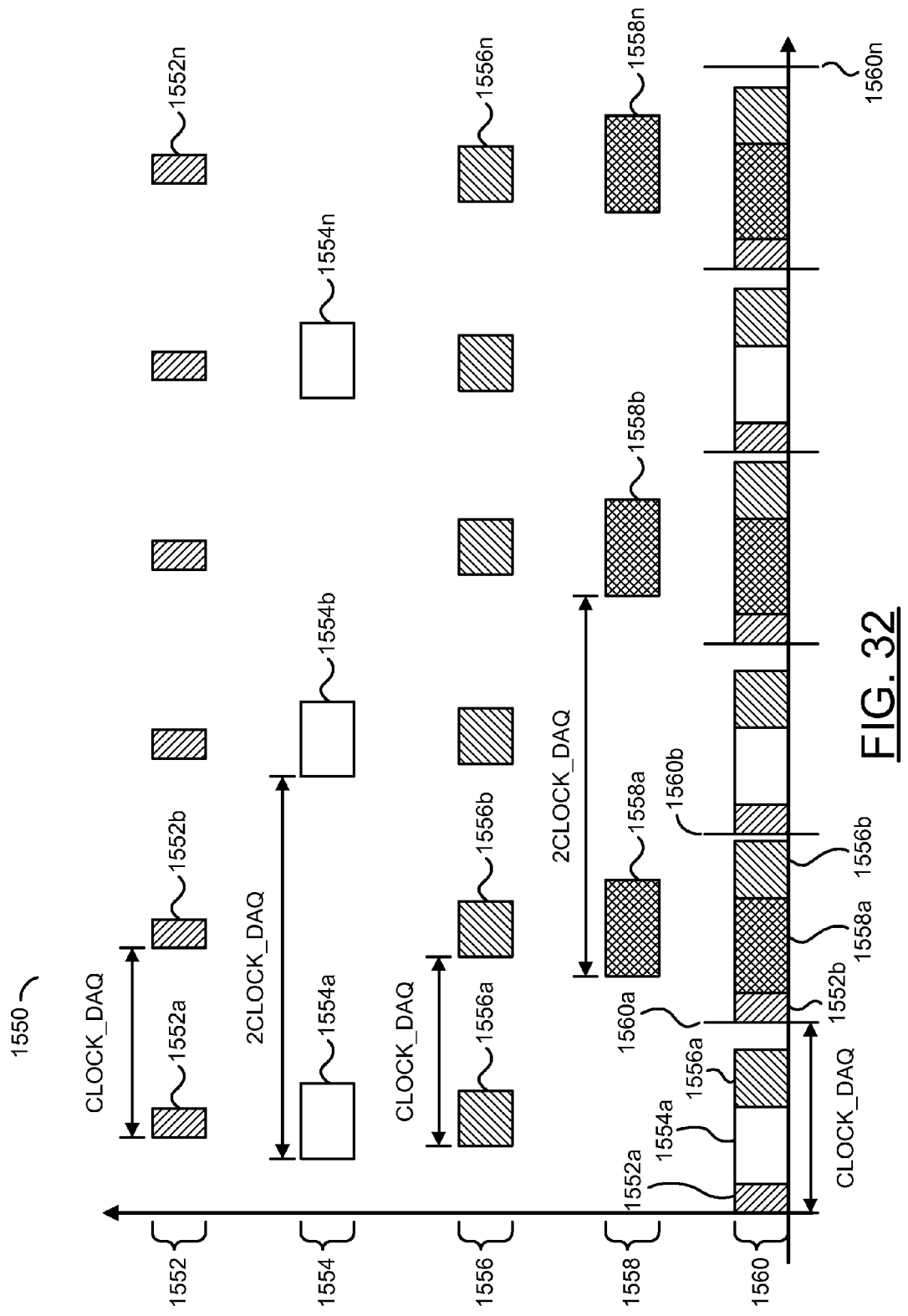
FIG. 32 is a diagram illustrating periodic task scheduling.

Referring to FIG. 32, an example of periodic task scheduling 1550 is shown. The periodic task scheduling 1550 may be performed by the processor 202' to find a feasible schedule to store in the scheduling data 1126. Each of the procedures (or tasks) in the periodic task scheduling 1550 may be configured to periodically monitor the dynamic process according to a sampling time constraint (e.g., the sampling period T).

In the example periodic task scheduling 1550, four periodic tasks are shown. A first periodic task 1552, a second periodic task 1554, a third periodic task 1556 and a fourth periodic task 1558 are shown. Each of the periodic tasks 1552-1558 may have corresponding periodic procedures. The width of the periodic procedures shown may represent the computation time for the processor 202' to perform each of the periodic procedures.

The first periodic task 1552 is shown having the procedures 1552*a*-1552*n*. Each of the first periodic procedures 1552*a*-1552*n* may have a period of CLOCK_DAQ. The first periodic procedures 1552*a*-1552*n* may have a highest priority.

The second periodic task 1554 is shown having the procedures 1554*a*-1554*n*. Each of the second periodic procedures 1554*a*-1554*n* may have a period of 2*CLOCK_DAQ. The second periodic procedures 1554*a*-1554*n* may have a high priority, but may not have as high a priority as the first periodic procedures 1552*a*-1552*n*.

The third periodic task 1556 is shown having the procedures 1556*a*-1556*n*. Each of the third periodic procedures 1556*a*-1556*n* may have a period of CLOCK_DAQ. The third periodic procedures 1556*a*-1556*n* may have a lowest priority.

The fourth periodic task 1558 is shown having the procedures 1558*a*-1558*n*. Each of the fourth periodic procedures 1558*a*-1558*n* may have a period of 2*CLOCK_DAQ. The fourth periodic procedures 1558*a*-1558*n* may have a lower priority than the second period procedures 1554*a*-1554*n*, but may not have as low a priority as the third periodic procedures 1558*a*-1558*n*.

A feasible schedule 1560 is shown. The feasible schedule 1560 may comprise periods 1560*a*-1560*n*. Each of the periods 1560*a*-1560*n* is shown having a timeslot width of CLOCK_DAQ. Each of the periods 1560*a*-1560*n* may be scheduled to perform one or more of the periodic procedures (e.g., 1552*a*-1552*n*, 1554*a*-1554*n*, 1556*a*-1556*n* and/or 1558*a*-1558*n*). For example, multiple procedures may share the same timeslot as long as the total computation time of all the procedures in the timeslot does not exceed CLOCK_DAQ. The processor 202' may time-shift one or more of the periodic procedures to create the feasible schedule 1560 and store the feasible schedule 1560 as the scheduling data 1126.

The fourth periodic procedures 1558*a*-1558*n* are shown time-shifted to create the example feasible schedule 1560. The first period 1560*a* of the feasible schedule 1560 is shown comprising the first periodic procedure 1552*a*, the second period procedure 1554*a* and the third periodic procedure 1556*a*. The second period 1560*b* is shown comprising the first periodic procedure 1552*b*, the fourth periodic procedure 1558*a* and the third periodic procedure 1556*b*.

Since the first periodic procedures 1552*a*-1552*n* have the highest priority and have a period of CLOCK_DAQ, the first periodic procedures 1552*a*-1552*n* are shown in each of the feasible schedule periods 1560*a*-1560*n*. Furthermore, the first period procedures 1552*a*-1552*n* are scheduled first in each of the feasible schedule periods 1560*a*-1560*n* to avoid being preempted by other procedures.

The second periodic procedure 1554*a* has the second highest priority and is scheduled second in the first period 1560*a*. The fourth periodic procedure 1558*a* has the third highest priority but is not scheduled in the first period 1560*a*. For example, the computation time constraint of the processor 202' performing the first periodic procedure 1552*a*, the second periodic procedure 1554*a* and the fourth periodic procedure 1558*a* would exceed the timeslot limit of CLOCK_DAQ. Since the second periodic procedure 1554*a* has a higher priority than the fourth periodic procedure 1558*a*, the fourth periodic procedure 1558*a* may be bumped down (e.g., time-shifted) to a next available timeslot (e.g., the period 1560*b*).

While the third periodic procedure 1556a has a lower priority than the fourth periodic procedure 1558a, the third periodic procedure 1556a takes less computation to be performed. For example, the computation time of the processor 202' performing the first periodic procedure 1552a, the second periodic procedure 1554a and the third periodic procedure 1556a may be less than CLOCK_DAQ. Therefore, despite the lowest priority status of the third periodic procedure 1556a, the third periodic procedure 1556a may be opportunistically scheduled in the first period 1560a. Since the third periodic procedure 1556a has the lowest priority, the third periodic procedure 1556a may be scheduled after both the first periodic procedure 1552a and the second periodic procedure 1554a in the timeslot 1560a.

In the second period 1560b, the first periodic procedure 1560b may again be scheduled first as a result of the highest priority status. Since procedures of the second periodic task 1554 have a period of 2*CLOCK_DAQ, and since the second periodic procedure 1554a was performed in the previous period 1560a, the second periodic procedure 1554b may not be performed in the second period 1560b. Since the third periodic procedure has a period of 2*CLOCK_DAQ, the time-shifting performed by the processor 202' may allow the procedures of the second periodic task 1554 and procedures of the fourth periodic task 1558 to be performed during alternating periods of the feasible schedule 1560.

Since the third periodic procedure 1556b has a period of CLOCK_DAQ, the third periodic procedure 1556b may be scheduled in each period 1560a-1560n of the feasible schedule 1560 if there is enough time left in the timeslot. Since the computation time of the first procedure 1552b, the fourth procedure 1558a and the third procedure 1556b does not exceed CLOCK_DAQ, the third periodic procedure 1556b may also be scheduled in the second period 1560b. Since the third periodic procedure 1556b has the lowest priority, the third periodic procedure 1556b may be scheduled last in the timeslot 1560b. For example, if there is an unexpected event, the third periodic procedure 1556b may be shifted to another timeslot to ensure the first periodic procedure 1552b and/or the fourth periodic procedure 1558a may be performed by the processor 202'. In another example, the third periodic procedure 1556b may be discarded (e.g., not time-shifted and/or rescheduled) in order to ensure the first periodic procedure 1552b and/or the fourth periodic procedure 1558a (e.g., the higher priority procedures) may be performed by the processor 202'.

While the third periodic procedures 1556a-1556n are shown in each of the timeslots 1560a-1560n of the feasible schedule 1560, in some embodiments, some of the third periodic procedures 1556a-1556n may be discarded. For example, the predictive model 1120 and/or the context information 1122 may be used by the processor 202' to determine that the SPD 200' may instead enter the standby mode of operation. Since the third periodic task 1556 has the lowest priority, the SPD 200' may discard one or more of the third periodic procedures 1556a-1556n in order to opportunistically enter the standby mode of operation. Which procedures of the periodic tasks 1552-1558 are discarded in the given set of circumstances in favor of the standby mode of operation may be varied according to the design criteria of a particular implementation.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description.

The functions performed by the diagrams of FIGS. 12-14 and 26-31 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs. field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A device comprising:
   a battery;
   a memory;
   a plurality of sensors each configured to sample a current state of a dynamic process, said dynamic process having a sampling rate;
   a data acquisition circuit having a first clock rate based on said sampling rate, wherein said data acquisition circuit is configured to perform a read of sensor information from said sensors; and
   a processor having a second clock rate, wherein said processor is configured to (A) process said sensor information from said data acquisition circuit, (B) generate a monitoring signal in response to at least one of (i) said sensor information (ii) a model of said dynamic process and (iii) a desired state of said dynamic process, (C) schedule procedures for said device and (D) determine computation times for said procedures based on context information, wherein (a) said second clock rate is faster than said sampling rate, (b) said procedures comprise at least one of (i) reading said sensor information, (ii) writing data to said memory, (iii) transmitting said monitoring signal to a second device and (iv) entering a standby mode of operation to conserve power and (c) said procedures are scheduled based on (i) said sampling rate of said dynamic process, (ii) said computation times for said scheduled procedures and (iii) opportunities to enter said standby mode.

2. The device according to claim 1, wherein said device further comprises an actuator configured to process an output in said dynamic process.

3. The device according to claim 2, wherein said data acquisition circuit is configured to write data to said actuator in response to said monitoring signal.

4. The device according to claim 2, wherein said output in said dynamic process is a consumable having a limited supply.

5. The device according to claim 4, wherein said consumable comprises at least one of a propellant, a medication, a hormone and an amount of charge of said battery.

6. The device according to claim 1, wherein said procedures are further scheduled based on said desired state of said dynamic process.

7. The device according to claim 1, further comprising a communications module configured to communicate with at least one of (a) said second device and (b) a remote device.

8. The device according to claim 7, wherein said remote device provides said context information.

9. The device according to claim 1, wherein (i) said processor is further configured to determine said context information and (ii) said context information is stored in said memory.

10. The device according to claim 1, wherein (i) said processor is further configured to perform computations on an aggregation of said sensor information to characterize an environment.

11. The device according to claim 10, wherein said characterization of said environment comprises smart sensing.

12. The device according to claim 1, wherein said second device is another of said devices.

13. The device according to claim 1, wherein (i) said device is a portion of a system and (ii) said system comprises a plurality of said devices.

14. The device according to claim 1, wherein said sensors comprise at least one of a position sensor, a pH sensor and a pressure sensor.

15. The device according to claim 1, wherein said data acquisition circuit is further configured to (i) perform said read at a periodic time interval based on said first clock rate, (ii) receive an instruction from said processor to hold a write operation to an actuator and (iii) operate independently from said device.

16. The device according to claim 1, wherein increasing said sampling rate does not improve performance of said dynamic process.

17. A device comprising:
    a battery;
    a memory;
    an interface to a plurality of sensors each configured to sample a current state of a dynamic process, said dynamic process having a sampling rate;
    a data acquisition circuit having a first clock rate based on said sampling rate, wherein said data acquisition circuit is configured to perform a read of sensor information from said sensors; and
    a processor having a second clock rate, wherein said processor is configured to (A) process said sensor information from said data acquisition circuit, (B) generate a monitoring signal in response to at least one of (i) said sensor information (ii) a model of said dynamic process and (iii) a desired state of said dynamic process, (C) schedule procedures for said device and (D) determine computation times for said procedures based on context information, wherein (a) said second clock rate is faster than said sampling rate, (b) said procedures comprise at least one of (i) reading said sensor information, (ii) writing data to said memory, (iii) transmitting said monitoring signal to a second device and (iv) entering a standby mode of operation to conserve power and (c) said procedures are scheduled based on (i) said sampling rate of said dynamic process, (ii) said computation times for said scheduled procedures and (iii) opportunities to enter said standby mode.

18. A device comprising:
    a battery;
    a memory;
    a plurality of sensors each configured to sample a current state of a dynamic process, said dynamic process having a sampling rate;
    an interface to a data acquisition circuit having a first clock rate based on said sampling rate, wherein said data acquisition circuit is configured to perform a read of sensor information from said sensors; and a processor having a second clock rate, wherein said processor is configured to (A) process said sensor information from said data acquisition circuit, (B) generate a monitoring signal in response to at least one of (i) said sensor information (ii) a model of said dynamic process and (iii) a desired state of said dynamic process, (C) schedule procedures for said device and (D) determine computation times for said procedures based on context information, wherein (a) said second clock rate is faster than said sampling rate, (b) said procedures comprise at least one of (i) reading said sensor information, (ii) writing data to said memory, (iii) transmitting said monitoring signal to a second device and (iv) entering a standby mode of operation to conserve power and (c) said procedures are scheduled based on (i) said sampling rate of said dynamic process, (ii) said computation times for said scheduled procedures and (iii) opportunities to enter said standby mode.

* * * * *